United States Patent [19]

Kaku et al.

[11] Patent Number: 4,992,956
[45] Date of Patent: Feb. 12, 1991

[54] APPARATUS FOR ASSEMBLING DATA FOR SUPPLY TO A SCANNING OUTPUT DEVICE

[75] Inventors: Shinkyo Kaku, Los Gatos; Chung-Li Yu, San Jose; Greg W. Barr, Sunnyvale; Steven Gary, Campbell; David R. Staab, Atherton; George W. Li, Sunnyvale; Anan Nagarajan, Mountain View; Shabbir M. Latif, San Jose, all of Calif.

[73] Assignee: Advanced Micro Devices, Inc., Sunnyvale, Calif.

[21] Appl. No.: 107,723

[22] Filed: Oct. 8, 1987

[51] Int. Cl.5 .......................... G06F 3/12; G09G 5/36
[52] U.S. Cl. .................................. 364/519; 364/521; 364/900
[58] Field of Search .................. 340/732, 735, 750; 364/200 MS, 900 MS, 521, 523, 519

[56] References Cited

U.S. PATENT DOCUMENTS

| 4,203,154 | 5/1980 | Lampson et al. | 364/200 |
| 4,300,206 | 11/1981 | Belleson et al. | 364/900 |
| 4,433,378 | 2/1984 | Leger | 364/200 |
| 4,435,779 | 3/1984 | Mayer et al. | 364/900 |
| 4,439,761 | 3/1984 | Fleming et al. | 340/735 |
| 4,675,833 | 6/1987 | Cheek et al. | 364/523 |
| 4,809,216 | 2/1989 | Lai | 364/900 |
| 4,816,815 | 3/1989 | Yoshiba | 340/750 |
| 4,891,768 | 1/1990 | Willems et al. | 364/518 |
| 4,912,658 | 3/1990 | Sfarti et al. | 364/521 |
| 4,916,301 | 4/1990 | Mansfield et al. | 340/747 |

Primary Examiner—Gary V. Harkcom
Assistant Examiner—Raymond J. Bayerl
Attorney, Agent, or Firm—Fliesler, Dubb, Meyer & Lovejoy

[57] ABSTRACT

A device controls in real time the assembly of data for a bit map scanning device, such as a laser printer, under supervisory control of a host processor. The image data words are stored in a source memory and assembled in a video buffer, and automatically scanned out to the scanning device. The host processor generates a simplified set of control words that defines graphics, text and layout of the page to be assembled. A raster interface synchronizes the output of the assembled data with the scanning device. Three basic modes are supported: (1) dispatch mode, (2) font read/write mode, and (3) graphics load mode. The dispatch mode is the normal operational mode which provides for dispatching data from a source memory location to the video memory and for supplying data from the video memory out to the raster printer. The font read/write mode gives the host the ability to read/write font or graphics data from/to the source memory or the video memory. The graphics load mode provides for transfer of a bit mapped window data to the video memory from the processor. The video memory can be divided into two bands.

40 Claims, 26 Drawing Sheets

APPARATUS FOR ASSEMBLING DATA FOR SUPPLY TO A SCANNING OUTPUT DEVICE

BACKGROUND OF THE INVENTION

1. Field of the Invention

The present invention provides an apparatus for assembling data for bit map scanning devices, such as laser printers or other scanning devices.

2. Description of Related Art

Bit map scanning devices, such as laser printers, process data defining a two-dimensional element-byelement map of an image, such as for printing or displaying. Typically, scanning devices of this kind employ a raster scanning format, in which images are defined by a plurality of lines of picture elements, scanned one line at a time. The data must be assembled and supplied to the raster scanning device according to this line-by-line format.

The data to be assembled by a scanning printer controller is stored in words in a variety of locations, such as font libraries, or system memory storing graphics. This data must be assembled in a bit map on bit boundaries in a buffer, known as a video buffer, prior to supply to the scanning device. This assembled data then must be serialized and outputted in time with the raster scanner.

In the prior art, the process of assembling the data from a variety of storage devices into a video buffer, and then serializing the data in the video buffer for output to the scanning device, has required substantial programming and hardware resources. Conventional controllers for this data assembly are implemented using general purpose microprocessors with discrete logic providing supplemental functions. Modern laser printers may have a resolution on the order of 400 pixels per inch and may involve several planes of bit maps for color coding. In such a system, a typed A4 size page requires as much as 1.8 megabytes of data to be arranged per bit map plane for each page to be printed. The programming and hardware burden increases the cost of controllers for laser printers and the like, especially for systems assembling large amounts of data.

Accordingly, there is a need for high speed, low cost solutions for assembling data for scanning devices. The solution should support a variety of fonts, and text mixed with graphics on one page, such as may be supplied from a variety of storage devices in the system. Also, the management of a video buffer should be removed from the host processor in order to simplify the scanning device interface from the programmer's viewpoint. Finally, it is desirable that such a data assembling device support "texturing" of fonts or graphics in the output page.

SUMMARY OF THE INVENTION

The present invention provides a device for controlling in real time the assembly of data for a bit map scanning device, such as a laser printer. The device supports multiple fonts, mixed text and graphics, and texturing of output on a single output page.

The present invention provides an apparatus for assembling image data words for supply to a two-dimensional scanning device under control of a host processor. The image data words are stored in a source memory that is accessible in response to source addresses. The system also includes an assembly memory used for assembling the image data words that is accessible in response to assembly addresses. The host processor generates a simplified set of control words that define graphics, text and layout of the page to be assembled. The apparatus comprises a control interface that is adapted for communication with the host processor to receive the control words. A storage means is provided in communication with the control interface for storing and outputting the control words. A control means in communication with the control interface and the storage means, generates transaction control signals in response to the control words to direct the assembly of the image data words. An address generating means, in communication with the storage means and the control means, is provided for generating the source addresses and the assembly addresses in response to the transaction control signals and the control words.

Also included in the apparatus is a source interface, adapted for communication with the source memory and coupled to the control means and the address generating means for reading and writing image data words in the source memory in response to the transaction control signals and source addresses. Also, an assembly interface is provided that is adapted for communication with the assembly memory and coupled to the control means, the address generating means and the source interface, for assembling the image data words in the assembly memory and for reading assembled data in the assembly memory in response to the transaction control signals and assembly addresses. Finally, a scanner interface, adapted for communication with the scanning device and coupled to the assembly interface, is provided for supplying the assembled data words read by the assembly interface to the scanning device.

The apparatus of the present invention provides a simple architecture for high speed printing control. The four-interface architecture allows the CPU to read and write control words from and to a storage means including programmable registers. The source interface is used by the apparatus to access fonts or graphics blocks for use in assembling a page. The assembly interface accesses a video memory in which a bit map image is assembled for printing. The scanner interface takes words read from the video memory by the assembly interface, serializes them and supplies them to the scanning device. An arithmetic logic unit ALU takes care of address calculation for all of the interfaces. A barrel shifter provides for bit alignment of the image data words in the video memory. Also, background and color combination logic combines the fonts and graphics with background and texture information. The raster interface synchronizes the output of the assembly memory with the scanning device.

The host processor generates control words that specify the operational mode of the apparatus, the X-margin, the Y-margin, the page size and the characteristics of the video memory. Also, the control words include the source commands that specify information about the source of image data; and destination command words that specify the destination of all image data words for all operational modes, such as the video memory or source memory.

The apparatus supports three basic modes: 1) dispatch mode, 2) font read/write mode, and 3) graphics load mode. The dispatch mode is the normal operational mode which provides for dispatching data from a source memory location to the video memory. During this mode, data can be supplied automatically from the video memory out to the raster printer. The font read/write mode, gives the CPU the ability to read/write font or graphics data from/to the source memory. The graphics load mode provides for transfer of a bit-mapped window of data to the video memory.

The apparatus further provides a ping-pong scheme for controlling the video memory through the assembly interface. The apparatus divides the video memory into two video bands. While one of the video bands is being read for supply of output data to the scanning device, data in the second band is being filled with font and graphics information from a source memory. After scanning all data out of the first band, the apparatus switches to the second band for printing and refills the first band with data.

DESCRIPTION OF THE PREFERRED EMBODIMENT

SECTION 1: GENERAL DESCRIPTION

1.1 SYSTEM OVERVIEW

Figure 1:
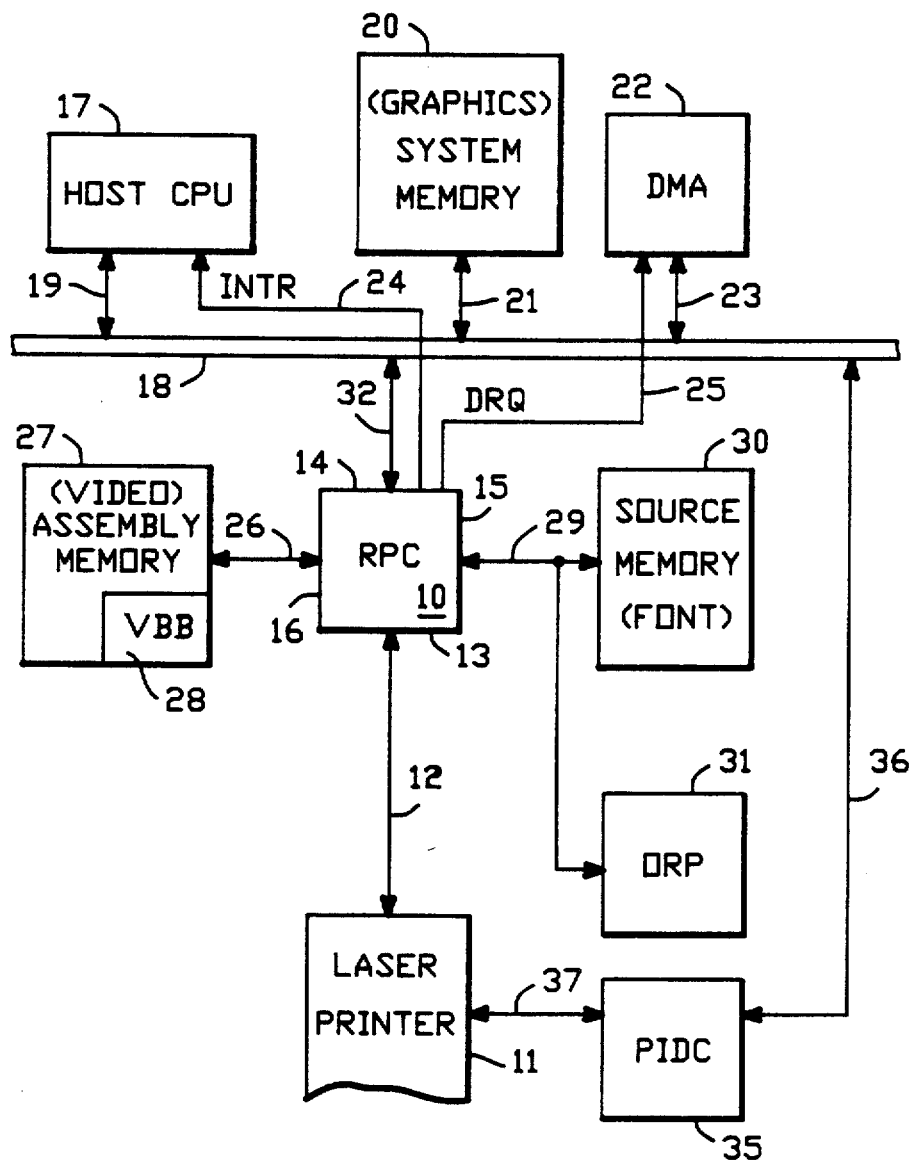
FIG. 1 is a diagram showing a typical system in which the apparatus of the present invention, termed the RPC, is used.

FIG. 1 is a block diagram of a system using the apparatus of the present invention, termed a raster printer controller RPC 10, for assembling data for use by a laser printer 11. The laser printer is a bit map scanning output device which accepts serial data and generates line and page synchronization signals across line 12 according to a raster format. The RPC is a four-interface controller, wherein the first interface 13 provides for communication with the laser printer 11 or other scanning device. A second interface 14 provides for communication with a host central processing unit, CPU 17. A third interface 15 provides for communication with a source memory 30. The fourth interface 16 provides for communication with an assembly memory 27.

The host CPU 17 includes a host bus 18 and communicates with the host bus across line 19. Also connected to the host bus 18 is system memory 20, across line 21, available for access through the host bus 18 by the host CPU 17, the RPC 10, such as a direct memory access (DMA) engine 22 across line 23, or other devices. Finally, a PIOC 35 is connected to the host bus 18 across line 36 and to the laser printer 11 across line 37.

The CPU interface 14 is connected to the host system bus 18 across line 32. The CPU interface 14 of the RPC also generates an interrupt signal on line 24 which is adapted to be supplied directly to a host CPU 17. Further, the CPU interface 14 generates a DRQ signal on line 25 which is adapted to be supplied directly to a DMA engine 22 as is described in more detail below.

The assembly interface 16 provides for communication across line 26 to the assembly memory 27. The assembly memory is typically a dynamic RAM array which includes an address space designated for a video band buffer 28. The video band buffer 28 is used as the assembly area in the assembly memory 27 in which data is assembled for supply to a laser printer through the assembly interface 16, and the scanner interface 13 by the RPC 10.

The source interface 15 is adapted for communication across line 29 with source memory 30, which typically includes static random access memory or read-only memory, storing fonts and graphics images. The source interface 15 is also adapted for communication across lines 29 with an orthogonal rotation processor (ORP) 31. A detailed description of an ORP 31 is provided in co-pending and co-owned at the time of invention, U.S. Patent application entitled BIT-MAP ROTATION PROCESSOR, Ser. No. 07/057,850, now abandoned, filed June 3, 1987.

The scanner interface 13 adapts data retrieved from the video buffer 28 for supply to the scanning device, such as the printer. In the preferred embodiment, this operation involves serializing data words supplied by the assembly interface 16, and timing the output with the needs of the printer 11. Other scanning devices may require parallel data out or other special characteristics, and the interface may be adapted as suits the particular need by a designer for other embodiments.

The RPC is a special purpose engine for controlling the resources used to assemble data for the raster printer. The standard operations include loading data to the source memory, dispatching data from the source memory to the assembly memory, transferring data from the assembly memory to the printer, and loading data from system memory to the source memory. The RPC also accomplishes other functions as is discussed in detail below.

Throughout the remainder of the document, the source interface 15 may be called a font interface as it is typically used for addressing font data. The assembly interface 16 may be called the video buffer interface as it is used most significantly as the working address space for the video band buffer 28. The scanner interface 13 may be referred to as the printer interface because it is adapted to a laser printer in the preferred embodiment.

In addition, as will be apparent in the description below, the source memory 30 in the diagram of FIG. 1, is typically the location of font data. The RPC can use data in system memory 20, in the dynamic RAMs in the assembly memory array 27, in the ORP address space 31, or in the source memory address space 30 as a source for image data to be assembled in the video band buffer 28. In the case in which the dynamic RAM array of the assembly memory 27 is used as a source of image data, the video interface 16 serves as a source interface for the purpose of retrieving source image words, and assembling those retrieved image words to the video band buffer. Similarly, when the system memory 20 is used as a source of image data, the CPU interface 14 may serve as a source interface that receives data from the host processor for assembly into a page.

1.2 RPC BLOCK DIAGRAM

Figure 2:
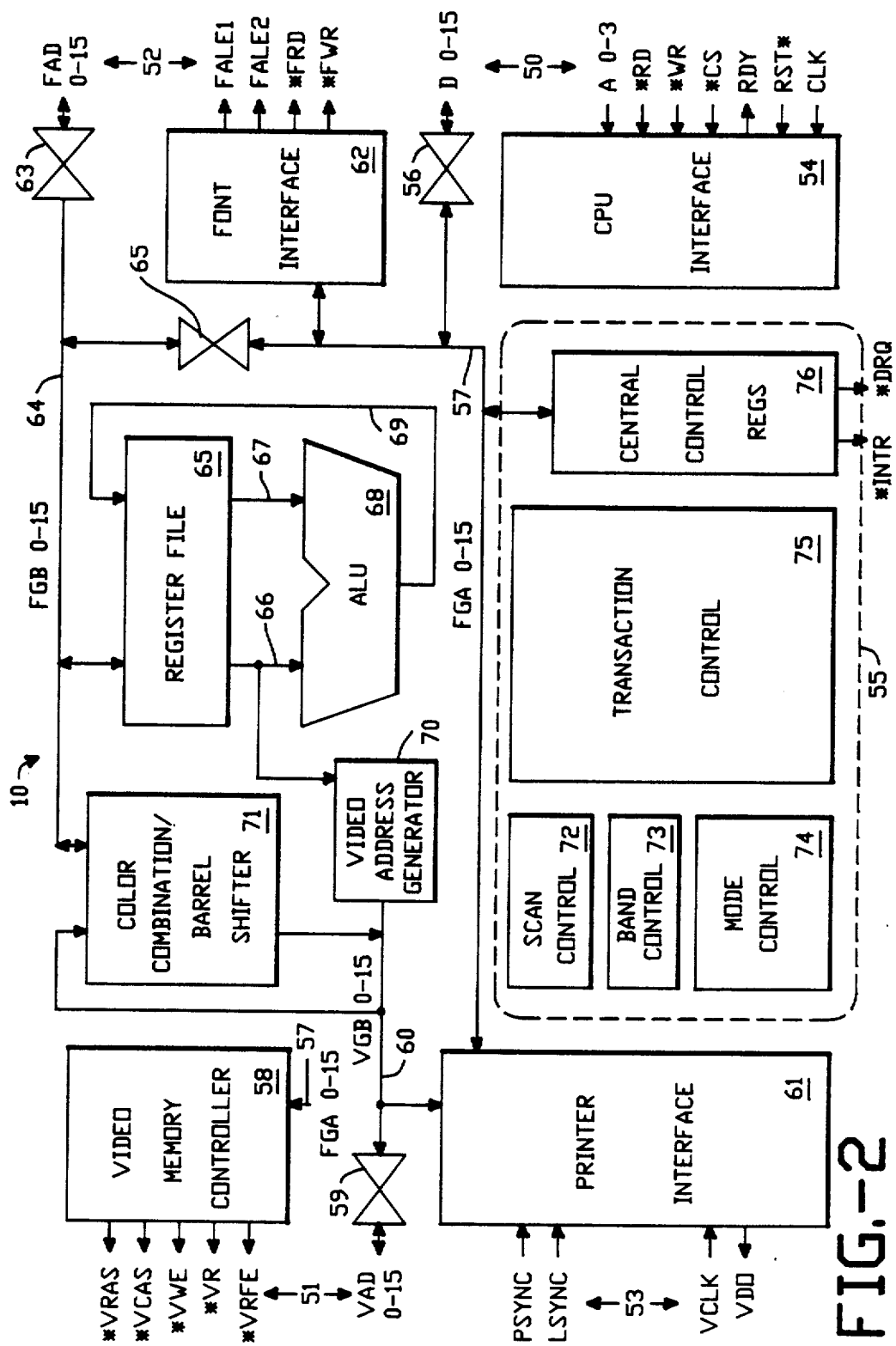
FIG. 2 is a block diagram of the RPC according to the present invention.

FIG. 2 is a block diagram of the RPC 10. Four independent interfaces connect the RPC 10 to the outside world.

The first interface is called the CPU interface 50, which interfaces with the local CPU. The second interface is called the video buffer (or assembly) interface 51, through which the RPC manipulates bit-map data stored in the video buffer. The third interface is called the font (or source) interface 52 and it interfaces with the static source memory. The fourth interface is called the printer interface 53, which receives synchronization signals from the raster printer and sends pixel data out.

The CPU interface 50 uses 4 address lines A0-A3, 16 data lines, D0-D15, and 7 control lines (RD, WR, CS, RDY, RST, DRQ, INTR). External address decoding circuitry can be used to generate CS out of the CPU address. Since the RPC uses its DRQ line to inform the system that data is needed, this signal can directly go to a DMA controller.

The video buffer interface 51 is essentially a dynamic memory interface: sixteen lines, VAD0-15, are used as address/data lines; another 5 lines are used for control signals (VRAS, VCAS, VWE, VR, VRFE). The video buffer interface provides all signals for a dynamic interface, including the line VRFE that can signal a refresh cycle. This signal can be used to select the RAS lines of all the memory banks for a common refresh. On the other hand, the font interface 52 provides static memory interface signals. It uses 16 address/data lines, FAD0-15 and 4 control lines, (FALE1, FALE2, FRD, FWR). No READY line is provided. If the memory that is used on this bus is not fast enough for a four-cycle access, it is necessary to program wait states using a control word CCW described below. The printer interface 53 uses 2 control lines (PSYNC, LSYNC), 1 video data line (VDO) and 1 video clock line (VCLK) for the externally generated video clock. Remaining lines not shown are used for power, ground, and processor clock.

As can be seen in FIG. 2, the RPC 10 includes CPU interface logic 54 which is adapted to communicate the four address lines, A0-A3, and five of the seven control lines to the host system bus. Two of the seven control lines are supplied at the output of the control logic 55 as discussed below. The CPU interface also includes a transceiver 56 for supply of data from the D0-15 bus to an internal bus FGA0-15 57.

The video interface 51 includes a video memory controller 58 for generating the five control signals on the interface 51. Also, the interface includes a transceiver 59 for sending and receiving data across the VAD0-15 bus for supply to and from the internal bus VGB0-15 60. The video memory controller 58 also receives data used for writing control registers across the internal FGA0-15 bus 57.

The printer interface 53 includes printer interface logic 61 for receiving the control signals and the video clock and for supplying the video data out.

The font interface 52 includes font interface logic 62 which supplies the four control signals and communicates with the FGA0-15 bus 57 and coordinates the address and data bus FAD0-15 through transceiver 63 for supply to and from the internal FGB0-15 bus 64. Also, a transceiver 65 is supplied for transferring data on the internal FGA0-15 bus 57 to and from the internal FGB0-15 bus 64.

Control words are written through the CPU interface 50 to the internal FGA0-15 bus 57 through transceiver 65 to the internal FGB0-15 bus 64 and finally, into register file 65. The register file includes an array of addressable registers storing control words and a data holding register located physically in the preferred embodiment on the barrel shifter 71. The register file has two output ports 66 and 67 which are connected to a two-port ALU 68. The two-port ALU 68 is used for calculations on the control words. The results of such calculations are supplied across line 69 to a second input port in the register file 65. The output of the ALU 68 is typically addresses generated in response to the operations by the controller 55. Such addresses are supplied, in some modes, across line 66 to a video address generator 70 which translates the addresses to row and column addresses for supply through the internal VGB0-15 bus 60, transceiver 59 and out on the video address data bus of the video interface 51.

The RPC 10 also includes a color combination/ barrel shifter block 71 which is connected to receive data across the internal FGB0-15 bus 64 and from the internal VGB0-15 bus 60. Data is typically supplied to color combination/barrel shifter block 71 in a read-modify-write operation and is aligned on bit boundaries for assembling data in the video band buffer.

The central control 55 of the RPC 10 provides overall control for the apparatus. The connection of the control signals is not shown in FIG. 2 to simplify the drawing. However, each functional block is connected to the central control means 55. The central control means 55 generates transaction control signals for supply to the ALU 68, the color combination/barrel shifter block 71, the video memory controller 58, the font interface 62, the CPU interface 54, the printer interface 61 and register file 65.

The control means 55 includes four state machines, including the scan control state machine 72, the band control state machine 73, the mode control state machine 74 and the transaction control state machine 75. Also, the control means 55 maintains a subset of the RPC control words in control registers 76. The state machines and the control means 55 generate control signals among each other as is described in detail below.

A specification for the interface in the preferred embodiment of the RPC is provided best by a description of the interface signals involved as set out in SECTION 2. Given the specification of the signals, the implementation of the CPU interface 54, video memory controller 58, printer interface 61 and font interface 62 is straightforward and will not be described here in order to simplify the description of the invention. Likewise, register file 65, ALU 68 and video address generator 70 are standard designs well within the skill of the art and are not described in detail. In a later section of the application, the implementation of the control means 55 is set out in detail as it provides the unique functional characteristics of the present invention.

SECTION 2: PIN DESCRIPTION

2.1 CPU INTERFACE SIGNALS

2.1.1 A0-A3 (ADDRESS BUS, INPUT)

This four bit address bus holds the RPC register address when the CPU performs a read or write access to internal RPC registers 65, 76. A0 is the least significant bit position and A3 is the most significant bit position. A0-A3 together with CS LOW conditions the RPC internal register decoding. A0-A3 must remain stable throughout that I/O transaction. A0-A3 is ignored by the RPC if CS is HIGH.

2.1.2 D0-D15 (DATA, INPUT/OUTPUT, 3-STATE)

This 16-bit data line is for data transfer between the RPC and the CPU bus. HIGH on the bus corresponds to "1" and LOW corresponds to "0". D0 is the least significant bit and D15 is the most significant bit for data.

2.1.3 RD (READ, INPUT)

This input is driven LOW by the CPU when the RPC register is required. While the RD input is LOW and READY output is HIGH, D0-D15 must be driven with valid data from the specified RPC register. After the RD input returns to its HIGH state, D0-D15 will float.

2.1.4 WR (WRITE, INPUT)

The CPU must drive the WR line LOW when an RPC register 65 is to be loaded with data. While WR is LOW, D0-D15 must be driven with valid data. The RPC latches the data into the specified register on the rising edge of WR.

2.1.5 RDY (READY, OUTPUT, OPEN DRAIN)

This output is normally HIGH. After CS has been driven LOW by the CPU and the data strobe, RD or WR is driven LOW, the RPC will drive RDY (or READY) LOW, if the RPC is busy so that the intended register is not accessible. When READY is driven HIGH, the RPC will place valid output data on D0-D15 lines while RD is driven LOW by the CPU or will accept data into the specified register upon the termination of the active WR pulse. When the READY is driven LOW, the RPC will keep it LOW until the RPC is ready to handle register access. If READY has been driven LOW and RD is LOW, the RPC will drive the READY output HIGH as soon as the intended register becomes accessible and the D0-D15 lines will be driven with valid data. If READY has been driven LOW and WR is LOW, the RPC will drive READY output HIGH as soon as the intended register becomes accessible and data will be loaded into the specified register.

2.1.6 RST (RESET, INPUT)

This is an asynchronous active LOW input which initializes the RPC. This input must be driven LOW for at least four clock cycles. After the initialization, the RPC will remain in the idle state until an operation mode is programmed and the appropriate registers are written to as well.

2.1.7 CS (CHIP SELECT, INPUT)

This input must be driven LOW whenever the CPU accesses an internal RPC register. This input should not be driven HIGH until all register accesses have been completed.

2.1.8 DRQ (DATA REQUEST, OUTPUT)

This output is driven LOW by the RPC whenever the RPC has completely dispatched one image block. In this case no data has to be read back by the CPU. Therefore only new data is required and this signal can directly go to a DMA-Controller (for example Am9516). An external DMA-controller can be operated in data-on-demand mode; DRQ will go HIGH as soon as the required number of control words is sent (after the falling edge of the WR signal for the last control word). For systems that do not use an external DMA-Controller, this signal can be used as an interrupt signal. Bit 1 of the first word of a command control word 0 described below is the dispatch complete bit (DC). This bit contains the same information as DRQ and can also be used by systems that prefer polling over the use of INTR and DRQ. If the RPC is used together with an external DMA-controller and the control words are written to the RPC, the internal register address does not need to be provided. In this case, external logic generates register address $0000_{BIN}$, the RPC generates addresses internally. Care has to be taken that data provided by the DMA-controller is in strict order. See FIG. 3 for a DMA configuration. This configuration is self-explanatory.

2.1.9 INTR (INTERRUPT, OUTPUT)

This output is driven LOW whenever the RPC requires the assistance of the CPU. INTR is driven HIGH as soon as the CPU reads the first word of a command control word described below. This word contains all the status information describing the current state of the operation. Reasons for INTR to be driven LOW are that an image block is sliced by the boundary of a video band, or that the dispatch logic has received a character that lies outside the currently dispatched band, or that the end of the currently printed page has been reached, or that a new Line Sync signal was encountered before the current line was scanned out. Interrupts can be disabled by setting the Interrupt Enable bit (IE) in a command control word to 0. A further description of the interrupts and the required CPU action can be found below.

2.1.10 CLK (CLOCK, INPUT)

The clock input provides the timing reference for all operations controlled by the RPC except printing. All memory operations on the font or video interfaces will occur relative to clock edges. Accesses on the CPU interface may be asynchronous to the clock.

2.2 VIDEO BUFFER INTERFACE SIGNALS

Figure 4:
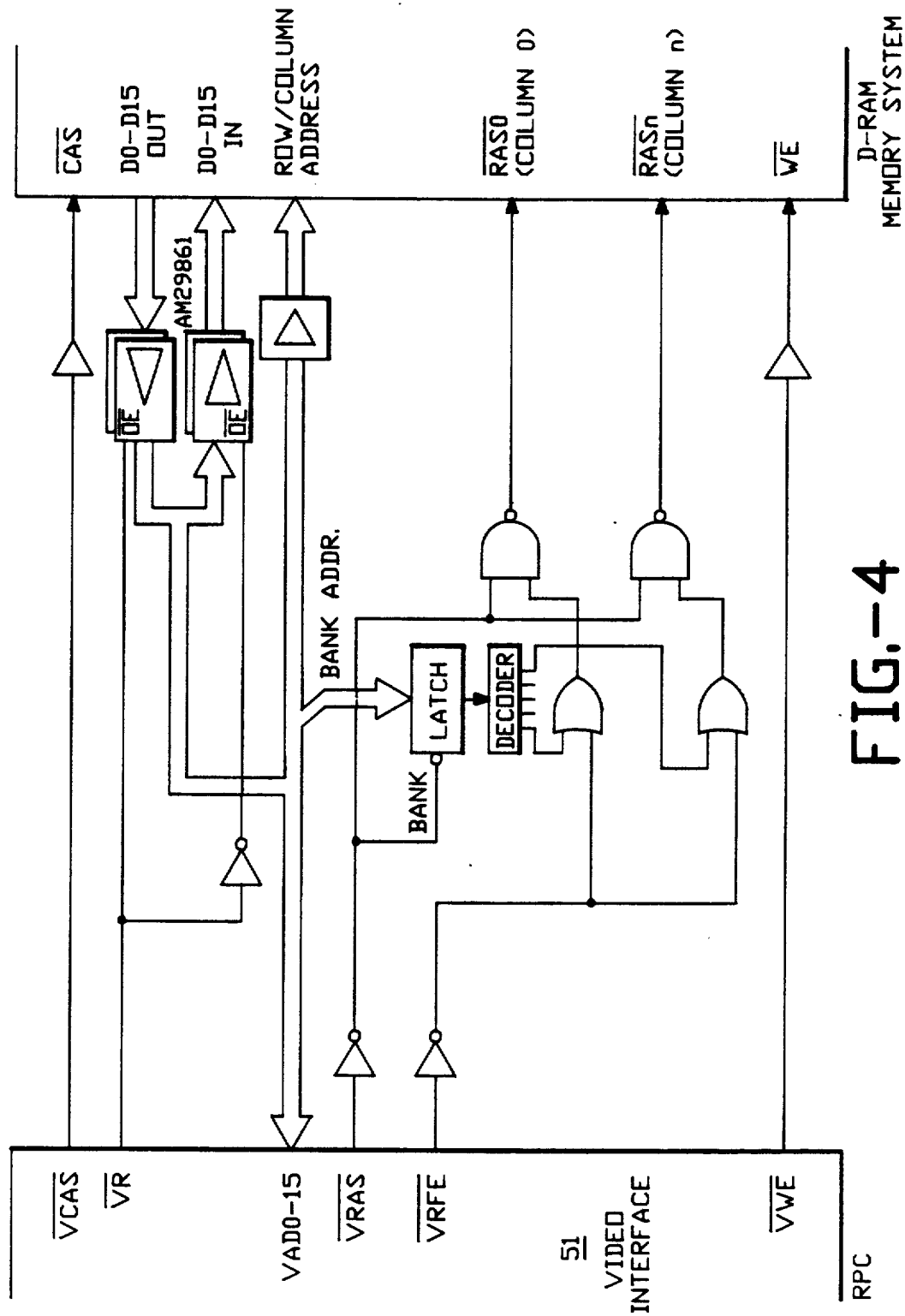
FIG. 4 is a diagram of the assembly interface configurations.
Figure 5:
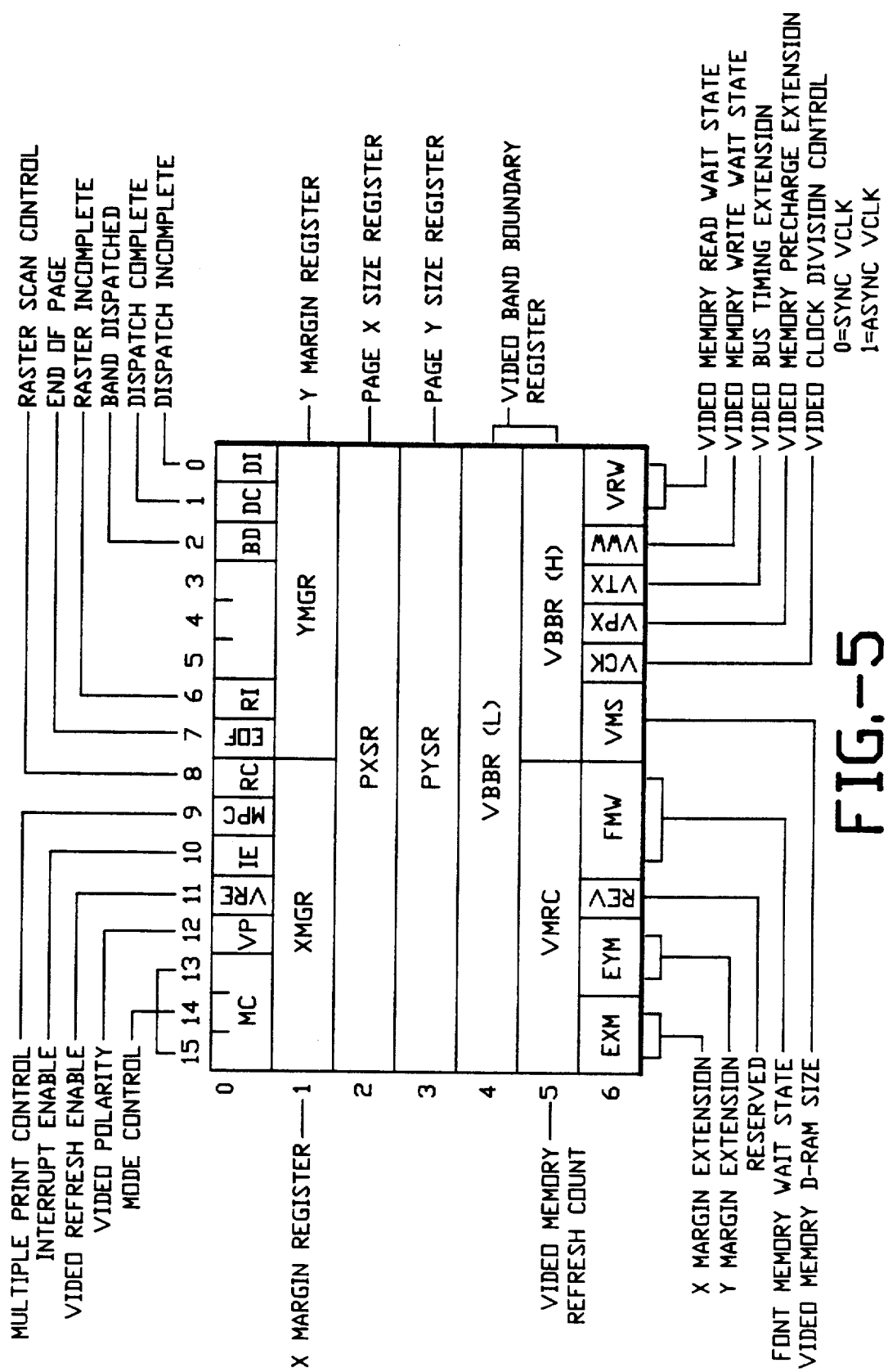
FIG. 5 is a diagram of the control command word.

The video buffer interface is for data transactions between the RPC and the video buffer. It has an on-chip DRAM controller (video memory controller 58, video address generator 70) which generates multiplexed row/column address, provides RAS and CAS for DRAM address latching and performs the refresh function. See FIG. 4 for a typical configuration. This figure is self-explanatory.

2.2.1 VAD0-VAD15 (ADDRESS, DATA BUS, INPUT/OUTPUT, 3-STATE)

VA0-VA15: This 16-bit address bus, sharing the VAD0-VAD15 pins with VD0-VD15, is for video buffer addressing. A HIGH on the bus corresponds to 1, and LOW corresponds to 0. VA0 is the least significant bit position and VA15 the most significant bit position. This 16-bit address consists of two portions: bank address and multiplexed row/column address. The VMS field in the control command word determines the boundary between these two portions. The table below shows the address designation under different DRAMs.

| VMS Field | Bank Address | Row/Col Address |
|---|---|---|
| 64Kxn DRAMs | VA8-VA15 | VA0-VA7 |
| 256Kxn DRAMs | VA9-VA15 | VA0-VA8 |
| 1Mxn DRAMs | VA10-VA15 | VA0-VA9 |

The VRAS (row address strobe) output will indicate that the bank address is valid and the row address in the row/col address lines is valid too. The VCAS (column address strobe) output will indicate that the column address in the row/col address lines is valid. The row address data on VA0-VA7 (VA8 or VA9) is valid during the HIGH to LOW transition of VRAS and so is the corresponding bank address data. The Column Address data on VA0-VA7 (VA8 or VA9) is valid during the HIGH to LOW transition of the VCAS output. During a refresh cycle VWE remains HIGH, VRFE remains LOW and VA0-VA9 hold the refresh row address (the RPC always provides ten bits of refresh address, rows 0 to 1023). This bus is tri-stated when the RPC does not access video buffer memory. The address generated is from a 24 bit linear address.

VD0-VD15: This 16-bit data bus is used for data input/output transactions for the video memory. A HIGH on the bus corresponds to 1 and LOW corresponds to 0. VD0 is the least significant bit position. Data is always transferred in 16-bit words. The VWE (write enable) output will indicate whether the bus is used for read or write data. During a write cycle, the VR signal remains HIGH. The VD0-VD15 lines will remain valid after the HIGH to LOW transition of the VWE output. During a read cycle VR is driven LOW. VWE remains HIGH and VD0-VD15 will contain valid input data until the LOW to HIGH transition of the VCAS output. During a read-modify-write cycle, initially VR is LOW. VWE stays HIGH to perform a read operation. VR is then driven HIGH to change external data transceiver direction and VWE is driven LOW to latch the data into DRAMs.

2.2.2 VRAS (ROW ADDRESS STROBE, OUTPUT, ACTIVE LOW)

A HIGH to LOW transition of the VRAS output indicates the multiplexed row/column address bus (VA0-VA7, VA8 or VA9) is used for row address. The row address, as well as the bank address will be valid during the HIGH to LOW transition of the VRAS output. Normally, the VRAS output will remain LOW until a current transaction is completed.

2.2.3 VCAS (COLUMN ADDRESS STROBE, OUTPUT, ACTIVE LOW)

A HIGH to LOW transition of VCAS indicates that the multiplexed row/column address is used for column address. The column address on the address bus (VA0-VA7, VA8 or VA9) will be valid during the HIGH to LOW transition of the VCAS output and also it will remain an appropriate time after the HIGH to LOW transition of the VCAS output. The VCAS output will remain LOW until a current transaction is completed.

2.2.4 VWE (WRITE ENABLE, OUTPUT, ACTIVE LOW)

This output line indicates that the RPC performs a read or a write operation. A HIGH indicates a read operation, i.e., data into the RPC and a LOW indicates a write operation, i.e., data from the RPC. The DRAMs are operated in late write mode. During a read cycle, the VWE must be driven HIGH prior to the HIGH to LOW transition of the VCAS output and will remain HIGH until the end of that video buffer bus cycle. During a write cycle, the VWE must stay HIGH prior to the HIGH to LOW transition of the VCAS output and after an appropriate time is driven LOW. VWE is later driven HIGH to strobe data into the DRAMs.

2.2.5 VR (VIDEO BUFFER BUS TRANSCEIVER CONTROL, OUTPUT)

VR is called the video buffer bus transceiver control line. It is an output line that goes to external bus drivers. Whenever the RPC reads data from the video buffer bus, this line goes LOW. At this time, external transceivers have to be set in a way that the address/data bus is driven with data from the memory.

Since the RPC has the address and data lines multiplexed, bus contention may occur during read cycles. The RPC still has its address data lines driven with the memory address, while the memory drives the same lines with data already. This is avoided with this line. The data transceivers remain in transmit mode until the RPC has removed the address and the A/D lines are inputs.

2.2.6 VRFE (VIDEO REFRESH ENABLE, OUTPUT)

The refresh enable output (active LOW) is used to inform the memory system that the current access is a refresh cycle. The signal can be used to control the bank decoder logic in a way such that RAS goes to all the memory chips when this signal is LOW. The RPC generates 1024 refresh addresses. The number of clock cycles between two refresh cycles is selected by the user and stored in a command control word called the video memory refresh counter.

2.3 FONT MEMORY BUS INTERFACE SIGNALS

2.3.1 FAD0-FAD15 (ADDRESS, DATA INPUT, OUTPUT)

This is the font address and data bus. It is multiplexed to provide the FA16-23 address signals, the FA0-15 address signals, the FD0-15 data signals as discussed below.

FA16-FA23 (ADDRESS, OUTPUT): This 8-bit bus is used for all font bus transactions. FA16 is the least significant bit position and FA23 is the most significant bit position, HIGH on the bus corresponds to 1 and low corresponds to 0. The address generated is a word address. These address lines are multiplexed with FAD0-FAD7. They represent the highest 8 bits of the 24-bit address. They are valid during the HIGH to LOW transition of the FALE2 output.

FA0-FA15 (ADDRESS, OUTPUT): This 16-bit bus is used for all Font Bus transactions. FA0 is the least significant bit position and FA15 is the most significant bit position. Together with FA16-FA23, these 16 bits form the 24-bit address. The address generated is a word address. These address lines are multiplexed on lines FAD0-FAD15 with FD0-FD15 and with FA16-FA23 (FAD0-FAD7 only). These 16 address lines are valid during the HIGH to LOW transition of the FALE1 output.

FD0-FD15 (DATA BUS, INPUT/OUTPUT): This 16-bit data bus, sharing the same lines FAD0-FAD15 as FA0-FA15 and FA16-FA23, is used for data input or output transaction for the font memory. A HIGH on the bus corresponds to 1 and LOW corresponds to 0. FD0 is the least significant bit position and FD15 is the most significant bit position. The usages of this data bus are indicated by FRD, FWR, FALE1 and FALE2.

2.3.2 FALE2 (ADDRESS LATCH ENABLE, OUTPUT)

When FALE2 is driven HIGH by the RPC, FAD0-FAD7 will contain the highest byte FA16-FA23 of the font memory address for that data transaction. The address (FA16-FA23) will be valid prior to the HIGH to LOW transition of FALE2 and will remain valid for an appropriate time after the HIGH to LOW transition of the FALE2 output.

During font reads for untextured dispatches with the font in font memory, or textured dispatches with the font in font memory and texture in video memory, FALE2 address cycle will be skipped if a 64K word boundary has not been crossed since the last font read.

2.3.3 FALE1 (ADDRESS LATCH ENABLE, OUTPUT)

When FALE1 is driven HIGH by the RPC, FAD0-FAD15 will contain the lower 16 bits FA0-FA15 of the font memory address for that data transaction. The address FA0-FA15 will be valid prior to the HIGH to LOW transition of FALE1 and will remain valid for an appropriate time after the HIGH to LOW transition of the FALE1 output.

2.3.4 FRD (READ, OUTPUT)

The RPC drives FRD LOW when font data is required. FRD going LOW indicates that the RPC wants to read font data. The signal is driven HIGH after completion of the data transaction. FRD and FWR are never driven LOW at the same time.

2.3.5 FWR (WRITE, OUTPUT)

The RPC drives FWR LOW when data is to be written to the font memory. FWR going LOW indicates that the RPC wants to write font data. The signal is driven HIGH after the data transaction is completed. FRD and FWR are never both driven LOW at the same time.

2.4 RASTER PRINTER SIGNALS

2.4.1 PSYNC (PAGE SYNC, INPUT, ACTIVE HIGH)

The PSYNC line is the request input used by the RPC to start a Y-Margin control operation. If the PSYNC input is driven HIGH, the RPC will start a Y-Margin process, skipping a number of lines until a specified margin is reached. The PSYNC input must be driven HIGH for a minimum of one VCLK cycle.

2.4.2 LSYNC (LINE SYNC, INPUT, ACTIVE HIGH)

The LSYNC input is used to synchronize the beginning of lines. If the LSYNC input is driven HIGH and the Y-Margin process is done, the RPC will start an X-Margin process for every scan line, counting a selected number of pixels until the X-margin is reached. The LSYNC input must be activated once per scan line.

2.4.3 VCLK (VIDEO CLOCK, INPUT)

This clock is used to generate the internal RPC video clock. If the user selects synchronous mode in the control command word, the VCLK input should have the frequency of the video data rate. If the user selects asynchronous mode instead, the VCLK input must be four times the frequency of the printer video data rate. The RPC uses an internal synchronization circuit to minimize the alignment error for the latter case.

2.4.4 VDO (VIDEO OUTPUT, OUTPUT)

VDO is the video image signal to be printed and is synchronous with the RPC internal video clock. For font data and data in the video memory, a logic 1 indicates a black pixel, a logic 0 indicates a white pixel. The printer interface, however, may be programmed to invert these signals depending on the state of the video polarity bit in a command control word.

SECTION 3: DESCRIPTION OF USER ACCESSIBLE RESOURCES

All commands and data are given to the RPC using three data blocks. These blocks are written to the RPC by the CPU over the CPU-bus. The three control blocks include the control command word, CCW, the source command words, SCW0, SCW1 and the destination command word DCW. Together they occupy 15 words of physical memory within the RPC. The address to these registers is either supplied by the host CPU on lines A0-A3 or, while using an external DMA controller, calculated by the RPC internally.

3.1 FIG. 5, THE CONTROL COMMAND WORD (CCW)

This word occupies 7 physical registers of memory. It is used to specify all control commands to the RPC. Basically it contains information associated with the printed page and status information. Specified are x-margin, y-margin, page size in x and y direction, and information describing the video band buffers. Other entries let the user specify the memory chips that are used externally. Wait states for transactions, video polarity, line-locked or free running Video Clock, multiple print control, and refresh conditions for DRAM can be determined.

3.1.1 CCW WORD 0

In the first word, bits 15, 14 and 13 are referred to as mode control bits MC. The following table indicates the possible bit combinations and assigned modes:

| Bit 15 | Bit 14 | Bit 13 |                    |
|--------|--------|--------|--------------------|
| 0      | 0      | 0      | Reset the RPC      |
| 0      | 0      | 1      | ORP Read Mode      |
| 0      | 1      | 0      | ORP Load Mode      |
| 0      | 1      | 1      | Dispatch Mode      |
| 1      | 0      | 0      | Font Load Mode     |
| 1      | 0      | 1      | Font Read Mode     |
| 1      | 1      | 0      | Graphics Load Mode |
| 1      | 1      | 1      | Reserved           |

Bit 12 of the first word of CCW is the video polarity control bit VP. This bit is set to 0 to specify that the High level of the video output signal VDO indicates black image and the low level is assigned to white. The VP-bit is set to 1 to specify that the high level of the video output signal VDO indicates white image and the low level indicates black image. In both cases, however, VDO remains high outside the printable area.

Bit 11 of the first word of CCW is the video refresh enable bit VRE. Normally VRE is set to 1, causing the RPC to refresh the video memory continuously, even if none of the operation modes is selected. Of course, the video memory refresh count, the video memory size bits, and the video memory wait state bits must be set to correct values.

Bit 10 of the first word of CCW is called the interrupt enable bit IE. This bit set to 0 means that the RPC will not generate any interrupts. In this configuration, the CPU has to poll the first word of CCW periodically to determine the state of an operation.

Bit 9 of the first word of CCW is called the multiple print control bit MPC. This bit set to 0 means single page print; set to 1 it means multiple page print. For a single page print, the RPC reads picture data from the video buffer, serializes it and sends it to the raster printer. Then the portion of the video buffer that was scanned out is overwritten with all zeros. This makes it impossible to print out the same page more than once. If MPC is set to 1, however, the video buffer is not overwritten, and the picture data remains intact for another print. After printing out the first page, the RPC stops the scan out. Now the same page can be printed again when the RC bit is set to 1. When a page is to be printed for the last time, MPC must be 0 to clear the video buffer for the next page. It should be noted, however, that multiple page print for a complete page is possible only with a video band large enough to contain a full page.

Bit 8 of the first word of CCW is called the raster scan control bit RC. Zero at this location means stop scan, 1 means start scan. This bit can be set or cleared by the CPU. It will be cleared by the RPC after completion of a page. It therefore also contains status information for the CPU. When the RPC is scanning out video data from video page buffer (RC=1), the CPU can change RPC operation modes to any mode specified in the MC mode control bits. This allows the RPC to work on new commands while it is scanning out video data.

Bits 7 through 0 of the first word of CCW are cleared after initialization by RST or after the software reset command is executed. They contain status information describing the outcome of a RPC operation and cannot be set by the user.

Bit 7 of the first word of CCW is called the end of page bit EOP. This bit indicates that the end of the currently printed page has been reached. Zero indicates that the end of the page has not been reached, 1 indicates that the end of the page has been reached. When this bit is set to 1, the RPC will generate an interrupt condition and will clear the RC bit to 0.

Bit 6 of the first word of CCW is called the raster incomplete bit RI. This bit indicates that the RPC was not able to scan out the full scan line before the next LSYNC signal was encountered. If this condition occurs, the RPC causes an interrupt, and sets RI to 1 and RC to 0. This condition signals a fundamental error that cannot be recovered from. Reasons for this error may be an incorrectly programmed page X size register (see description of the third word of CCW later in this section), a VCLK signal that is too slow or an incorrectly programmed video clock division control bit (see description of the seventh word of CCW later in this section).

Bits 5, 4 and 3 of the first word of CCW are reserved.

Bit 2 if the first word of CCW is the band dispatched bit BD. This bit indicates that the last character that has been sent by the CPU or an external DMA controller exceeded the band that was currently dispatched. This means that dispatching of the current band is completed. The last character (the one that causes BD to be raised), is not dispatched by the RPC. This now gives the CPU the opportunity to send all the characters that were sliced from the previous band. The character causing BD to be raised has to be sent again, otherwise it is not dispatched.

After setting this bit to 1, the RPC will generate an interrupt condition.

Bit 1 of the first word of CCW is the dispatch complete bit DC. This bit goes to 1 whenever the RPC is able to dispatch the last image block completely. When this bit is set to 1, the RPC will generate the DRQ signal.

Bit 0 of the first word of CCW is the dispatch incomplete bit DI. Under normal conditions, this bit is 0. The RPC sets this bit to 1 whenever it is not able to completely dispatch an image block. This situation occurs when the image block is sliced by the video band. Slicing means that the number of scan lines covered with this character (source image height) is larger than the number of scan lines that are below the starting point of the character. After dispatching as many words as indicated by the source image width, the control logic calculates the new start address for the next scan line and decrements the source image height. If the start address of the scan line exceeds the band boundary VBB or 2VBB, but the source image height has not reached zero yet, the character is sliced. When this bit is set to 1, the RPC will generate an interrupt condition.

3.1.2 CCW WORD 1

The second word of CCW contains both the X-margin register XMGR and the Y-margin register YMGR. Bits 15 to 8 represent the X-margin, with bit 15 being the most significant bit and bit 8 the least significant bit. Bits 7 to 0 represent the Y-margin, with bit 7 being the most significant bit, and bit 0 the least significant bit. The X-margin specifies a distance between the rising edge of the LSYNC input and the rising edge of the first video output of each scan line. The Y-margin specifies a distance between the rising edge of the PSYNC input and the first scan line containing print information.

The X-margin can take values from 0 to 255 pixels. In cases where this is not enough, the margin can be extended by using the Extend X-Margin bits. These bits are found in the seventh word of CCW (bits 15, 14). If not needed, the extended X-margin bits must be initiated with zeros.

The Y-margin can take values from 1 to 255 scan lines. In cases where this is not enough, the margin can be extended by using the extend Y-margin bits. These bits are found in the seventh word of CCW (bits 13, 12). With these bits, the Y-margin register extends to 10 bits, with bit 13 of the seventh word of CCW being the most significant bit.

3.1.3 CCW WORD 2

The third word of CCW is called the page X-size register PXSR. With this register, the user specifies the size of the printable area in x direction in pixels. Values between 0 and 65535 can be specified. It should be noted that for our purposes, x direction is always specified as the main scan direction of the raster printer (the direction the raster beam goes). The y-direction is the subscan direction (the direction the drum turns).

3.1.4 CCW WORD 3

The fourth word of CCW is called the page Y-size register PYSR. This 16-bit register has to be set to the total number of scan lines that have to be printed. It does not include the area covered by the Y-margin register.

3.1.5 CCW WORD 4

The fifth word of CCW, together with the lower 8 bits (bits 7–0) of the sixth word of CCW form the video band boundary register VBBR. Bit 7 of the sixth word of CCW is the most significant bit of the video band boundary register, bit 0 of the fifth word is the least significant bit of the video band boundary register. This 24-bit value is the start address of the second video band. By definition, the RPC assumes that the first video band starts at address $000000_{HEX}$. The start of the second band, however, depends on the size of this band and needs to be specified. The band has to start on a word boundary.

3.1.6 CCW WORD 5

The sixth word of CCW contains the video memory refresh count VMRC, bits 15–8. Bit 15 is the most significant bit, bit 8 the least significant bit of the video memory refresh count. The specified value defines the number of clock cycles to elapse between two refresh cycles. This value depends on the size and the required refresh interval of the DRAM chips used as video memory and the clock frequency the RPC is operated with. The following example should illustrate the use of this value. For 64K DRAM chips, 256 different row addresses have to be generated for a complete refresh. Assuming that the memory has a specified refresh interval of 2ms, the RPC has to perform one refresh cycle every 7.8 µs. For a clock rate of 12 MHz this translates to one refresh cycle for every 93 clock cycles. Therefore, the video memory refresh counter has to be programmed with the value 93.

Bits 0 to 7 of the sixth word of CCW contain the higher part of VBBR as already described.

3.1.7 CCW WORD 6

The seventh word of CCW contains the extend X-margin bits EXM (bits 15, 14) and the extend Y-margin bits EYM (bits 13, 12). The purpose of these two bits has already been described in the paragraph dealing with the second word of CCW.

Bit 11 of the seventh word of CCW is reserved.

Bits, 8, 9 and 10 are called font memory wait state bits FMW. Bit 10 is the most significant bit, bit 8 the least significant bit. The number specified by these bits is the number of wait states (0 to 7) that the RPC has to insert for all transactions with the font memory.

Bits 6 and 7 are called video memory size bits VMS. They must be programmed to correspond to the type DRAM that is connected to the video memory, according to the table below:

| bit 7 | bit 6 | |
|---|---|---|
| 0 | 0 | 64Kxn (8 multiplexed address lines) |
| 0 | 1 | 256Kxn (9 multiplexed address lines) |
| 1 | 0 | 1Mxn (10 multiplexed address lines) |
| 1 | 1 | Reserved |

Bit 5 is called the video clock division control bit VCK. This bit indicates whether the LSYNC signal is synchronous or asynchronous to the VCLK input. This bit set to 0 stands for synchronous LSYNC; set to 1, it stands for asynchronous LSYNC. For a LSYNC synchronous to the VCLK signal, the frequency has to be the video frequency required by the raster printer. For a LSYNC that is asynchronous to the VCLK signal, VCLK has to be four times the video frequency required by the raster printer.

Bit 4 is called the video memory precharge extension bit VPX. When this bit is 0, no precharge extension cycle will be added to normal video memory bus cycle. When it is a 1, the video memory bus cycle will be extended by one cycle.

Bit 3 is called the video buffer bus timing extension bit VTX. When this bit is set to 0, normal bus timing on the video buffer bus is selected. If this bit is set to 1, the row and bank address timing is extended by one cycle to allow more time for latching the bank address and decoding it.

Bit 2 is called the video memory write wait state bit VWW. When this bit is set to 0, no wait state will be inserted for video memory write cycle. When it is set to 1, the RPC will insert one wait state for video memory write cycle.

Bits 0 and 1 are called video memory read wait state bits VRW. Bit 1 is the most significant bit, bit 0 the least. The number specified by these bits is the number of wait states (0 to 3) that the RPC has to insert for all read transactions with the video buffer memory.

3.2 THE SOURCE COMMAND WORDS (SCW0, SCW1) FIGS. 6 & 7

Figure 6:
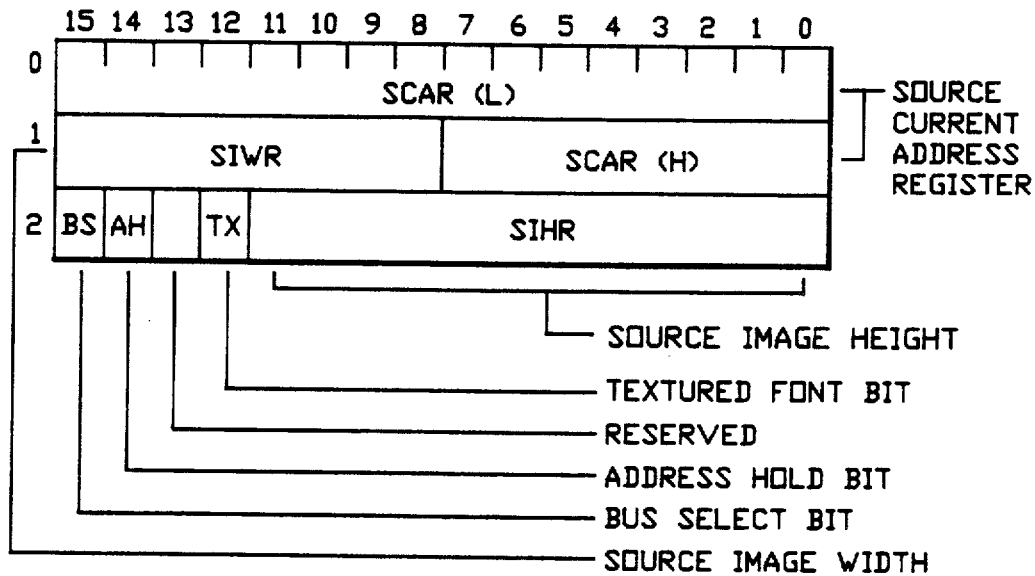
FIGS. 6 and 7 are diagrams of source command word 0 and source command word 1, respectively.
Figure 7:
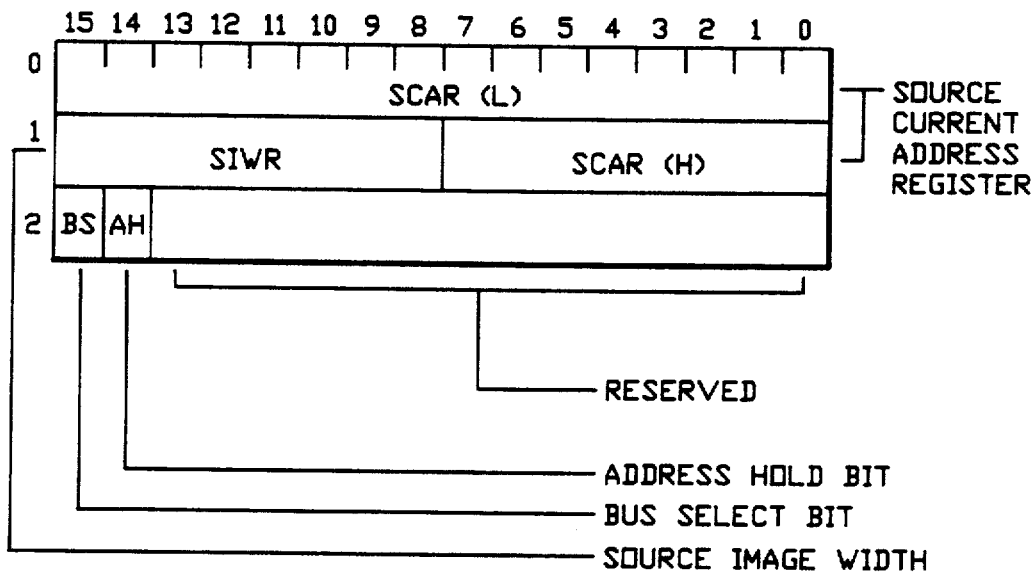
Figure 8:
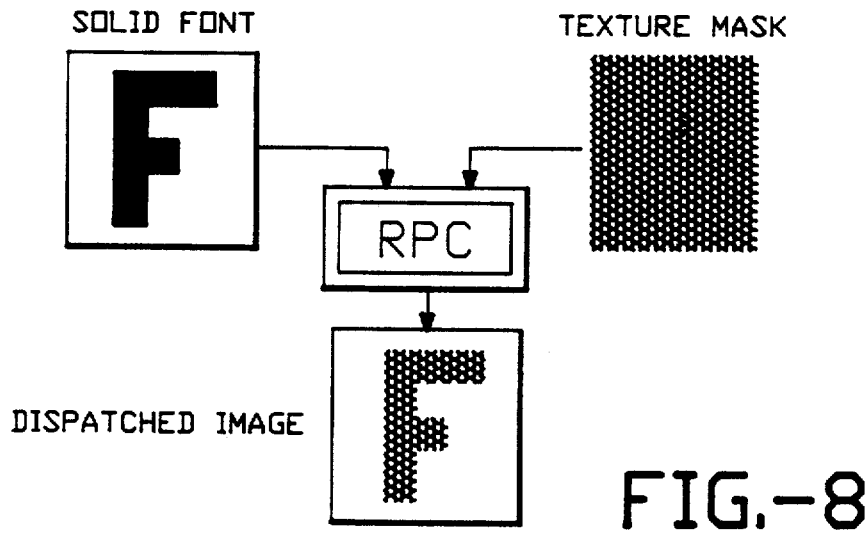
FIG. 8 illustrates the combination of texture and font.
Figure 9:
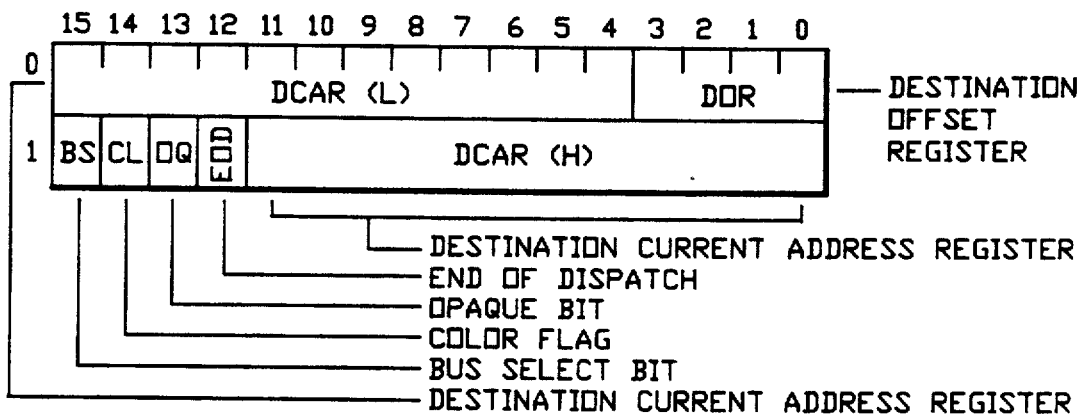
FIG. 9 is a diagram of the destination command word.

FIGS. 6 and 7 show the source command words SCW0 and SCW1, respectively. Each occupies three registers of physical memory. Their main purpose is to supply information about the source data for dispatch mode. In a standard application one source command word SCW0 must be supplied per font character. If a character must be textured (see FIG. 8), then a second source command word SCW1 will be supplied, pointing to the texture font.

3.2.1 SCW WORD 0

The first word of SCW0 and SCW1 contains the lower part of the source current address SCAR(L) for an image block and texture block, respectively. The lower byte of the second words of SCW0 and SCW1 (bits 0–7) contain the upper part of this address SCAR(H). Bit 7 of the second word is the most significant bit, bit 0 of the first word the least significant bit of the source current address register SCAR. This address points to the start of the bit-map of a given image block. The address is automatically incremented after every source access, provided the address hold bit AH, bit 14 of the third word of SCW0 and SCW1, is set to 0. If AH is set to 1, the address is not incremented and therefore the RPC repeats the same source data for all accesses to the destination.

3.2.2 SCW WORD 1

The second word of SCW0 and SCW1 contains the higher part of the source current address as explained in the description of the first word of SCW0 and SCW1. Apart from that, it also contains the source image width register SIWR. This is an 8-bit field with bit 15 as the most significant bit and bit 8 as the least significant bit. The source image width is the width of the source image block for dispatch mode. Widths of up to 255 words (4080 pixels) can be specified. The RPC will decrement its working copy of SIWR after each source transaction and will decrement the source image height when the working copy of SIWR reaches 0. The source image width of the texture font (in SCW1 has to be greater than or equal to the source image width of the character font (in SCW0). The RPC will treat the character font as dominant and will move to the next scan line as soon as the source image width in SCW0 is exhausted. The start address for the next scan line of the texture font will be calculated using the source image width in SCW1, provided that the AH-bit in SCW1 is set to 0.

For graphics load mode, the source image width of SCW0 has to be loaded with the number of words that have to be transferred per scan line. If an image has to be transferred that is wider than 4080 picture elements, the CPU must then transfer this block using more than one image block.

3.2.3 SCW WORD 2

The third word of SCW0 contains the source image height SIHR. Bit 11 is the most significant bit, bit 0 the least significant bit of this field. With this 12-bit field, image block heights of up to 4095 scan lines can be specified. There is no SIHR in SCW1 for textured blocks. The RPC decrements the SIHR value after each scan line dispatched. This value reaches 0 after the last scan line of the image block has been dispatched.

The height of a texture font in SCW1 must be greater than or equal to the source image height of the corresponding character font in SCW0 unless the AH bit in SCW1 is set.

Bit 12 of the third word of SCW0 is called the texture font bit (TX). This bit set to 0 indicates a non-textured character. In this case, the RPC expects the destination command word DCW to be sent immediately after SCW0. This bit set to 1 indicates that the image block has to be textured. In this case the RPC expects SCW1 to be sent after SCW0 but before DCW.

Bit 14 of the third word of SCW0 and SCW1 is the address hold bit AH. It is set to 0 for normal image block dispatch. In this case, the source current address is incremented after every source access. If this bit is set to 1, the address hold mode is enabled and the source current address remains the same for all source accesses. This mode is used for forms generation or hatching. An area of 4080 pixels by 4095 lines can be covered with a pattern with one dispatch image block. For this the source current address has to point to the word that contains the pattern, the address hold bit must be set to 1, and both source image width and source image height must be set to maximum values. The RPC repeats this image block over 255 words in x-direction and over 4095 lines in y-direction. This is especially useful for printing a large black background area. It is possible to enable address hold for the texture only. This allows the user to texture a full-sized character with a texture of a single word that is constantly repeated.

Bit 15 of the third word of SCW0 and SCW1 is the bus select bit BS. It is used to determine what bus the source current address is pointing to. This bit is set to 0 for data on the font bus and is set to 1 for data on the video buffer bus. It has to be noted that although the source data can reside in the video buffer allowing dispatch mode from video buffer to video buffer, dispatch mode from video buffer to font memory is not possible.

3.3 THE DESTINATION COMMAND WORD (DCW) FIG. 9

This word occupies 2 physical registers in memory. It describes the parameters of the destination in dispatch mode, as well as access parameters for graphics load mode, font load mode and font read mode. Space is provided for the destination address, the offset, the color to be used for printing (black or white), the opaque overwrite, and the bus the destination resides on. In these modes of operation, the CPU reads data from the RPC using address $0000_{BIN}$ and also writes to the same address. The RPC automatically increments the memory address after each transaction.

3.3.1 DCW WORD 0

The four least significant bits of the first word of DCW (bits 0–3) contain the destination offset register DOR. For dispatch mode and graphics load mode, image blocks can start on a bit-boundary, rather than on a word boundary. The destination current address only points to the word that is to be modified with the first word of font (in the case of dispatch mode) or graphics data (in the case of graphics load mode). The destination offset indicates how many positions to the right this font or graphics word has to be shifted from the word boundary. Bit 3 of the first word of DCW is the most significant bit of this value; bit 0 is the least significant bit. Values between 0 to 15 can be specified. For font read mode or font load mode, the DOR must be set to 0000$_{BIN}$.

Bits 4 to 15 of the first word of DCW contains the lower part of the destination current address DCAR(L). The lower 12 bits of the second word of DCW (bits 0-11) contain the upper part of this address DCAR(H). Bit 11 of the second word is the most significant bit, and bit 4 of the first word is the least significant bit of the destination current address. After the address conversion in dispatch mode, this address points to the virtual address in the video buffer where the first word of the source will be stored. This address is automatically recalculated by the RPC after every transfer.

For the transparent modes, this 24-bit address has to be loaded by the CPU with the first address that will be used for transparent read or write accesses. It is then automatically incremented by the RPC.

3.3.2 DCW WORD 1

The second word of DCW (bits 0-10) contains the higher part of the destination current address as explained in the description of the first word of DCW.

Bit 12 of the second word of DCW is the end of dispatch EOD bit. The presence of this flag overrides all other information in the control word 5 registers and triggers an internal operation in the RPC. This sequence indicates that the last dispatch of a page has been completed and allows the next dispatch operation to begin the next page, even if multiple blank bands are required to complete printing of the current page. The RPC will automatically shift out "white" pixels until the correct page Y size is reached.

The EOD flag may be set by explicitly writing the DCW or by writing a "dummy" dispatch sequence of the five words of SCW and DCW. The RPC automatically initiates an operation after the last word is written. In the EOD case, it will be the internal operation that sets up for the next band and adjusts internal registers. Both words of DCW should be written to insure that the DMA request output is controlled correctly. The next DRQ may not occur until printing has progressed to the band marked by the EOD.

Figure 10:
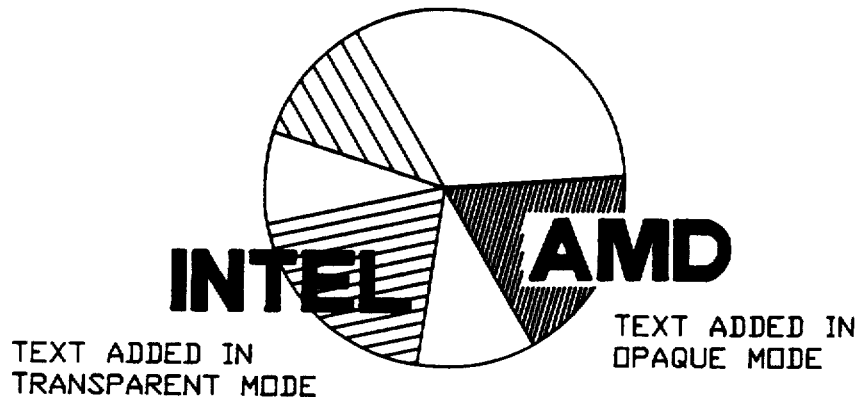
FIG. 10 illustrates transparent and opaque overwrites.

Bit 13 of the second word of DCW is called the opaque bit OQ. This bit specifies whether the "white" information in a font is considered to be transparent (the background shines through), or opaque (the background is overwritten with white). Logic 0 stands for transparent overwrite, logic 1 for opaque overwrite. FIG. 10 illustrates the difference between these two modes. This bit is not used for font read mode or font load mode.

Bit 14 of the second word of DCW is called the color flag CL. It is used to specify the "color" (black or white), with which the current image must be printed. 0 stands for black printing, 1 for white printing. It should be noted that a large area can be painted black first with just one image block by enabling the address hold feature (see description of the source command word). The following table shows the different combinations of color bit, opaque bit and different values of font, background, and texture. These tables only apply for the area actually covered with the dispatched information. If a destination offset other than 0 is specified, the area in the first word of every scan line that is before the offset position and the area in the last word of every scan line that is after the offset position are not modified.

| Background | Font | Opaque | Color | Texture | Resulting color |
|---|---|---|---|---|---|
| 0 | 0 | 0 | 0 | 0 | 0 |
| 0 | 0 | 0 | 0 | 1 | 0 |
| 0 | 0 | 0 | 1 | 0 | 0 |
| 0 | 0 | 0 | 1 | 1 | 0 |
| 0 | 0 | 1 | 0 | 0 | 0 |
| 0 | 0 | 1 | 0 | 1 | 0 |
| 0 | 0 | 1 | 1 | 0 | 1 |
| 0 | 0 | 1 | 1 | 1 | 1 |
| 0 | 1 | 0 | 0 | 0 | 0 |
| 0 | 1 | 0 | 0 | 1 | 1 |
| 0 | 1 | 0 | 1 | 0 | 1 |
| 0 | 1 | 0 | 1 | 1 | 0 |
| 0 | 1 | 1 | 0 | 0 | 0 |
| 0 | 1 | 1 | 0 | 1 | 1 |
| 0 | 1 | 1 | 1 | 0 | 1 |
| 0 | 1 | 1 | 1 | 1 | 0 |
| 1 | 0 | 0 | 0 | 0 | 1 |
| 1 | 0 | 0 | 0 | 1 | 1 |
| 1 | 0 | 0 | 1 | 0 | 1 |
| 1 | 0 | 0 | 1 | 1 | 1 |
| 1 | 0 | 1 | 0 | 0 | 0 |
| 1 | 0 | 1 | 0 | 1 | 0 |
| 1 | 0 | 1 | 1 | 0 | 1 |
| 1 | 0 | 1 | 1 | 1 | 1 |
| 1 | 1 | 0 | 0 | 0 | 0 |
| 1 | 1 | 0 | 0 | 1 | 1 |
| 1 | 1 | 0 | 1 | 0 | 1 |
| 1 | 1 | 0 | 1 | 1 | 0 |
| 1 | 1 | 1 | 0 | 0 | 0 |
| 1 | 1 | 1 | 0 | 1 | 1 |
| 1 | 1 | 1 | 1 | 0 | 1 |
| 1 | 1 | 1 | 1 | 1 | 0 |

The following table shows the different combinations when no texture font (no SCW1) is used.

| Background | Font | Color-bit | Opaque-bit | Result |
|---|---|---|---|---|
| 0 | 0 | 0 | 0 | 0 |
| 0 | 0 | 0 | 1 | 0 |
| 0 | 0 | 1 | 0 | 0 |
| 0 | 0 | 1 | 1 | 1 |
| 0 | 1 | 0 | 0 | 1 |
| 0 | 1 | 0 | 1 | 1 |
| 0 | 1 | 1 | 0 | 0 |
| 0 | 1 | 1 | 1 | 0 |
| 1 | 0 | 0 | 0 | 1 |
| 1 | 0 | 0 | 1 | 0 |
| 1 | 0 | 1 | 0 | 1 |
| 1 | 0 | 1 | 1 | 1 |
| 1 | 1 | 0 | 0 | 1 |
| 1 | 1 | 0 | 1 | 1 |
| 1 | 1 | 1 | 0 | 0 |
| 1 | 1 | 1 | 1 | 0 |

Bit 15 of the second word of DCW is the bus select bit BS for the font read and font load modes. "0" stands for video buffer bus, "1" for font bus. This indicates which bus is to be used for transparent modes. For dispatch, graphics load and ORP modes, this bit is ignored.

3.4 TRANSACTIONS WITH THE USER-ACCESSIBLE RESOURCES

All transactions between the CPU and the RPC are by the CPU writing to or reading from the RPC's internal registers. If the CPU requires access to data in the video buffer or the font memory, then it must get it via one of the RPC's transparent modes described below. Only one mode can be programmed at any one time; therefore, it is not possible to perform transparent accesses while the RPC is in dispatch mode.

Source and destination command words should only be written after the data request signal has been raised by the RPC. The control command word should be written before the first source and destination command word. Bit 0 of the first word of CCW (raster scan control bit) will be set to 0 for the first video band. The first word of CCW can be rewritten to the RPC, this time with bit 0 set to 1. This writing however, can only occur after the RPC has set the BD-bit and before writing the next source or destination command word. Not complying with these rules leads to unpredictable errors at print time.

3.5 DATA HANDLING AND FORMATS

3.5.1 DATA ON THE CPU INTERFACE

All data transferred on the CPU but must be 16 bits wide. This is true for the command words as well as for data words in transparent modes. If the CPU wants to load data down to the video buffer (within or outside the video buffer bands) it must do it prior to the dispatch mode. This means that it is not directly possible to print one full page of graphics without having a full page video band buffer. It is, however, possible to load a block of graphics somewhere to the font memory or the video buffer and then use dispatch mode to transfer this block to the video band buffer during printing. This procedure is extremely useful when certain graphic blocks are used again and again (e.g., letterhead, company logo, etc.).

3.5.2 GRAPHICS AND FONT DATA

The data format for graphics blocks that are loaded over one of the transparent modes and the data format for font data is essentially the same. The image block width (or the graphics block width) has to be in increments of 16 bits. Scanning is from left to right and from top to bottom. The first word of the character or the graphics block is the top left word. This is the word to which the source current address points. All words of the first scan line follow this word. The words for the second and all the following scan lines follow directly without any end of line codes or spaces. The table below shows the relation between image block and memory words for an image block with lines 2 words long.

| Actual Image Block fedcba9876543210fedcba9876543210 | | | Font Memory fedcba9876543210 | |
|---|---|---|---|---|
| A | BC | D | A | B |
| E | FG | H | C | D |
| I | JK | L | E | F |
| M | NO | P | G | H |
| Q | RS | T | I | J |
| U | VW | X | K | L |
| | | | M | N |
| | | | O | P |
| | | | Q | R |
| | | | S | T |
| | | | U | V |
| | | | W | X |
| | | | MSB | LSB |

It should be noted that the top left bit of the font or the graphics block is assigned to the most significant bit in memory. For a system where font data resides in interchangeable font cartridges, it is possible to store characteristic information about the font (e.g., name of the font, lookup tables for the bit-map starting positions, lookup tables for the character size, etc.), in the font cartridge. The RPC is not affected by this data but the CPU can read it using the font read mode.

3.6 CONTROL WORD ADDRESS ASSIGNMENT

| Address A0–A3 | Control Word |
|---|---|
| 0000 | Transparent/Fly-By Register |
| 0001 | CCW(0) |
| 0010 | CCW(1) |
| 0011 | CCW(2) |
| 0100 | CCW(3) |
| 0101 | CCW(4) |
| 0110 | CCW(5) |
| 0111 | CCW(6) |
| 1000 | SCW0(0) |
| 1001 | SCW0(1) |
| 1010 | SCW0(2) |
| 1011 | SCW1(0) |
| 1100 | SCW1(1) |
| 1101 | SCW1(2) |
| 1110 | DCW(0) |
| 1111 | DCW(1) |

3.7 CALCULATING SOURCE AND DESTINATION ADDRESSES

The source and destination current addresses for SCW and DCW are calculated by the CPU. Calculating the source current address is entirely up to the CPU. The organization of the font memory and the use of the part of the video memory that is not used for the video band buffer is up to the system designer. The source current address supplied in the SCW has to point to the first word containing the bit-mapped information that has to be dispatched.

The destination address in dispatch mode is a virtual address. There are some rules to be followed for the calculation. One example will illustrate them:

We want to print an image block whose top left corner is supposed to be in position X,Y. This stands for X pixels in main scan direction from the top left pixel of the page and Y scan lines in sub-scan direction from the top left pixel of the page. The top left pixel is the first pixel that is actually scanned out, its X,Y address is 0,0. Depending on the margins this is not necessarily the top left corner of the page. The CPU now has to translate this X,Y address into a virtual memory address. Our page is PXSR pixels wide. PXSR is specified in pixels. The number of 16-bit memory words that are used per scan line is therefore PXSR/16 rounded to the next higher integer. This value is a constant for the whole page. This constant is multiplied by Y. This gives the memory address for the first word of scan line y. Our X divided by 16 (integer part only) is to be added to this value. The four least significant bits of X are directly the destination offset for this image block. This address is a real memory address in cases only where a full bit-map of memory is available. In cases where bands smaller than a full page are used, this is a virtual address. The RPC automatically calculates the physical memory address out of a virtual memory address.

SECTION 4: DETAILED FUNCTIONAL DESCRIPTION OF INTERFACE OPERATIONS

4.1 CPU ACCESS OPERATIONS

The procedures by which an RPC register is accessed by the CPU are as follows:

4.1.1 CPU READ ACCESS OPERATION:

1) The CPU places an address A0-A3 on the CPU bus that specifies the intended register.
2) The CPU address decoder (external to the RPC) drives the CS input LOW. This selects the RPC as slave.
3) The CPU will drive the RD input LOW.
4) The RPC will drive the READY output LOW such that the intended register cannot be accessed immediately.
5) The RPC READY output will be driven HIGH when the RPC register data becomes available.
6) D0-D15 will be driven by the RPC with valid data.
7) The CPU will drive the RPC RD input HIGH.
8) The CS input will be driven HIGH. Further read accesses can be initiated by executing step 1).

Note: If READY is driven LOW and step 7) precedes step 5), the read access will be aborted by the CPU. A read to the first word of CCW, containing status information should not be aborted since a read access and a read access aborted in a late stage will clear the status bits.

If a read access is aborted during font read mode, the CPU will have to reprogram the destination current address before continuing font read mode.

If the read access is aborted, READY will be driven HIGH and D0-D15 will float. Further read accesses can be initiated by executing step 1).

4.1.2 CPU WRITE ACCESS OPERATION

1) The CPU places an address A0-A3 on the CPU bus that specifies the intended register.
2) The CPU address decoder (external to the RPC) drives the CS input LOW. This selects the RPC as slave.
3) The CPU will drive the WR input LOW.
4) D0-D15 will be driven by the CPU with valid data.
5) The RPC will drive the READY output LOW such that the intended register cannot be accessed immediately.
6) The RPC READY output will be driven HIGH when the RPC register becomes available.
7) The CPU will drive the RPC WR input HIGH.
8) The CS input will be driven HIGH. Further write accesses can be initiated by executing step 1).

Note: If the READY output is driven LOW and step 7) precedes step 6), the write access will be aborted. If a write access is aborted during Font Load Mode or Graphics Load Mode, the CPU will have to reprogram the destination current address before continuing Font Load Mode or Graphics Load Mode.

If the write access is aborted, READY will be driven HIGH. The contents of the specified register will not be guaranteed. Further write access can be initiated by executing step 1).

4.1.3 CPU FLY-BY WRITE ACCESS

After the RPC raises DRQ, an external DMA Controller can use the built-in fly-by capability of the RPC. Fly-by is only possible to write SCW0, SCW1, and DCW to the RPC after DRQ. In fly-by mode, external logic has to tie the RPC address A0-A3 to $0000_{BIN}$, logic internal to the RPC calculates the correct internal address. The access procedure and timing is exactly the same as for a normal CPU access.

4.2 VIDEO BUFFER OPERATIONS

The procedures by which the RPC executes video buffer access operations are as follows:

4.2.1 VIDEO BUFFER READ ACCESS OPERATION

1) The RPC places a bank address and a row address on the address bus VAD0-15
2) The RPC will drive VRAS LOW. If the video timing extension bit in CCW is set, one extension cycle is inserted.
3) After an appropriate time, VAD0-VAD7 (VAD8, or VAD9) will be driven with a column address by the RPC.
4) The VCAS line is driven LOW by the RPC. After an appropriate time, the RPC will float the address bus VAD0-15 and drive VR LOW.
5) If zero wait state is programmed in the VRW field of CCW, the RPC will capture input data through the data bus VD0-VD15. If the user has programmed nonzero read wait states, the RPC will insert wait states accordingly.
6) VR returns to HIGH.
7) The RPC drives VCAS HIGH.
8) The RPC drives VRAS HIGH.
9) The RPC inserts one precharge cycle.
10) Before executing a new cycle, the RPC will insert a wait state according to the VPX bit to extend the precharge time required by the slower DRAMs.

4.2.2 VIDEO BUFFER WRITE ACCESS OPERATION

1) The RPC places a bank address and a row address on the bus VAD0-15.
2) The RPC will drive VRAS LOW. If the video timing extension bit in CCW is set, one extension cycle is inserted.
3) After an appropriate time, VAD0-VAD7 (VAD8 or VAD9) will be driven with a column address by the RPC.
4) The RPC drives the VCAS line LOW. After an appropriate time, the RPC will drive the bus with the output data. Then the RPC drives VWE LOW.
5) If the VWW bit is set to 1 (CCW6, bit 2), the RPC will insert a wait state accordingly.
6) VRAS and VCAS return to HIGH.
7) VWE is driven HIGH by the RPC.
8) The RPC inserts one precharge cycle.
9) Before executing a new cycle, the RPC will insert a wait state according to the VPX bit to extend the precharge time required by the slower DRAMs.

4.2.3 VIDEO BUFFER READ-MODIFY-WRITE ACCESS OPERATION

1) The RPC places a bank address and a row address on the address bus.
2) The RPC will drive VRAS LOW. If the video timing extension bit in CCW is set, one extension cycle is inserted.
3) After an appropriate time, VAD0-VAD7 (VAD8 or VAD9) will be driven with a column address by the RPC.
4) The VCAS line is driven LOW by the RPC.
5) After an appropriate time, the RPC will float the bus and drive VR LOW.
6) If zero wait states are programmed in the VRW field of CCW, the RPC will capture input data. If the user has programmed nonzero wait states, the RPC will insert wait states accordingly.

7) The RPC drives VR HIGH.
8) The RPC places output data on VAD0-VAD15.
9) The RPC drives VWE LOW.
10) If there are nonzero write wait states programmed, the RPC will insert a wait state accordingly.
11) VRAS and VCAS return to HIGH.
12) VWE returns to HIGH.
13) The RPC floats the data bus.
14) Before executing a new cycle, the RPC will insert a wait state according to the VPX bit to extend the precharge time required by the slower DRAMs.

4.2.4 VIDEO BUFFER REFRESH OPERATION

The user programs the DRAM refresh period in the VMRC field of the command control word. The RPC controller 55 has an internal counter that keeps track of the number of clock cycles elapsed from the last refresh operation. When this counter reaches the number specified in the VMRC field, the refresh circuitry will raise a refresh request. In addition the RPC controller 55 has a 10-bit internal refresh row address register. This register is reset to 0 upon the hardwired RESET, and is incremented by 1 after each refresh operation. The RPC will always provide 10 bits of refresh address (1024 rows). The refresh procedure is as follows:

1) The RPC places a refresh row address on the address bus VAD0-VAD15 and drives the VRFE line LOW.
2) The RPC drives the VRAS line LOW.
3) After an appropriate time, the RPC drives VRAS line HIGH.
4) The RPC drives VRFE HIGH.
5) Before executing a new cycle, the RPC will insert a wait state according to the VPX field.

Note: If a refresh operation is requested during video buffer read/write or video out accesses, the RPC will finish the current access, insert a refresh operation and the resume read/write accesses.

4.2.5 VIDEO BUFFER EXTENDED ROW ADDRESS TIMING

In systems that do not require very high performance, the described timings may restrict the use of slower peripheral devices (latches, drivers decoders). The RPC has built-in facilities to cope with these slower devices. Bit 8 of the seventh word of CCW is called the video buffer bus timing extension bit. With this bit the row address timing can be extended by one clock cycle, thus allowing more time for latching the row and bank address and for decoding the bank address.

4.3 FONT MEMORY OPERATIONS

The RPC views the Font Memory as one big memory space that can contain up to 16Mwords of data. In a normal system, this memory can be divided into different font cartridges. Address decoding for these cartridges is done outside the RPC.

4.3.1 FONT READ ACCESS OPERATION

1) The RPC drives the FALE2 output HIGH and places the high byte of a memory address (FA16-FA23) on the font bus FAD0-15. The address will be valid during the HIGH to LOW transition of the FALE2 output.
2) The RPC drives the FALE1 output HIGH and places the lower two bytes of a memory address (FA0-FA15) on the font bus FAD0-FAD15. The address will be valid during the HIGH to LOW transition of the FALE1 output.
3) The RPC drives the FRD output LOW.
4) The RPC inserts font bus FAD0-FAD15 wait states according to the FMW field in CCW.
5) The RPC captures the valid input data placed on FAD0-FAD15.
6) The RPC drive FRD HIGH.

Further read accesses can be initiated by executing step 1).

4.3.2 FONT WRITE ACCESS OPERATION

1) The RPC drives the FALE2 output HIGH and places the high byte of a memory address (FA16-FA23) on the font bus FAD0-FAD7. The address will be valid during the HIGH to LOW transition of the FALE2 output.
2) The RPC drives the FALE1 output HIGH and places the two lower bytes of a memory address (FA0-FA15) on the font bus FAD0-FAD15. The address will be valid during the HIGH to LOW transition of the FALE1 output.
3) FAD0-FAD15 will be driven by the RPC with valid data.
4) The RPC drives the FWR LOW.
5) The RPC inserts font bus wait states according to the FMW field in the CCW.
6) The font memory loads the data into the specified location.
7) The RPC drives the FWR HIGH.

Further write accesses can be initiated by executing step 1).

4.4 PRINTER INTERFACE

4.4.1 PAGE SYNC OPERATION

1) The RPC receives the GO command.
2) The RPC reads the state of the PSYNC input.
3) If the PSYNC line is HIGH, the RPC will perform the following steps. Otherwise go back to step 2).
4) The RPC starts a Y-margin count operation.
5) The RPC will start line sync operation when the Y-margin count operation is completed.

4.4.2 LINE SYNC OPERATION

1) The RPC reads the state of LSYNC input when Y-margin count is completed.
2) If LSYNC is HIGH, the RPC will start X-margin count. Otherwise go back to step 1).
3) The video clock will synchronize with the LSYNC in the asynchronous VCLK case.
4) The RPC starts the X-margin count operation.
5) The RPC generates VDO signal when the X-margin count is completed.

SECTION 5: OPERATIONAL MODES

To start the RPC operation after a RESET, the CPU loads the command control word to the RPC. This word specifies the intended operation mode. Seven modes are possible: reset, ORP load mode, ORP read mode, dispatch mode, font read mode, font load mode, and graphics load mode as set out above. The ORP read mode, ORP load mode, font read mode, font load mode, and graphics load mode are referred to as transparent modes.

The first mode, Reset, clears all the internal control flags, including the status bits in CCW, without clearing the programmed registers CCW, SCW0, SCW1, DCW. A software reset must be sent if the next set of printing starts in the first band. If RESET is sent before the termination of a print operation, the CPU has to clear the video memory.

5.1 DISPATCH MODE

Dispatch mode is the normal operation mode for text printing. The RPC takes data from the font memory and copies it into the video buffer.

The source command word (SCW0) specifies the start address of the image block bit-map to be dispatched. The bit-map has to be stored in the font memory, or video buffer in consecutive locations starting with the source current address SCAR specified in the source command word 0. The RPC will access this data word by word if the source address hold bit of SCW0 is set to 0. If this bit is set to 1, the RPC will not increment the source address and will therefore always access the same source word. The RPC will dispatch textured image according to the SCW1 when the texture font mode is specified by the TX bit in the SCW0. The SCW1 specifies the start address of the texture mask to be used for texturing an image block or a font. The texture mask must be stored in the font memory or video buffer in consecutive locations starting with the source current address SCAR specified in the source command word 1. The RPC will access this data word by word if the source address hold bit of SCW1 is set to 0. If this bit is set to 1, the RPC will not increment the source address and will therefore always access the same source texture word.

The destination control word contains the destination current address DCAR. This virtual address points to the location on the page that will contain first part of the bit-map information. Since the image block can start on a bit-boundary rather than a word boundary, the destination command word also contains the destination offset DOR of 0 to 15 bits. The bit-map must be shifted to the right by this destination offset.

The RPC can use a ping-pong strategy to meet the real time requirement of a raster printer. Two video bands are used. While the first band is read by the RPC and data is clocked out to the printer, the second is filled with font and graphics information. After scanning out all data of the first band, the RPC switches to the second band for scanning and fills data to the first band buffer.

The RPC can also be operated with one band only. This band must have the size of a full page of bit-map. In this case the overall throughput is restricted because the RPC cannot start printing before the full page is dispatched.

The size of the two bands is determined by the system designer. Maximum performance is achieved only with large bands. Small bands save memory but require additional processing by the CPU. For a small band, it is more likely that a given image block will not fit into the band. The CPU must then read its parameters back and send the partial image block again for the next video band, this time with the new source and destination addresses.

The video bands reside in the video buffer. The first band by definition starts at address $000000_{Hex}$. Its size is defined by the video band boundary register in the control command word. Every new scan line has to start on a word boundary. This means that in cases where PXSR is not a multiple of 16, the last word of each scan line will contain fill bits. The start address of the second video band must be supplied to the RPC in the control command word (video band boundary register).

5.1.1 FIRST VIDEO BAND COMPILING

For the first video band the RPC only fills data into video band 1. Scanout of video band 2 has not yet begun. The following is the internal procedure for dispatch mode:

1. After the CPU has set the mode control to dispatch mode, the RPC drives DRQ LOW.
2. The RPC waits for all five words (eight words if texture) of DCW and SCW to be written. The second word of DCW has to be written last. The RPC drives DRQ HIGH.
3. If the destination is found to be outside the currently dispatched video band, the RPC waits for the other video band to be completely scanned out (if scanning has already started). Now the RPC sets the BD bit and drives INTR LOW, control returns to 2.
4. The RPC accesses the word specified by the source current address register SCAR. If the address hold bit is not set, this address is incremented. In the same time, a temporary source width register in the control register file is decremented.
5. The destination word is read by the RPC. The source word is shifted by the destination offset. The source word is combined with the already existing destination word. The modified destination word is stored again.
6. The next word of the destination is accessed and combined with the remaining part of the source word.
7. The temporary source width register is checked. If it is not 0, operation returns to 3. If it is 0, the RPC decrements the source image height register and calculates the new destination current address DCAR, according to the formula $DCAR_{new} = DCAR_{old} -$ image block width (in words) $+$ PXSR (rounded up to the nearest word). If the temporary source width register is not 0, DCAR is incremented.
8. The RPC checks whether the new DCAR exceeds the video band boundary. If this is the case, dispatching of this image block is terminated. Dispatching is also terminated if the source image height has reached 0, indicating that the image block has been dispatched completely.
9. If the image block has been dispatched completely, the RPC drives DRQ LOW and sets the DC bit in the first word of CCW to 1. Operation returns to 2.
10. If the image block exceeds one of the video bands, the RPC sets the dispatch incomplete bit DI in CCW and drives INTR LOW. The source and destination current addresses will both contain the correct values for the next band. The CPU therefore does not need to modify anything for the next time this image block is sent.
11. After completely dispatching the first band, the CPU can directly start dispatching the next band and scanning out the first one. For this, the CPU sets the Raster Control bit RC to 1. If only character information within the first band is to be printed, a write to DCW0 followed by a write to DCS1 with the EOD bit set and DCAR of 0 should be done. The RPC will terminate the page by sending "white" information to the printer ("white" according to the video polarity specification in CCW) without accessing the following bands. Therefore the CPU can already start dispatching data for the next page.

5.1.2 SUBSEQUENT VIDEO BAND COMPILING

The compiling of all the later video bands after the first one is essentially the same as for the first band. But now the RPC must also scan out actual data to the raster printer. Scan reads for scanout have priority over all other bus transactions. The last band to be printed must be indicated by the CPU by doing a write to DCW0 followed by a write to DCW1 with the EOD bit set and a DCAR of 0. This causes the RPC to terminate access to the bands. Scan operation is terminated as soon as the page Y-size register in CCW is exhausted.

5.1.3 VIDEO SERIAL SHIFT OUT

1. The CPU writes a 1 to the raster control bit of CCW.
2. The RPC accesses the first word of the video band and increments the address pointer.
3. The RPC examines PSYNC. As soon as PSYNC is HIGH, the RPC starts the y-margin procedure by counting LSYNCs.
4. When the y-margin procedure is terminated, the RPC starts the x-margin procedure by counting video clocks after LSYNC.
5. After the x-margin procedure, the RPC starts serializing the accessed word and sends it to the printer. (The RPC requires 15 to 20 clock cycles to start serializing operation after set the RC bit to 1.)
6. The RPC accesses the next word and increments the address pointer.
7. The word is serialized and scanned out. An internal counter keeps track of the number of bits that are scanned out.

Serializing is stopped after this counter reaches the value of the page X size register PXSR. After the next LSYNC signal, the RPC continues with the next scan line. The Y-counter is incremented and compared to the page Y-size register. As soon as the counter reaches the page Y-size register, the RPC sets the end of page bit in CCW and raises INTR. After the last word of the band that was marked by an EOD dispatch has been read for scanout, the RPC scans out the logic value for "white" until the page Y-size register is exhausted. This feature makes it easier to print a page with only the top portion of the paper covered with text (e.g., letterhead). Only the bands that contain text have to be prepared. After these bands have been scanned out, the user can already start dispatching information for the next page while the first one is still printing. The RPC does not continue to access the video bands after the band marked by EOD has been scanned out. As soon as the page Y-size register is exhausted (INTR, EOP=1), the CPU can set the RC bit in CCW again and the RPC will start Y- and X-margin control for the next page immediately.

8. One word after the other is accessed and scanned out until the address pointer reaches the video band boundary register (if the first video band is scanned) or twice the video band boundary register (if the second video band is scanned).
9. When the page X size register is exhausted, the EOP status bit is set and the RPC drives INTR LOW to inform the CPU that attention is required. INTR is drive HIGH as soon as the CPU reads the first word of CCW.
10. In all cases where no end of page bit is set, the RPC immediately starts processing the next video band. Control returns to 7.

5.2 THE TRANSPARENT MODES

ORP read, ORP load, font read, font load and graphics load modes are commonly referred to as transparent modes. Font load and font read mode are suited for the transfer of font data to and from font or video memory. Font data is organized in consecutive memory locations as described above. During font read and font load mode, data is directly transferred one word after the other to or from consecutive memory locations.

The ORP load mode and ORP read mode are used when ORP is connected in the RPC font memory bus. The ORP load mode is for loading the font data from font memory to ORP chip. The ORP read mode is used for reading the data from ORP chip and putting it into font memory.

In ORP read mode, the RPC generates the font address and write signal to font memory, but it will not drive the font data bus. This allows the ORP chip to use the font data bus to output the rotated data to font memory.

In ORP load mode, the RPC will generate the font address and read signal, but it will ignore the data on the font data bus; the font data bus will be used by the ORP chip to load the data from font memory.

Graphics load mode is geared to the transfer of bit-mapped graphics windows. The destination offset is used to shift a window by 0 to 15 pixels to allow arbitrary window placement. The CPU loads the starting address for the first scan line to the destination current address register (in DCW); the RPC then automatically calculates the starting address for the following scan lines using the page x-size register.

5.2.1 FONT READ AND FONT LOAD MODES

Font read and font load mode transfer data to or from font memory and video buffer. These modes cannot be used in the same time as dispatch mode.

1. The RPC receives the control command word from the CPU. This word either indicates font read or font load mode.
2. The RPC receives the destination command word. This word contains the memory address and the bus (font or video buffer) that has to be used for the selected transparent accesses.
3. For font read mode, the RPC immediately reads the specified memory location to a temporary register in the register file and increments the destination current address. The RPC now waits for the CPU to execute a read access to the RPC address $O_{HEX}$. After this read access is executed, the RPC returns the word from the specified memory location on the CPU bus and accesses the next word in the specified memory location. After the access, the destination current address is incremented. This mode can be used to read font information, such as character style and size, to the CPU.
4. For font load mode, the RPC waits for the CPU to write a source word to the RPC on address $O_{HEX}$. The RPC writes this word to the memory location specified in the destination command word, increments the destination address, and waits for the next CPU access. The destination offset has to be set to 0.

5. Another transparent mode for a different memory block can be started by writing a new CCW0 mode to to the RPC.

5.2.2 GRAPHICS LOAD MODE

Graphics load mode transfers a bit-mapped window to the video memory for printing or storage. Unlike font load mode, graphics load mode is used to transfer a bit-mapped window to an area within the two video bands for direct printing. The RPC transfers one source word after the other to the video memory. As soon as the number of words that were transferred reaches the value specified in the source image width register in SCW0, the RPC calculates a new destination address (the start address of the next scan line for this window) according to the Page X Size Register. The operation continues until the CPU writes a new CCW. In the graphics load mode the RPC uses the destination offset register to determine how many pixel positions to the right the source word has to be shifted within the destination word. If opaque mode is specified (OQ-bit in CCW), the RPC, for the first and last word of every scan line, reads the already existing destination word, overwrites the bits that are covered with the new window and writes the modified word back. All other words are directly written to the video buffer. For transparent mode, all accesses are read-modify write.

If font load or graphics load mode is specified, a read access to address $0000_{BIN}$ does not produce any valid results; likewise, a write access to $0000_{BIN}$ during font read mode is ignored.

1. The RPC receives the control command word from the CPU. This word indicates graphics load mode. CCW also has to contain the correct page x-size register. This values is specified in pixels. For address calculation it is divided by 16 and incremented to the next integer. The so calculated figure stands for the number of memory words that are used to store one scan line.
2. The RPC receives the first source command word SCW0. This word contains the source image width SIW. SIW is in words and stands for the number of words to be transferred per scan line.
3. The RPC receives the destination command word. This word contains the memory address and the offset that has to be used for the selected transparent accesses.
4. The RPC waits for the CPU to write a source word to the RPC on address $0_{HEX}$.
5. a: If the destination offset is 0, and if opaque mode is specified, the RPC writes this word to the memory location specified in the destination command word. If transparent mode is specified (the background shines through), all accesses are read/ modify/write. The RPC increments the destination current address and waits for the next access by the CPU. After every word that is written to the destination, the destination current address register is incremented and the working register holding the source image width is decremented as soon as this register reaches a value of zero, the RPC calculates the starting address of the next scan line according to the starting address of the old scan line and the value in the page X-size register.

b: If the offset is nonzero and if opaque mode is specified, the RPC reads the specified destination address first, then overwrites the bits that are covered by the shifted source word and writes the destination word back. The remaining bits of the source word are kept internally. As soon as the CPU writes the next word to register $0_{HEX}$, these remaining bits are combined with the leading bits of the new word, the next destination word is overwritten with the so constructed word. If transparent mode is specified, all accesses are read/-modify/write to combine font and background. After every word that is written to the destination, the destination current address register is incremented and the working register holding the source image width is decremented as soon as this register reaches a value of zero, the remaining bits from the last transparent word are combined with the appropriate destination word and written to the destination. The RPC calculates the starting address of the next scan line according to the starting address of the old scan line and the value in the page X-size register.

6. Another transparent mode for a different memory block can be started by writing a new DCW to the RPC.

5.3 INTERRUPTS

The INTR line is driven LOW by the RPC whenever the attention of the CPU is required. INTR can be disabled by setting the interrupt enable bit IE in CCW to 0. INTR is driven High again, as soon as the CPU reads the first word of CCW. It should therefore be avoided to abort a read access to this register since the RPC may wrongly interpret an aborted access as completed and not only remove the INTR signal but also clear the status bits. This word contains all the status information describing the current state of the operation.

The CPU examines the different status bits and take the necessary action. The following situations can occur:

DI=0 B: Dispatch of the previous image block was not completed. This situation occurs when an image block is sliced by the band boundary. The CPU has to read SCW0, SCW1, and DCW of this image block from the RPC. These values have already been adjusted by the RPC so that they can be sent again during dispatching of the next band without modification. The CPU decides whether there is a SCW1 to be read by examining the TX bit in SCW0.

The RPC will resume the normal operation (generate the DRQ LOW) after last word of DCW has been read by the CPU.

BD=1 The current band has been dispatched. This condition occurs after the RPC has received an image block with a destination current address that exceeded the current video band. The image block causing the interrupt is not dispatched by the RPC. This gives the CPU a chance to send now all the image blocks that were previously sliced and only then send this image block again. In cases where no sliced image blocks have to be dispatched, it is enough for the CPU to send the last word of DCW again and the RPC will start dispatching the image block.

RI=1 The raster operation could not be completed. This signals an error that cannot be recovered from. Possible causes for this error are an incorrectly set Page X size or x-margin register, a video clock that is too slow or a video clock division bit (in CCW) that is incorrectly set. The RC bit in the CCW is cleared when the RI bit is set to 1.

EOP=1 The end of page has been reached.

The EOP condition also occurs whenever the number of scan lines sent to the printer equals the value of the page Y-size register in CCW. EOP will be cleared when the CCW0 is read.

If the end of page has been reached, RC (raster scan control in CCW) is cleared to 0 by the RPC. If the first video band for the next page has already been dispatched, the CPU can directly set RC to 1 again. The RPC then waits for the next PSYNC signal and starts the normal printing operation for the next page. This makes it possible to print continuously without having to stop the raster printer engine.

DC=1 This situation does not cause an interrupt. The DC-bit is provided for systems that prefer the use of polling over interrupts. The DC-bit is cleared whenever the status register (CCW0) is read. This bit remains HIGH even after DRQ returns to HIGH, until CCW0 is polled.

5.4 POWER-UP PROCEDURE, INITIALIZATION

The system design has to be such that a hardware reset follows power up of the system. The RESET line has to be LOW for at least 4 clock cycles. During this time the RPC clears the CCW0. The video memory is not yet refreshed since no value has been loaded to the video memory refresh counter. Refresh will start after the CPU writes a value to the sixth word of CCW, writes CCW7 programming memory timing, and writes CCW0, setting VRE HIGH. Now all the other values related to the system (memory wait states, memory chip size, video clock select, etc.) have to be loaded. All these parameters are stored in CCW. Now the CPU has to make sure that the video buffer area that will be used as video bands is cleared. In systems where it is not possible to clear this memory with hardware, the CPU has to specify transparent write mode and has to fill the whole video band buffer with 0. This completes the initialization procedure.

SECTION 6: IMPLEMENTATION OF CONTROL MEANS

Figure 11:
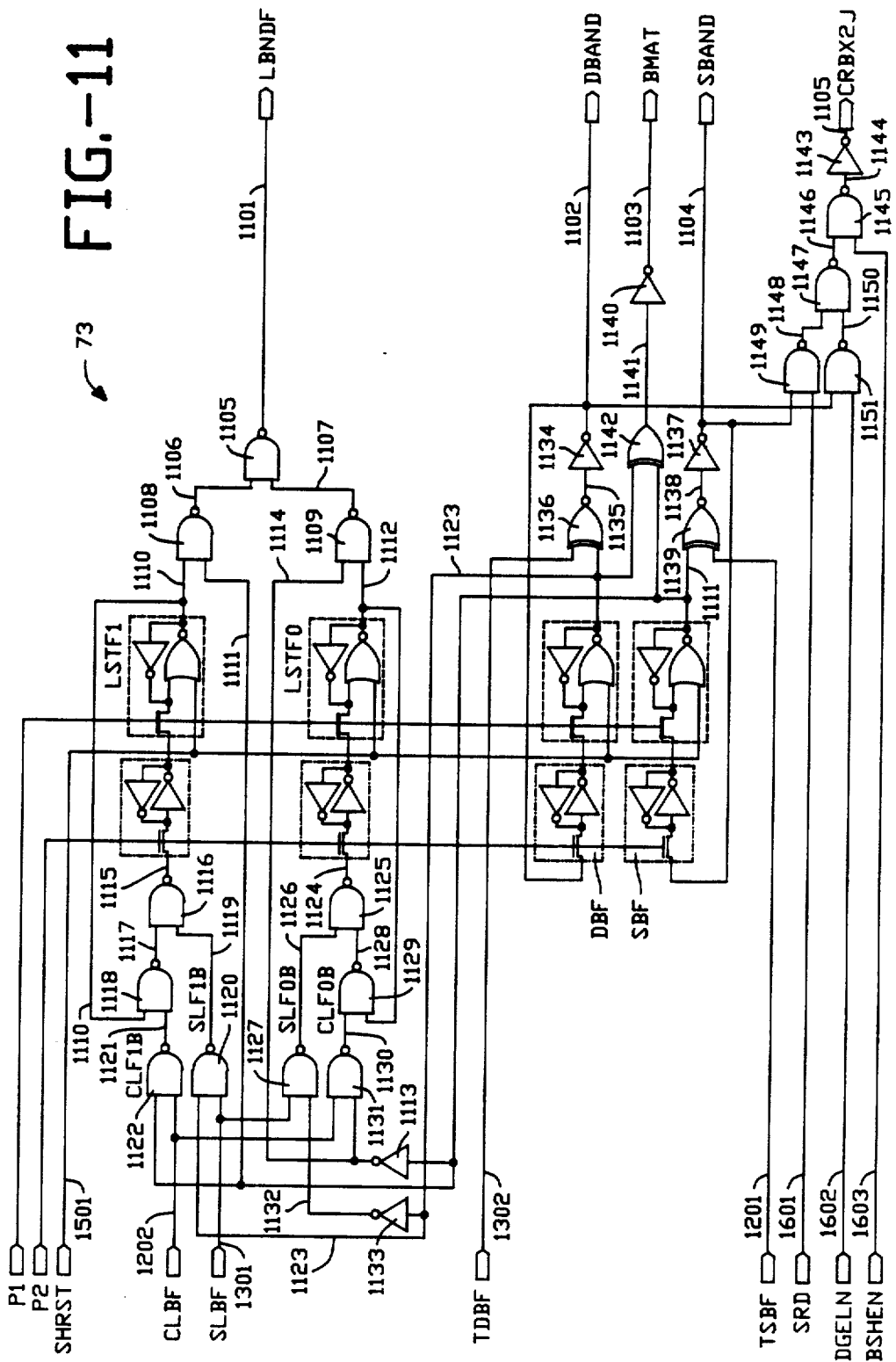
FIG. 11 is a logic diagram of the band control block in the RPC.
Figure 12:
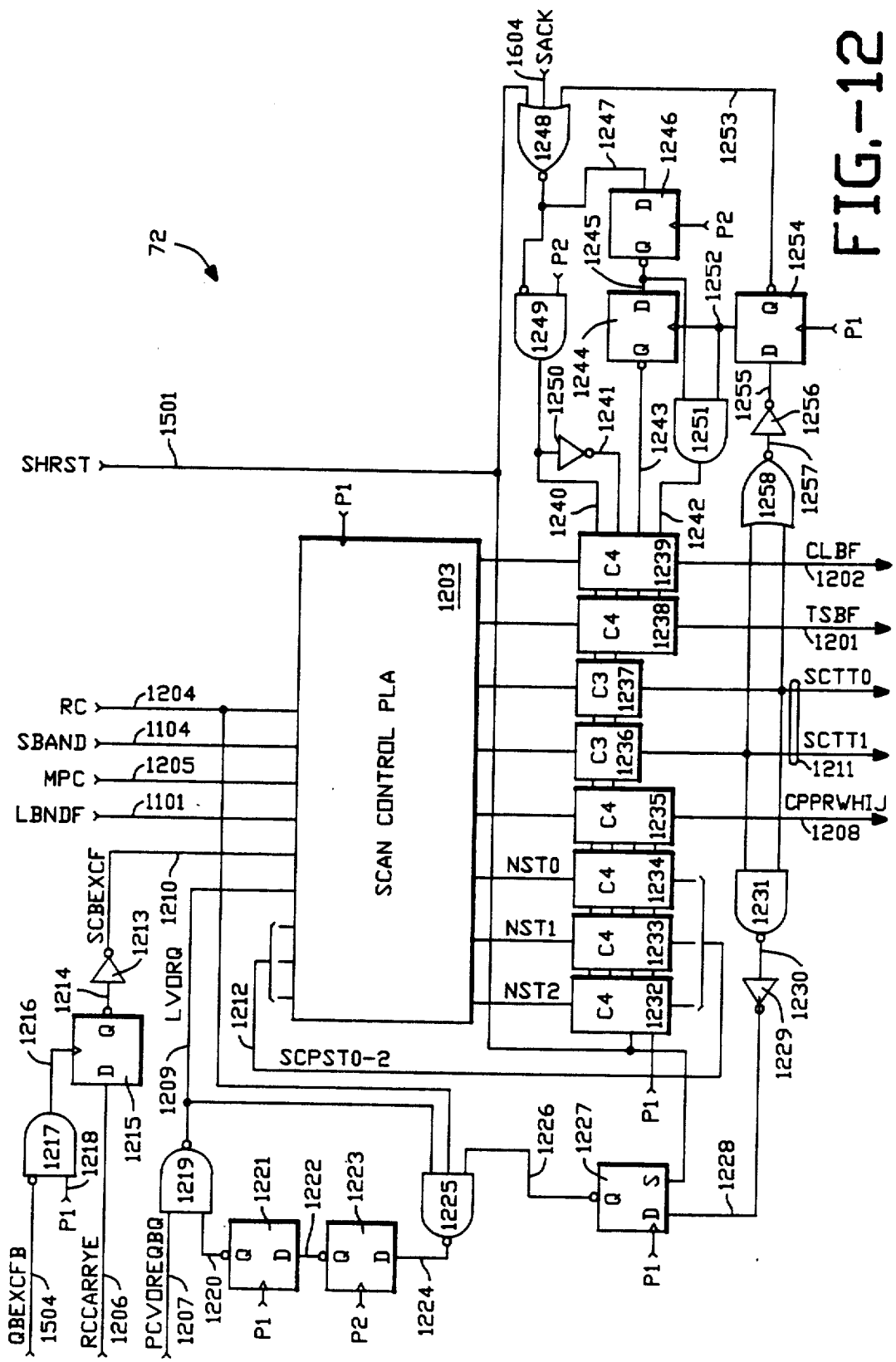
FIG. 12 is a logic diagram of the scan control block of the RPC.
Figure 13:
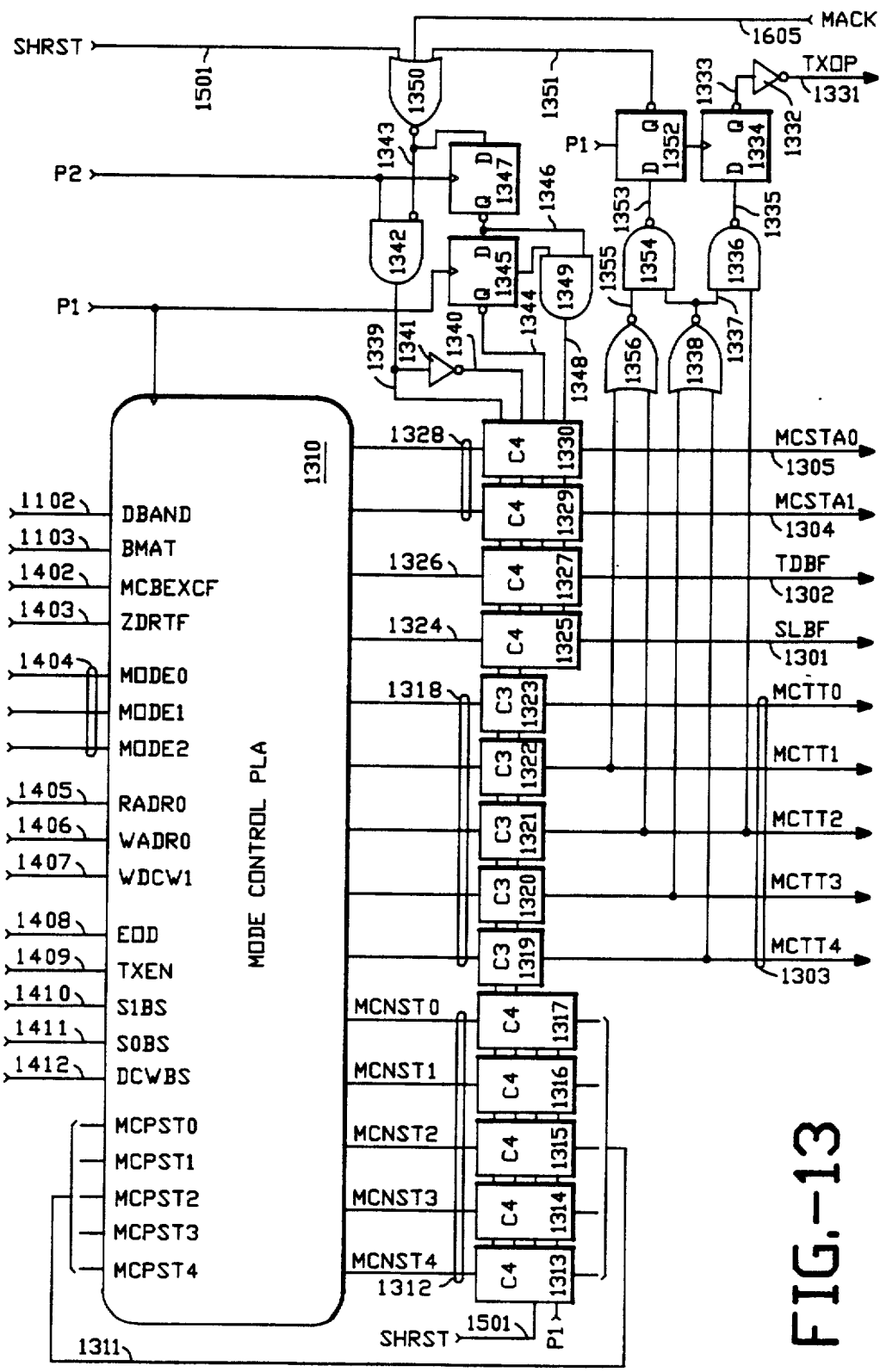
FIGS. 13, 14 and 15 are a logic diagram of the mode control block of the RPC.
Figure 14:
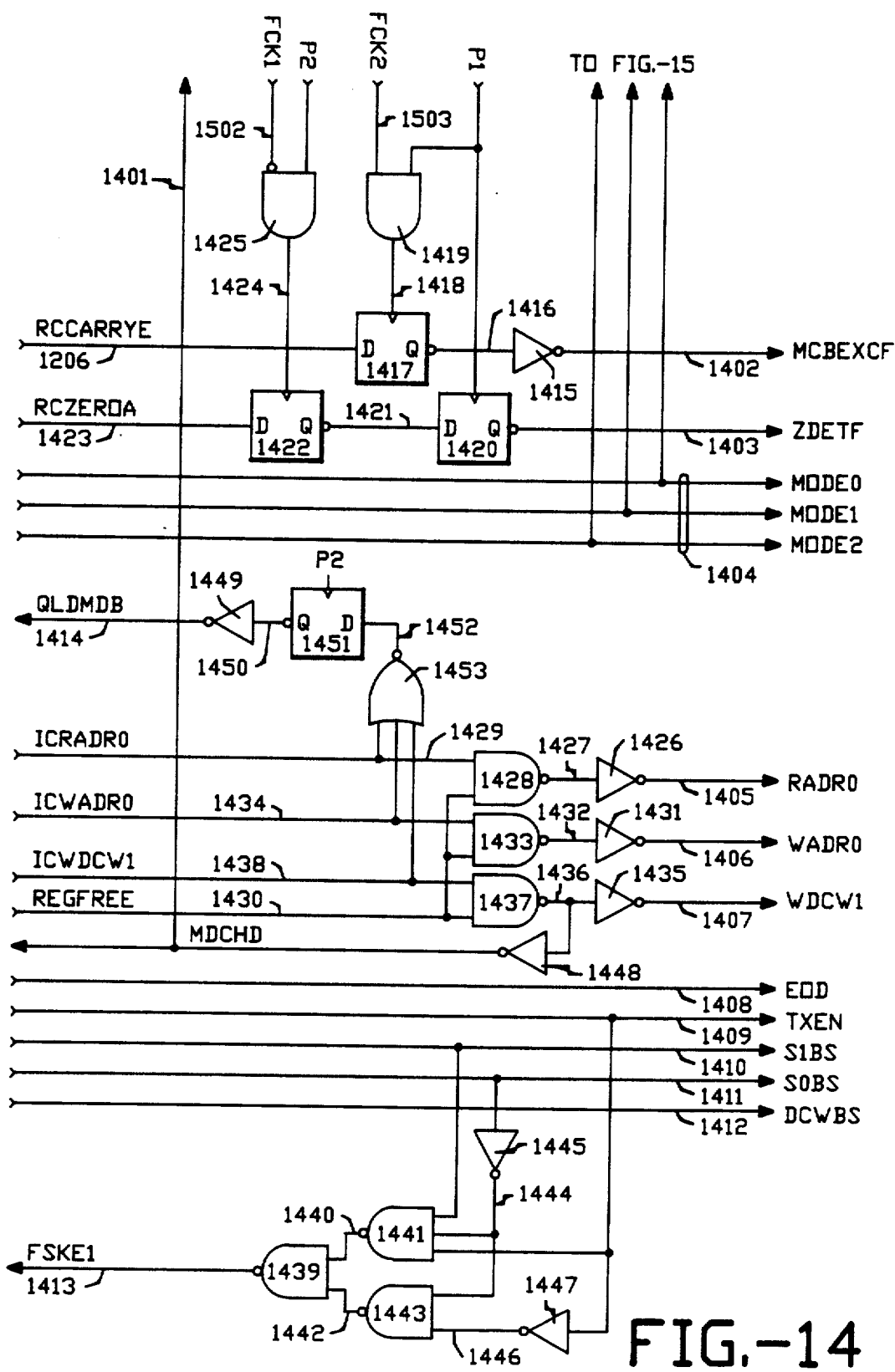
Figure 15:
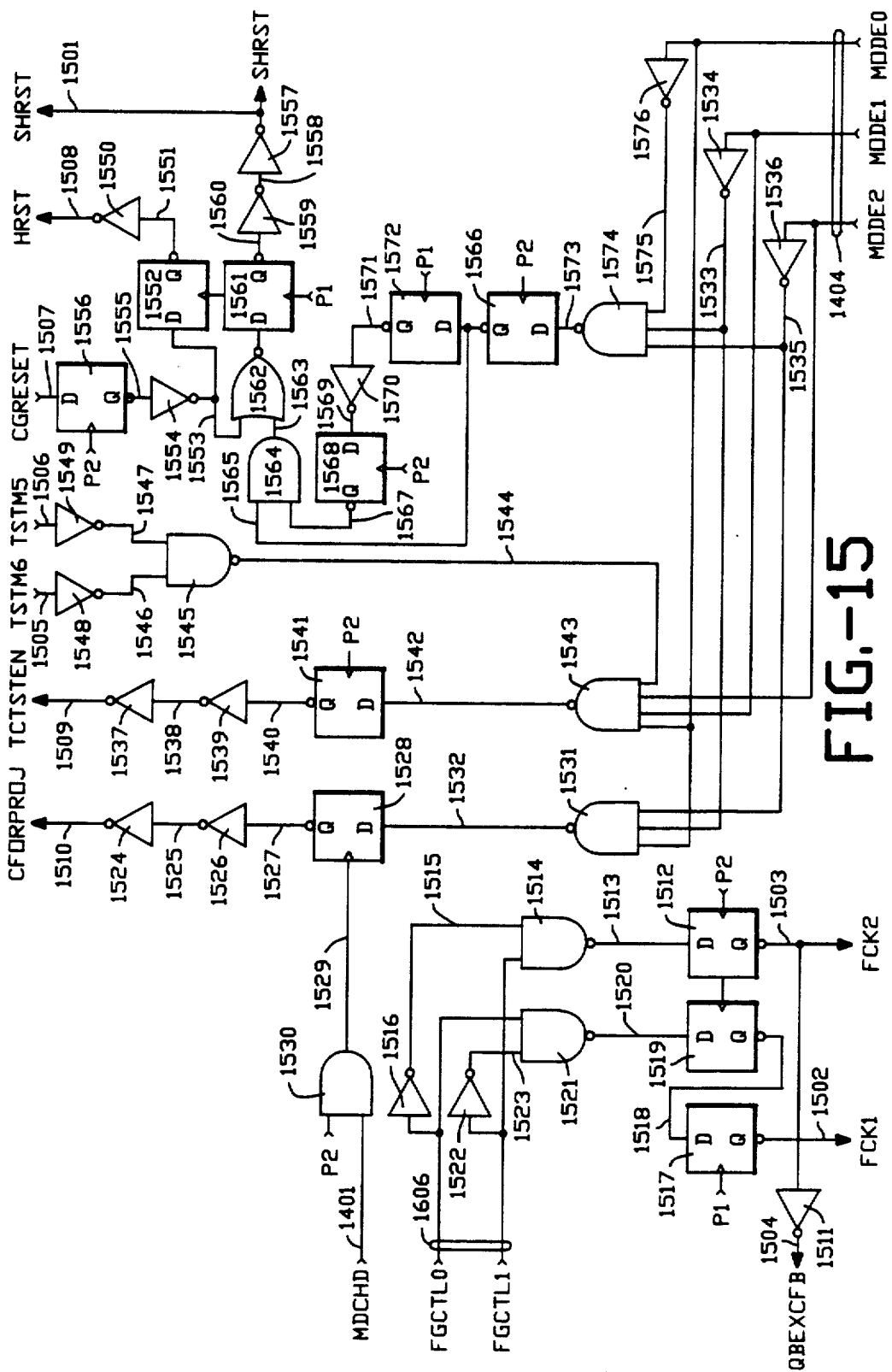

The control means 55 is shown in FIG. 2 having five major functional blocks. Each of these functional blocks is described in detail with reference to FIGS. 11-29. In particular, the band control state machine is shown in FIG. 11. The scan control state machine is shown in FIG. 12. The mode control state machine is shown in FIGS. 13-15. The transaction control state machine is shown in FIGS. 16-20. Finally, a diagram of the central control register file 76 is provided in FIG. 21. The operational sequences of the scan control and mode control state machines are shown in FIG. 22-29. Also, included in this section of the specification is a description of FIG. 30: a block diagram of the data paths in the color combination and barrel shifter block.

The control means 55 is implemented with a two-phase clock labeled P1 and P2 throughout the figures.

6.1 BAND CONTROL STATE MACHINE

FIG. 11 illustrates the band control state machine. The inputs to the band control state machine 73, in addition to the clock P1 and P2, include the following:

INPUTS TO BAND CONTROL STATE MACHINE

SHRST 1501—software or hardware reset set.
SLBF 1301—set a last band flag. When active, a copy of the current dispatch band flag, DBAND, is saved and a flip-flop enabling checking for the last band is set.
CLBF 1402—clear last band flag. When asserted, the last band flag flip-flop pointed to by SBAND is cleared.
TDBF 1302—toggle dispatch band flag. When pulsed low for one clock, the dispatch band flip-flop will be toggled.
TSBF 1401—toggle scan band flag. When pulsed low for one clock, the scan band flip-flop will be toggled.
BSHEN 1603—B shift enable. When active enables logic that generates the signal B times two, CRBX2J, which tells the register file to shift the ALU B port to do a multiply by 2.
SRD 1601—active when the current transaction type TT is a scan read (SRD).
DGELN 1602—active when the current transaction type TT is a dispatch end of line DEOLN or a graphics end of line GLEOLN.

The outputs from the band control state machine 73 as shown in FIG. 11 include the following:

LBNDF 1101—last band flag generated by the band control logic, active if the band that scan is reading from had a dispatch with EOD set.
BMAT 1103—band match will be active if the band that printer interface is using for scan reads is the same band that mode control is using for dispatch.
DBAND 1102—output of the dispatch band flip-flop.
SBAND 1104—output of the scan band flip-flop.
CRBX2J 1105—B times two, when asserted, input to the B port of the ALU should be shifted to do a multiply by two.

As shown in FIG. 11, the band control state machine includes four flip-flops and associated logic to generate the output signals listed above. The first two flip-flops LSTF0 and LSTF1 are used to check for the last band flag from the dispatch band and scan band. The next two flip-flops DBF and SBF store the actual band flags.

The outputs of the flip-flops LSTF0 and LSTF1 are combined to generate the LBNDF signal on line 1101. The signal on line 1101 is supplied at the output of NAND-gate 1105. The inputs to NAND-gate 1105 include the outputs on lines 1106 and 1107 of NAND-gates 1108 and 1109, respectively. The input to NAND-gate 1108 is the output of the LSTF1 flip-flop on line 1110 and the output of the SBF flip-flop on line 1111. The inputs to the NAND-gate 1109 include the output of the LSTF0 flip-flop on line 1112 and the output of inverter 1113 across line 1114. The input to the inverter 1113 is the output of the SBF flip-flop on line 1111.

The LSTF0 and LSTF1 flip-flops are two-stage flip-flops in which the first stage is clocked by P2 and the second stage is clocked by P1. In addition, the second stage can be reset by the SHRST signal on line 1501. The input to the first stage of the LSTF1 flip-flop is the signal on line 1115 at the output of NAND-gate 1116. The inputs to NAND-gate 1116 include the signal on line 1117 at the output of NAND-gate 1118 and the signal on line 1119 at the output of NAND-gate 1120. Inputs to NAND-gate 1118 include the signal on line 1110 from the output of the LSTF1 flip-flop and the signal on line 1121 at the output of NAND-gate 1122. The input to NAND-gate 1122 includes the signal on line 1111 and the signal CLBF on line 1202. The inputs to NAND-gate 1120 include the signal on line 1123 from the output of the DBF flip-flop and the SLBF signal on line 1301.

The input to the LSTF0 flip-flop is a signal on line 1124 from the output of NAND-gate 1125. The inputs to NAND-gate 1125 include the signal on line 1126 at the output of NAND-gate 1127 and the signal on line 1128 at the output of NAND-gate 1129. The inputs to NAND-gate 1129 include the signal on line 1130 at the output of NAND-gate 1131. The inputs to NAND-gate 1131 include the signal on line 1114 and the CLBF signal on line 1202. The inputs to NAND-gate 1127 include the signal on line 1132 at the output of inverter 1133. The input to the inverter 1133 is the signal on line 1123 from the output of the DBF flip-flop.

The DBAND signal on line 1102 is supplied at the output of the inverter 1134. The input to the inverter 1134 is the output of the exclusive OR-gate 1136 across line 1135. The inputs to the exclusive OR-gate 1136 include the TDBF signal on line 1302 and the output of the DBF flip-flop on line 1123.

Likewise, the SBAND signal on line 1104 is generated at the output of inverter 1137. The input to the inverter 1137 is the signal on line 1138 at the output of exclusive OR-gate 1139. The inputs to exclusive OR-gate 1139 include the TS(F signal on line 1201 and the output of the SBF flip-flop on line 1111.

The BMAT signal on line 1103 is supplied to the output of inverter 1140. The input to inverter 1140 is the signal on line 1141 at the output of exclusive OR-gate 1142. The inputs to exclusive OR-gate 1142 include the output of the DBF flip-flop on line 1123 and the output of the SBF flip-flop on line 1111.

The CRBX2J signal on line 1105 is supplied at the output of inverter 1143. The input to inverter 1143 is the signal on line 1144 at the output of NAND-gate 1145. The inputs to NAND-gate 1145 include the signal on line 1146 and the BSHEN signal on line 1603. The signal on line 1146 is supplied at the output of NAND-gate 1147. The inputs to NAND-gate 1147 include the signals on line 1148 at the output of NAND-gate 1149 and the signal on line 1150 at the output of NAND-gate 1151. The inputs to NAND-gate 1149 include the SBAND signal on line 1104 and the SRD signal on line 1601. The inputs to NAND-gate 1151 include the DBAND signal on line 1102 and the DGELN signal on line 1602.

As can be seen from the logic, the band control state machine 11 operates in cooperation with the scan control state machine 72, the mode control state machine 74 and the transaction control state machine 75 to provide key signals used in the "ping-pong" video band management scheme to coordinate access to the video buffer bands.

6.2 SCAN CONTROL STATE MACHINE

The scan control state machine is shown in FIG. 12. It includes a scan control programmed logic array 1203. A flow diagram for the scan control PLA 1203 is provided in FIG. 22. The inputs to the scan control state machine 72 include the following:

INPUTS TO SCAN CONTROL STATE MACHINE

SHRST 1501—software or hardware reset.
MPC 1205—CCW multiple page print bit;
RCCARRYE 1206—ALU carry output.
RC 1204—raster scan control, a control bit from CCW0, when high enables printer interface for raster scan.
LBNDF 1101—last band flag generated by the band control logic. Active if an end of dispatch, EOD, was done to the band that scan is reading from.
SBAND 1104—output of the scan band flip-flop.
PCVOREQB 1207—active low video out request generated by the printer interface, used to request video data reads (maybe RMW)—active for only one cycle, latched by LVORQ until SC has serviced it.
SACK 1604—scan acknowledge generated by transaction control state machine, used to tell scan control that it is ok to make a state branch. ALU carry from the previously requested TC operation should be valid before or at the same time SACK is asserted. ALU flags may be used for state branching in the scan control SM.
QBEXCFB 1504—qualify band exceeded flag, decoded on mode control from FGCTL (1:0), tells scan control when to latch the carry to be used for SCBEXCF.

The output of the scan control state machine 72 includes the following signals:

OUTPUTS FROM SCAN CONTROL STATE MACHINE

CLBF 1202, 1402—clear last band flag. When asserted, the last band flag flip-flop pointed to by SBAND is cleared.
TSBF 1201—toggle scan band flag. When pulsed low for one clock, the scan band flip-flop will be toggled.
CPPRWHIJ 1201—print white, used to tell the printer interface to begin printing white, active when an EOD is performed on a band that has been completely read or scanned out. When asserted, scan control will ignore data requests from the printer interface.
LVORQ 1209—latched video request latched version of the one cycle data request pulse from the printer interface - will be cleared when the scan read is done, RC is cleared, or SHRST is asserted.
SCBEXCF 1210—scan band exceeded flag, latched ALU carry, latched when the ALU does the subtract of the high byte of VOAR from the high scan band boundary byte. During a subtract, the ALU carry acts like an active low borrow.
SCTT(1:0) 1211—scan control transaction type. This field is used to specify the type of transaction that scan control is requesting of the transaction control state machine. When scan control is not making a request, this field should be zero (used to generate TT code for DRAM refresh).

The inputs to the scan control PLA 1203 include the RC signal on line 1204, the SBAND signal on line 1104, the MPC signal on line 1205, the LBNDF signal on line 1101, the SCBEXCF signal on line 1210 and the LVORQ signal on line 1209. Also, scan control PLA 1203 receives the scan control present state signals SCPST0-SCPST2 on lines 1212.

The SCBEXCF signal on line 1210 is supplied at the output of inverter 1213. The input to inverter 1213 is the output on line 1214 of the register 1215. The input to the register 1215 is the RCCARRYE signal on line 1206. The register 1215 is clocked by the P1 clock on line 1216 through AND-gate 1217. The AND-gate 1217 gates the P1 clock at input 1218 by assertion of the QBEXCFB signal on line 1504. The input of line 1504 at AND-gate 1217 is an inverting input so that the signal on line 1504 which is active LOW will enable passing of the P1 clock when it is asserted LOW.

The LVORQ signal on line 1209 is supplied at the output of NAND-gate 1219. The inputs to NAND-gate 1219 include the signal PCVOREQBQ on line 1207 and the output on line 1220 of the register 1221. The register 1221 is clocked by the P1 clock and its input is the signal on line 1222 from the output of register 1223. The register 1223 is clocked by the P2 clock. The input to the register 1223 is the output on line 1224 of NAND-gate 1225. The inputs to NAND-gate 1225 include the RC signal on line 1204, LVORQ signal on line 1209 and the output on line 1226 of the register 1227. The register 1227 is clocked by the P1 clock. The register 1227 includes a set input which receives the SHRST signal on line 1501 and a D input which receives the signal on line 1228 at the output of inverter 1229. The input to inverter 1229 is a signal on line 1230 from the output of NAND-gate 1231. The NAND-gate 1231 receives as inputs the SCTT-SCTT1 signal on lines 1211 so that its output is asserted active LOW when both SCTT0 and SCTT1 are high.

The SCPST0-SCPST2 signals on lines 1211 are supplied at the output of C4 registers 1232, 1233 and 1234. The inputs to the C4 registers 1232, 1233 and 1234 include the NST0-NST2 outputs of the scan control PLA.

In addition to the NST0-NST2 signals supplied from the scan control PLA 1203 to the C4 registers 232-1234, the scan control PLA also supplies an output signal to the C4 register 1235, an output signal to the C3 register 1236, an output signal to the C3 register 1237, an output signal to the C4 register 1238 and an output signal to the C4 register 1239. The outputs of the registers 1235-1239 include the CPPRWHI signal on line 1208, the SCTT0-SCTT1 signals on lines 1211, the TSBF signal on line 1201 and the CLBF signal on line 1202.

The scan control PLA is clocked by the P1 clock.

The C4 registers are all two-stage registers with the first stage being clocked by a gated P2 clock and its complement on lines 1240 and 1241, respectively. The C3 registers 1236 and 1237 are single stage registers which are clocked by the same gated P2 clock and its complement on lines 1240 and 1241.

The C4 registers 1232-1235 are clocked in their second stage by a P1 clock. A reset input to the second stage of the C4 registers 1232-1235 is supplied as a signal SHRST on line 1501. The C4 registers 1238 and 1239 are clocked in their second stage by a gated P1 clock on line 1242. The reset input to C4 registers 1238 and 1239 is supplied on line 1243 at the output of register 1244. The register 1244 is clocked by the P1 clock and receives as input the signal on line 1245 from the output of the register 1246. The register 1246 is clocked by the P2 clock. Its input is the signal on line 1247 at the output of NOR-gate 1248. The signal on line 1247 also gates the P2 clock through AND-gate 1249 to supply the signal on line 1240. The signal on line 1240 is supplied through inverter 1250 to supply the complement of the gated P2 clock on line 1241. The input to the AND-gate 1249 receives the signal on line 1247 as an inverting input. The gated P1 clock on line 1242 is supplied at the output of AND-gate 1251. The inputs to AND-gate 1251 include the P1 clock on line 1252 and the output on 1245 of register 1246.

The NOR-gate 1248 receives as its inputs the SHRST signal on line 1501, the SACK signal on line 1604, and the signal on line 1253 supplied at the output of register 1254. Register 1254 is clocked by the P1 clock. The input to the register 1254 is the signal on line 1255 at the output of inverter 1256. The input to the inverter 1256 is the signal on line 1257 at the output of NOR-gate 1258. The inputs to NOR-gate 1258 include the SCTT0-SCTT1 signals on lines 1211. Thus, it is asserted active HIGH when both SCTT0 and SCTT1 signals are LOW.

As can be seen, the scan control state machine 72 cooperates with the mode control state machine, the band control state machine and the transaction control state machine to generate transaction type signals SCTT0-SCTT1 for supply to the transaction control state machine and a variety of other control signals used in controlling the ping-pong video band buffer management accomplished by the present invention.

Figure 22:
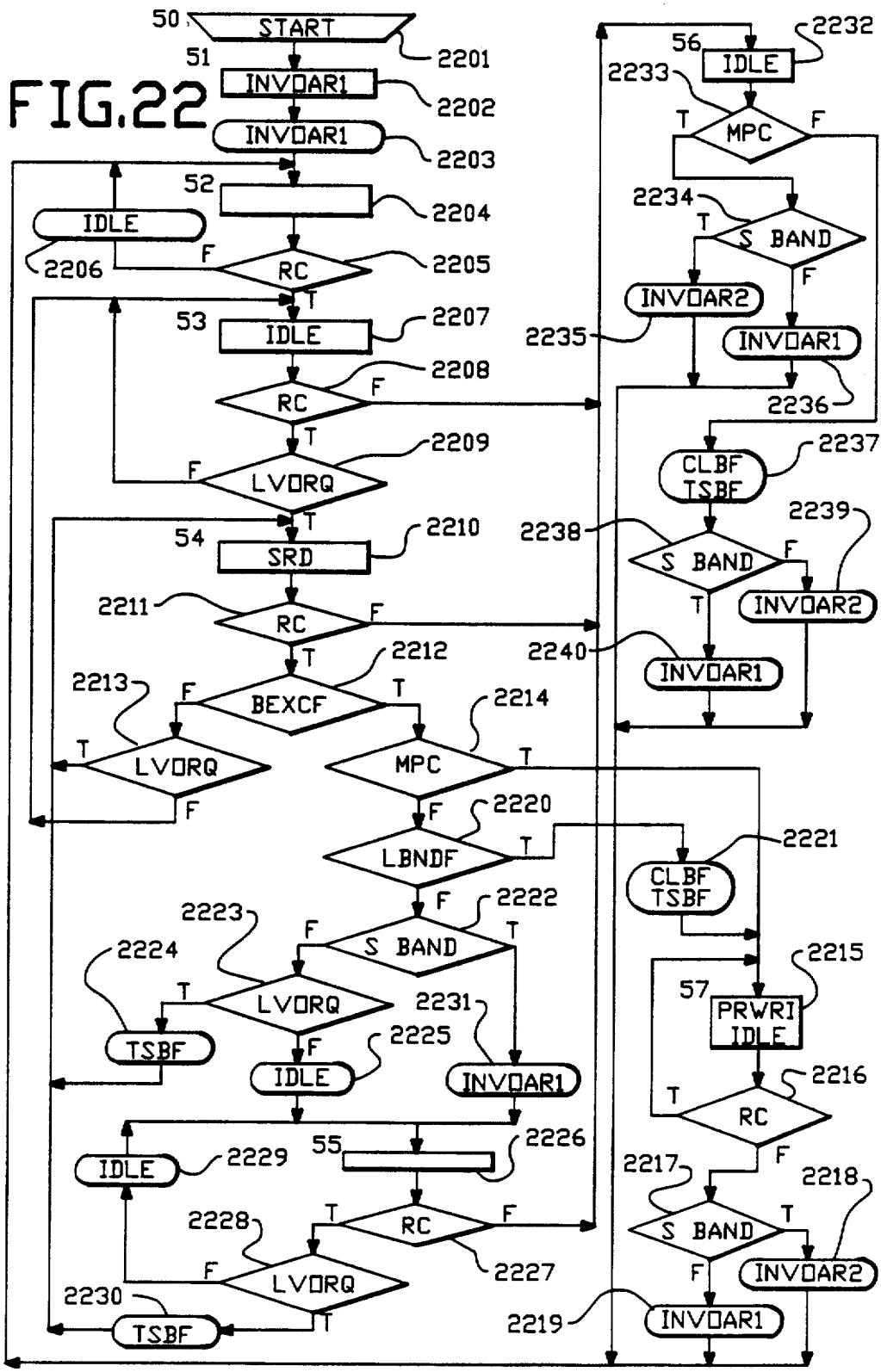
FIG. 22 is a flow diagram for the scan control state machine.

FIG. 22 is a flow diagram illustrating the operation of the scan control state machine. As mentioned above, the scan control state machine manages the supply of data from the assembly memory to the scanner interface. It generates transaction type signals in the form of a two-bit code SCTT0-SCTT1. This transaction type signal codes for four transaction types including INVOAR1, INVOAR2, IDLE, and SRD. The function of the transaction control programmable logic array in response to these transaction type signals is set out in the RPC Transaction Control PLA Source Code Table below. Basically, the INVOAR1 transaction initializes the VOAR register in register file 76 for the first video band, by clearing it to zero. The INVOAR2 transaction initializes VOAR for the second band by setting it to the value of VBBR. The SRD transaction accomplishes a scan read. During a scan read, if the MPC bit is set in the CCW, then a read through the assembly interface is accomplished at the address of VOAR. Otherwise, a read/modify/write operation is done through the assembly interface. The scanner interface receives data from the VOAR address in a scanout register. The VOAR value is incremented and tested against the scan band boundary. If the band boundary is exceeded, a band-exceeded flag is set.

The state flow illustrated in FIG. 22 begins in state S0 2201 after a hardware or software reset. At the next clock, the state shifts to S1 in block 2202. After reaching S1 with an INVOAR1 transaction type, the state machine waits for the signal SACK from the transaction control state machine. Upon receiving that signal, the INVOAR1 transaction type is supplied again in block 2203. The state machine shifts to state S2 in block 2204. In the state S2, the RC signal is tested to determine whether a scan is requested (block 2205). If the RC bit is false, the IDLE transaction type is asserted (block 2206) and the control flow returns to state S2 in block 2204.

In block 2205, if the RC bit is true, then the state flow goes to S3 and asserts the IDLE transaction type (block 2207). After the state S3 in block 2207, the RC bit is again tested in block 2208. If the RC bit in block 2208 is true, then the LVORQ signal is tested (block 2209). If LVORQ is false in block 2209, then the sub-routine returns to S3 in block 2207. If the LVORQ signal is true in block 2209, the state flow continues to state S4 and asserts the SRD transaction type (block 2210). After state S4 in block 2210, the RC bit is tested (block 2211). If the RC bit in block 2211 is true, the BEXCF flag is tested in block 2212. If the BEXCF signal is false in block 2212, the LVORQ signal is tested in block 2213. If LVORQ in block 2213 is true, the sub-routine returns to state S4 in block 2210. If the LVORQ signal is false in block 2213, the state flow returns to state S3 in block 2207.

This describes the main loop of the scan control state machine in which the RC bit of the control word is tested to determine whether a scanout of data to the printer is requested by control. Next, the video out request from the printer interface as indicated by the LVORQ signal is tested to determine whether the printer interface is ready for the scanout. If the printer interface is ready, the scan read operation is carried out until the scan band address space is exceeded as indicated by the BEXCF signal in block 2212.

If the BEXCF signal is true in block 2212, the routine tests the MPC signal in block 2214. If the MPC signal is true, the routine branches to state S7 in block 2215 where the PRWRI signal is asserted by scan control and the IDLE transaction type is asserted. After state S7 in block 2215, the RC bit is tested in block 2216. If the RC bit is true, the routine branches to state S7 in block 2215. If the RC bit is false, the SBAND flag is tested in block 2217. If the SBAND is HIGH in block 2217 indicating that the first band of the next page will begin with VBBR, then the INVOAR2 transaction type is asserted in block 2218 and the state flow returns to state S2 in block 2204. If the SBAND signal in block 2217 is LOW or false indicating that the band begins with address 0, then the INVOAR1 transaction type is asserted in block 2219 and the sub-routine returns to state S2 in block 2204. This branch from block 2214 to 2215 to 2217 implements the MPC routine so that the same band is scanned to the scanner interface repeatedly until the MPC bit is turned off.

If the MPC bit in block 2214 is false, the routine tests for the last band flag LBNDF in block 2220. If the signal LBNDF is HIGH indicating that the last band has been scanned, the CLBF and TSBF signals are asserted in block 2221 and the routine goes to block 2215.

If the LBNDF signal in block 2220 is false, the SBAND signal is tested in block 2222. If SBAND in block 2222 is false, the LVORQ signal is tested in block 2223. If LVORQ in block 2223 is true, the TSBF signal is asserted in block 2224 and the sub-routine returns to state S4 in block 2210. If LVORQ in block 2223 is false, the IDLE transaction type is asserted in block 2225 and the state machine enters state S5 in block 2226. From state S5 (block 2226), the RC bit is tested in block 2227. If RC is true in block 2227, the LVORQ signal is tested in block 2228. If LVORQ is false in block 2228, the IDLE transaction type is asserted in block 2229 and the state machine returns to state S5 in block 2226. If LVORQ is true in block 2228, the TSBF signal is asserted in block 2230 and the state machine returns to state S4 in block 2210.

The final routine of the scan control state machine shown in FIG. 22 occurs if, during testing of the RC bit in blocks 2208, 2211 or 2227, it is determined that the RC bit has been deasserted. In this case, the routine enters state S6 and asserts the IDLE transaction type in block 2232. At that point, the MPC bit is tested in block 2233. If MPC is true, the SBAND signal is tested in block 2234. For a HIGH SBAND signal, the INVOAR2 transaction type signal is asserted in block 2235 and the loop returns to state S2 in block 2204. If the SBAND signal is low in block 2234, the INVOAR1 transaction type is asserted in block 2236 and the loop returns to state S2 in block 2204. If the MPC bit in block 2233 is false, the CLBF and TSBF signals are asserted in block 2237. The SBAND signal is then tested in block 2238. If it is LOW, the INVOAR2 transaction type is asserted in block 2239. If SBAND in block 2238 is HIGH, the INVOAR1 transaction type is asserted in block 2240. From either block 2240 or 2239, the flow routine returns to state S2 in block 2204.

6.3 MODE CONTROL STATE MACHINE

FIGS. 13, 14 and 15 illustrate the mode control state machine. FIG. 13 shows the mode control PLA 1310 and most of the output logic. FIG. 14 illustrates most of the input logic generating signals for supply to the mode control PLA. FIG. 15 shows logic generating output signals apart from mode control PLA. The inputs and outputs of the mode control state machine are set out in Tables below.

As can be seen in FIG. 13, the inputs to the mode control PLA 1310 include the DBAND signal on line 1102, the BMAT signal on line 1103 and a plurality of signals supplied as shown in FIG. 14 with reference Nos. 1402–1412. In addition, the MCPST0–MCPST4 signals are supplied on lines 1311. The operation of the mode control PLA is illustrated in FIGS. 23–29. The outputs of the mode control PLA include the MCNST0–MCNST4 signals on lines 1312 which are supplied to five C4 registers 1313–1317. Also, the MCTT0–MCTT4 signals are supplied at the output of the mode control PLA on lines 1318 through five C3 registers 1319-1323 and from there to the output lines 1303. Additional outputs include the SLBF signal on line 1324 through C4 register 1325 to output line 1301. The TDBF signal is supplied on line 1326 through C4 register 1327 to output line 1302. The MCSTA0 and MCSTA1 signals are supplied on lines 1328 through respective C4 registers 1329 and 1330 to output lines 1304 and 1305. An additional output signal shown in FIG. 13 is the TXOP signal on line 1331. This signal is supplied at the output of inverter 1332 which is connected to receive the output across line 1333 of register 1334. The input to register 1334 is the signal on line 1335, the output of NAND-gate 1336. The inputs to NAND-gate 1336 include the MCTT2 signal from lines 1303 and the output on line 1337 of NOR-gate 1338. The inputs to NOR-gate 1338 include the MCTT3 and MCTT4 signals from lines 1303.

Figure 3:
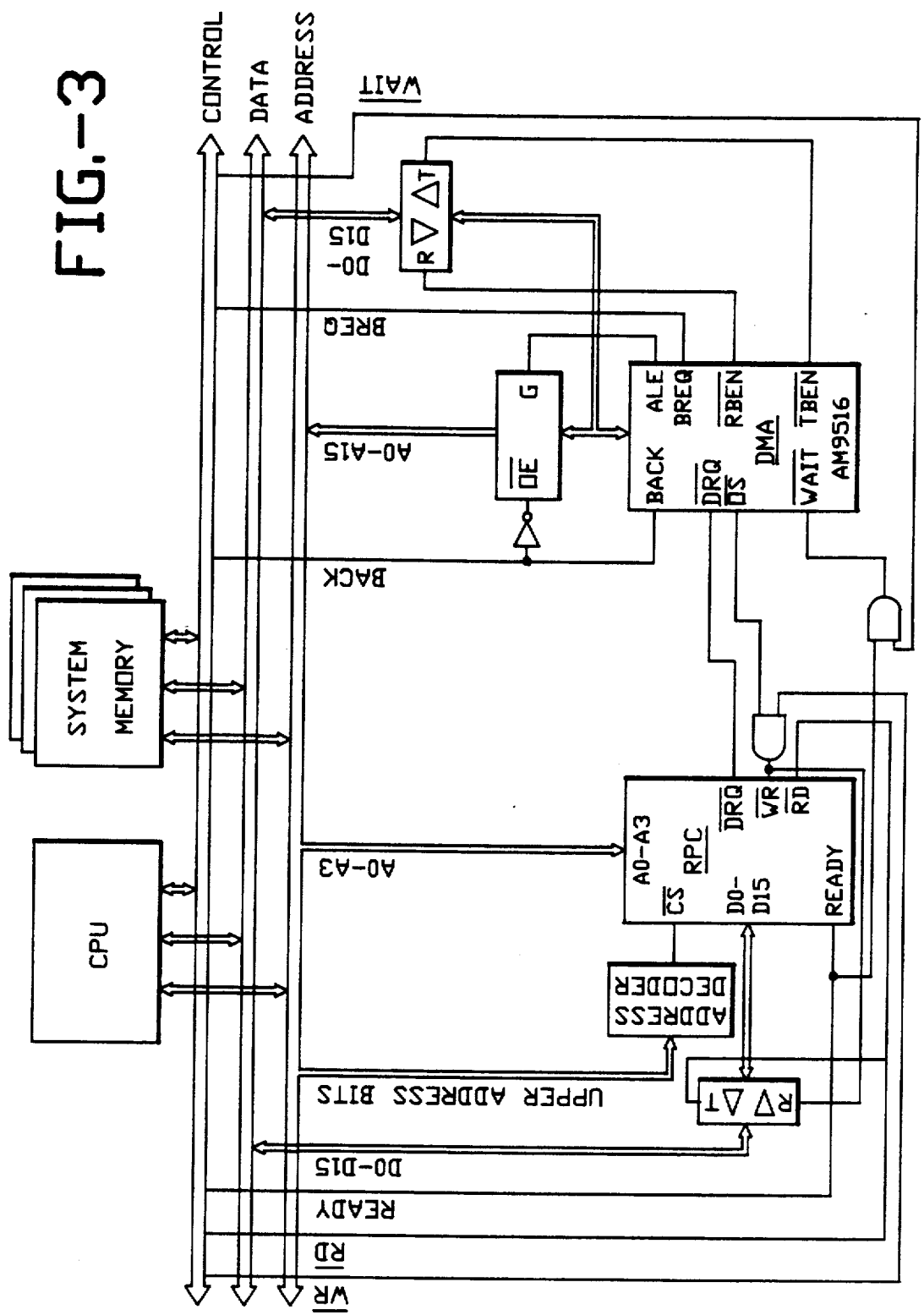
FIG. 3 is a diagram of the RPC with a DMA device, in a fly-by configuration.

The clocking and reset signals for the C4 and C3 registers in the mode control state machine shown in FIG. 3 is provided as follows: The first stage of the C4 registers 1313–1317. 1325, 1327, 1329 and 1330 is supplied by a gated P2 clock and its complement on lines 1339 and 1340. The complement on line 1340 is supplied through inverter 1341 which receives as its input the signal on line 1339. The signal on line 1339 is supplied at the output of AND-gate 1342 which receives as one input the P2 clock and as its other input, the control signal on line 1343. The reset input to the C4 registers 1325, 1327, 1329 and 1330 in FIG. 13 is provided by the signal on line 1344 which is supplied at the output of register 1345, clocked by the P1 clock. The input to the register 1345 is the signal on line 1346 which is supplied at the output of register 1347. The input to register 1347 is the signal on line 1343. The clock for the second stage of the C4 registers 1325, 1327, 1329 and 1330 in FIG. 13 is supplied on line 1348 at the output of AND-gate 1349. The inputs to AND-gate 1349 include the P1 clock and the signal on line 1346. The reset signal for C4 registers 1313, 1314, 1315, 1316 and 1317 is supplied by the input signal SHRST 1501. The clock for the second stage of C4 registers 1313-1317 is supplied by the P1 clock line.

Thus, the control signal on line 1343 gates the clock of the output registers for the mode control PLA when it is asserted active LOW passing the P2 clock. One clock cycle after it goes HIGH, the C4 registers 1325, 1327, 1329 and 1330 are cleared and it prevents clocking of the second stage of the C4 registers. This delayed clearing insures that output MCSTA0 1305, MCSTA1 1304, TDBF 1302, and SLBF 1301 will be asserted HIGH for at most one clock.

The control signal on line 1343 is supplied at the output of NOR-gate 1350. The inputs to NOR-gate 1350 include the SHRST signal on line 1501, the MACK signal on line 1605, and the signal on line 1351 which is supplied at the output of register 1352. The register 1352 is clocked by the P2 clock and receives as its input the signal on line 1353. The signal on line 1353 is supplied at the output of NAND-gate 1354 which receives as its inputs the signal on line 1337 and the output on line 1355 of NOR-gate 1356. The inputs to NOR-gate 1356 include the MCTT1 and MCTT2 signals from lines 1303.

INPUTS TO MODE CONTROL STATE MACHINE

S0BS 1411—output from the bus select (BS) bit of SCW0.
S1BS 1410—output from the bus select (BS) bit of SCW1.
DCWBS 1412—output from the bus select (BS) bit of DCW.
CGRESETJ 1507—output from the reset pad.
FGCTL(1:0) 1606—flag control, a coded field from transaction control state machine that tells mode control when to latch the carry (FGCTL=10) or zero (FGCTL=01) from the ALU.
ICRADR0A 1429—strobe from CPU interface, active if read from address 0, uses font read mode to signal mode control when the CPU has read the data from an I/O register.
ICWDCW1A 1438—strobe from CPU interface, active if write to DCW1, used in all modes except software reset, to signal mode control when a mode change has been made.
RCZEROA 1423—output of the zero detect from the ALU, active if the ALU output is zero.
RCCARRYE 1206—carry output of the ALU, during adds HIGH if ALU carry, during subtracts low if borrow.
MACK 1605—mode acknowledge, generated by transaction control state machine, used to tell mode control that it is ok to make a state branch. ALU flags from the previously requested transaction control operation should be valid before or at the same time MACK is asserted. ALU flags may be used for state branching in the mode control state machine.
DBAND 1102—output of the dispatch band flip-flop.
BMAT 1103—band match, will be active if the band that printer interface is using for scan reads is the same band that mode control is using for dispatch.
TXEN 1409—texture enable bit from SCW0.
EOD 1408—end of dispatch flag from DCW.
MODE0-2 1404—mode control field from CCW.
REGFREE 1430—REGFREE 1802 from transaction control
TSTM(6:5) 1505, 1506—Test mode two high order bits, output from the test mode register. Test mode register is loaded with the least significant 7 bits of data that is written to CCW0.

OUTPUTS FROM MODE CONTROL STATE MACHINE

MCSTA(1:0) 1304, 1305—mode control status, used to set CPU status bits, DI, BD and DC in CCW.
SLBF 1301—set last band flag. When active, the last band flag pointed to by DBAND (LBF0, if DBAND equal 0, LBF1 if DBAND equal 1) will be set.
TDBF 1302—toggle dispatch band flag. When pulsed high for one clock, the dispatch band flip-flop will be toggled.
MCTT(4:0) 1303—mode control transaction type. This field is used to specify the type of transaction that mode control is requesting of the transaction control state machine. One of the transaction types IDLE specifies that mode control does not have anything for transaction control to do.
HRST 1508—hardware reset, a delayed version of CGRESETJ.
SHRST 1501—software or hardware reset. During hardware reset, it is a delayed version of CGRESETJ; during software reset it is pulsed for one cycle when SRST is first detected.
TXOPB 1331—texture operation, active LOW, asserted if the current mode control transaction type is an operation that will modify the texture address, SCAR1. It is used on the transaction control schematic to control the address hold AH MUX.
TCTSTEN 1509—Transaction control test enable, used to enable transaction control to go into test mode, where transaction type can be forced from TSTM field.
CFORPRDJ 1510—ORP read, active if the current mode field is ORP read.
QBEXCF 1504—Qualify band exceeded flag, active LOW, use to tell scan control when the carry output of the ALU should be latched for SCBEXCF.
FSKE1 1413—font skip enable 1, active if the control registers, SCW0 and SCW1 are set up so that the font is the only thing in font memory, such as font without texture in font memory or font with texture in video memory. Used by logic on transaction type decode that generates signals to tell the font interface unit to skip the high address cycle.
MDCHD 1401—indicates a mode change.
QLDMDB 1414—qualify load mode indicating a read or write to address 0 by the CPU.

As mentioned above, FIG. 14 illustrates logic used to generate the input signals 1402-1412 of the mode control PLA 1310. It also illustrates the generation of the output signal FSKE1 on line 1413, the QLDMDB signal on line 1414 and MDCHD on line 1401.

The signal MCBEXCF on line 1402 is supplied at the output of inverter 1415. The input to inverter 1415 is the signal on line 1416 supplied at the output of register 1417. The input to register 1417 is the RCCARRYE signal on line 1206. The register 1417 is clocked by the gated P1 clock on line 1418 at the output of AND-gate 1419. The inputs to AND-gate 1419 include the P1 clock and the signal FCK2 on line 1503 which is generated as shown in FIG. 15.

The ZDETF signal on line 1403 is supplied at the output of register 1420. The input to register 1420 is supplied on line 1421 at the output of register 1422. The input to register 1422 is the RCZEROA signal on line 1423. Register 1422 is clocked by the gated P2 clock on line 1424 at the output of AND-gate 1425. The inputs to AND-gate 1425 include the P2 clock and the FCK1 signal on line 1502, inverted. The register 1420 is clocked by the P1 clock.

The MODE0-2 signals on lines 1404 are supplied directly through to the PLA in FIG. 13.

The RADR0 signal on line 1405 is supplied at the output of inverter 1426. The input to inverter 1426 is supplied across line 1427 at the output of NAND-gate 1428. The inputs to NAND-gate 1428 include the ICRADR0 signal on line 1429 and the REGFREE signal on line 1430.

The WADR0 signal on line 1406 is supplied at the output of inverter 1431. The input to inverter 1431 is supplied on line 1432 at the output of NAND-gate 1433. The inputs to NAND-gate 1433 include the REGFREE signal on line 1430 and the ICWADR0 signal on line 1434.

The WDCW1 signal on line 1407 is supplied at the output of inverter 1435. The input to inverter 1435 is the signal on line 1436 supplied at the output of NAND-gate 1437. The inputs to NAND-gate 1437 include the REGFREE signal on line 1430 and the ICWDC1 signal on line 1438.

The EOD signal on line 1408, TXEN signal on line 1409, S1BS signal on line 1410, S0BS signal on line 1411, and DCWBS signal on line 1412 are supplied directly through to the mode control PLA.

The output signal FSKE1 on line 1413 is supplied at the output of NAND-gate 1439. The inputs to NAND-gate 1439 include the signal on line 1440 at the output of NAND-gate 1441 and the signal on line 1442 at the output of NAND-gate 1443. The inputs to NAND-gate 1441 include the S1BS signal on line 1410, and the signal on line 1444 supplied at the output of inverter 1445. The input to inverter 1445 is the S0BS signal on line 1411.

The inputs to NAND-gate 1443 include the signal on line 1444 and the signal on line 1446 supplied at the output of inverter 1447. The input to inverter 1447 is the TXEN signal on line 1409. A third input to the NAND-gate 1441 is the TXEN signal on line 1409.

The MDCHD signal on line 1401 is supplied at the output of inverter 1448. The input to inverter 1448 is the signal on line 1436.

The output signal QLDMDB on line 1414 is supplied at the output of inverter 1449. The input to inverter 1449 is the output on line 1450 of the register 1451 which is clocked by the P2 clock. The input to the register 1451 is the signal on line 1452 supplied at the output of NOR-gate 1453. The inputs to NOR-gate 1453 include the ICRADR0 signal on line 1429, the ICWADR0 signal on line 1434 and the ICWDCW1 signal on line 1438.

FIG. 15 shows logic in the mode control state machine that generates output signals apart from the PLA 1310. The logic in FIG. 15 receives from FIG. 14 the MDCHD signal on line 1401 and the MODE0 through MODE2 signals on line 1404. In addition, it supplies the FCK1 signal on line 1502 and FCK2 signal on line 1503. With regard to FIG. 13, the circuitry in FIG. 15 generates the SHRST signal on line 1501.

The other inputs to the logic of FIG. 15 include the FGCTL0-FGCTL1 signals on lines 1606, the TSTM6 signal on line 1505, the TSTM5 signal on line 1506 and the CGRESET signal on line 1507. The outputs in addition to the SHRST signal on line 1501 include the HRST signal on line 1508, the TCTSTEN signal on line 1509, the CFORPRDJ signal on line 1510 and the QBEXCFB signal on line 1504.

The QBEXCFT signal on line 1504 is supplied at the output of inverter 1511. The input to inverter 1511 is the signal on line 1503 supplied at the output of register 1512 which is clocked by the P2 clock. The input to register 1512 is a signal on line 1513 at the output of NAND-gate 1514. The inputs to NAND-gate 1514 include the signal on line 1515 which is supplied at the output of inverter 1516 and the FGCTL1 signal on line 1506. The input to inverter 1516 is the FGCTL0 signal from lines 1606.

The signal on line 1503 is also supplied as the FCK2 signal to the circuitry described in FIG. 14. The FCK1 signal is supplied on line 1502 at the output of register 1517 which is clocked by the P1 clock. The input to register 1517 is the signal on line 1518 supplied at the output of register 1519 which is clocked by the P2 clock. The input to register 1519 is the signal on line 1520 supplied at the output of NAND-gate 1521. The inputs to NAND-gate 1521 include the FGCTL0 signal from lines 1606 and the output of inverter 1522 on line 1523. The input to inverter 1522 is the FGCTL1 signal from lines 1606.

The CFORPRDJ signal on line 1510 is supplied at the output of inverter 1524 which receives as inputs the signal on line 1525. The signal on line 1525 is supplied at the output of inverter 1526 which receives as its input the signal on line 1527 from the output of register 1528. The register 1528 is clocked by a gated P2 clock on line 1529 from the output of AND-gate 1530. The inputs to AND-gate 1530 include the P2 clock and the MDCHD signal on line 1401. The input to the register 1528 is the output of NAND-gate 1531 across line 1532. The inputs to NAND-gate 1531 include the MODE0 signal on lines 1404, the complement of the MODE1 signal supplied on line 1533 at the output of inverter 1534. The input to inverter 1534 is the MODE1 signal. A third input to the NAND-gate 1531 is the complement of the MODE2 signal supplied on line 1535 at the output of inverter 1536. The input to inverter 1536 is the MODE2 signal.

The TCTSTEN signal on line 1509 is supplied at the output of inverter 1537 which receives as input the signal on line 1538 from the output of inverter 1539. The input to inverter 1539 is the signal on line 1540 from the output of register 1541 which is clocked by the P2 clock. The input to register 1541 is the signal on line 1542 which is supplied at the output of NAND-gate 1543. The inputs to NAND-gate 1543 include the MODE0 signal from lines 1404, the MODE1 signal, the MODE2 signal and the signal on line 1544. The signal on line 1544 is supplied at the output of NAND-gate 1545. The inputs to NAND-gate 1545 are supplied on lines 1546 and 1547 at the output of inverters 1548 and 1549, respectively. The inputs to inverters 1548 and 1549 include the TSTM6 signal on line 1505 and the TSTM5 signal on line 1506, respectively.

The HRST signal on line 1508 is supplied at the output of inverter 1550. The input to inverter 1550 is the signal on line 1551 generated at the output of register 1552 which is clocked by the P1 clock. The input to register 1552 is the signal on line 1553 at the output of inverter 1554. The input to inverter 1554 is the signal on line 1555 at the output of register 1556 which is clocked by the P2 clock. The input of register 1556 is the CGRESET signal on line 1507 which indicates a hardware reset.

The SHRST signal on line 1501 is supplied at the output of inverter 1557 which receives as its input the output on line 1558 of inverter 1559. The input to inverter 1559 is the signal on line 1560 supplied at the output of register 1561 which is clocked by the P1 clock. The input to register 1561 is the output of NOR-gate 1562. The inputs to NOR-gate 1562 include the signal on line 1553 and the signal on line 1563 supplied at the output of AND-gate 1564. The inputs to AND-gate 1564 include the signal on line 1565 supplied at the output of register 1566 and the signal on line 1567 supplied at the output of register 1568. Register 1568 which is clocked by the P2 clock receives as its input the signal on line 1569 at the output of inverter 1570. The input to inverter 1570 is the signal on line 1571 at the output of register 1572. The input to register 1572 which is clocked by the P1 clock is the signal on line 1565 supplied at the output of register 1566. Register 1566 is clocked by the P2 clock and receives as input the signal on line 1573 at the output of NAND-gate 1574. The inputs to NAND-gate 1574 include the complement of the MODE2 signal on line 1535, the complement of the MODE1 signal on line 1533, and the complement of the MODE0 signal on line 1575. The signal on line 1575 is supplied at the output of inverter 1576 which receives as its input the MODE0 signal on line 1404. Thus, the output of the NAND-gate 1574 decodes a software reset.

Therefore, as can be seen, the mode control PLA operates in cooperation with the scan control state machine, band control state machine and transaction control state machine to generate transaction type signals and control the changing of modes set by the user of the RPC.

Figure 23:
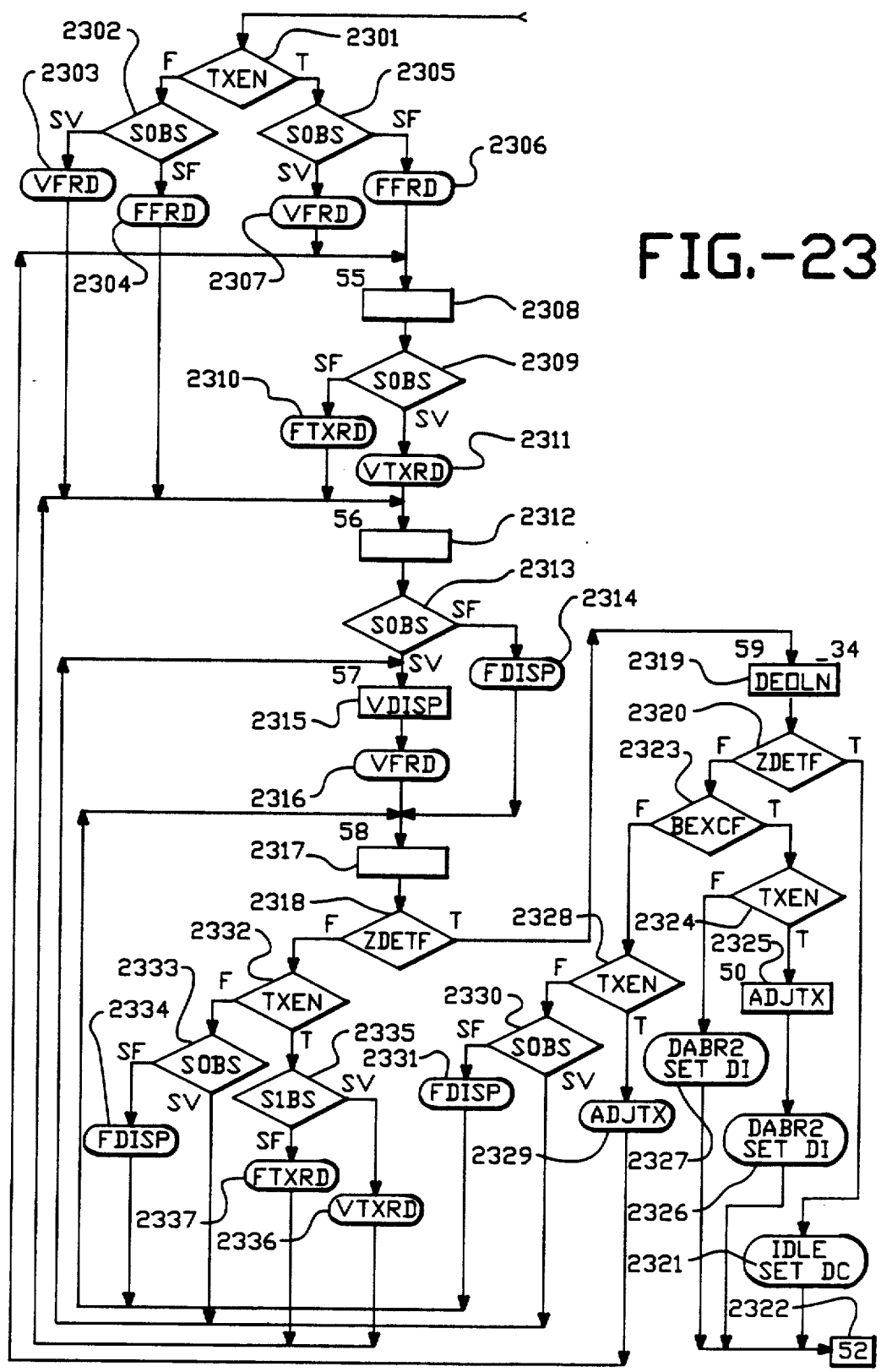
FIGS. 23 and 24 are a flow diagram for the dispatch mode in the mode control state machine.
Figure 24:
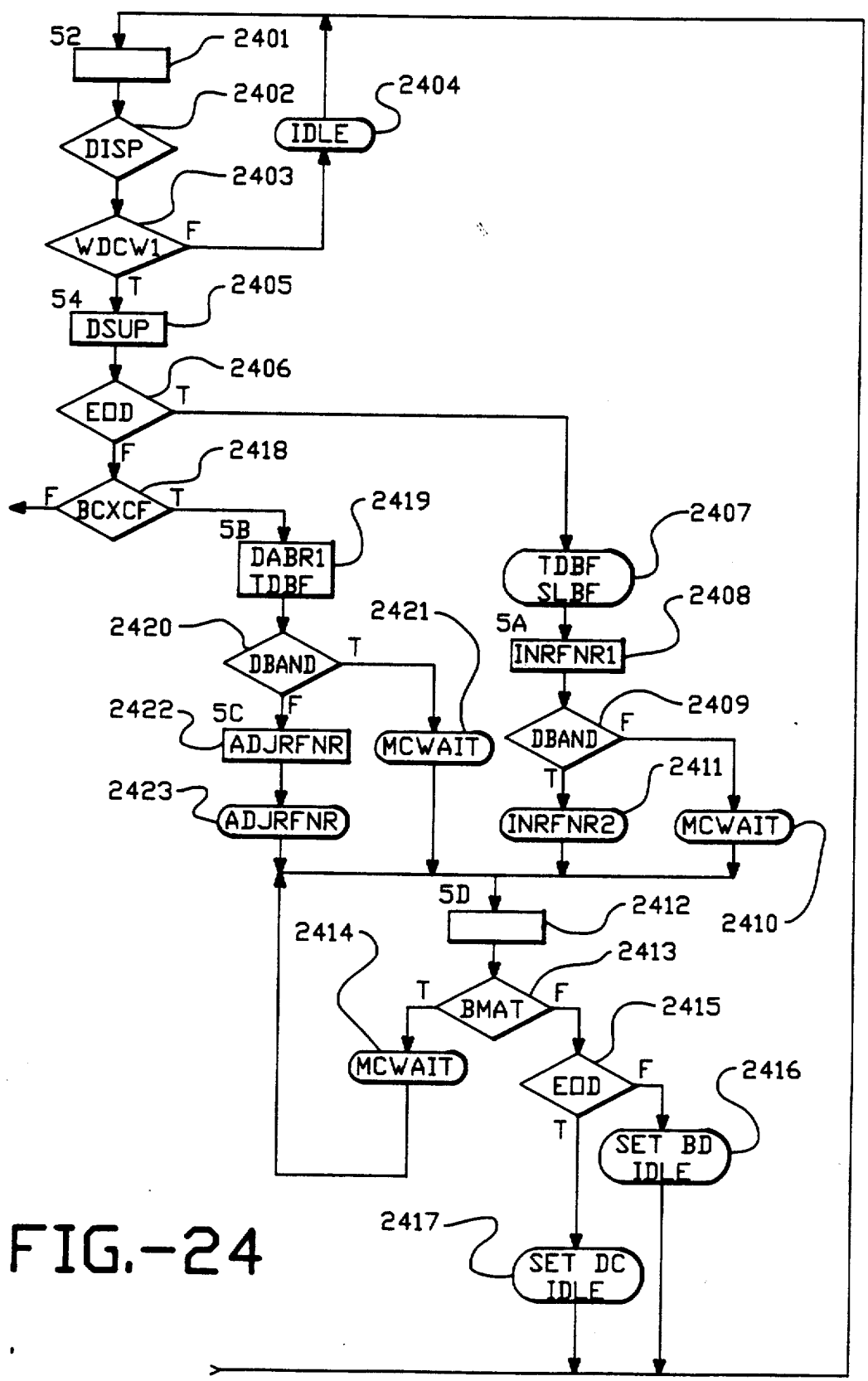
Figure 27:
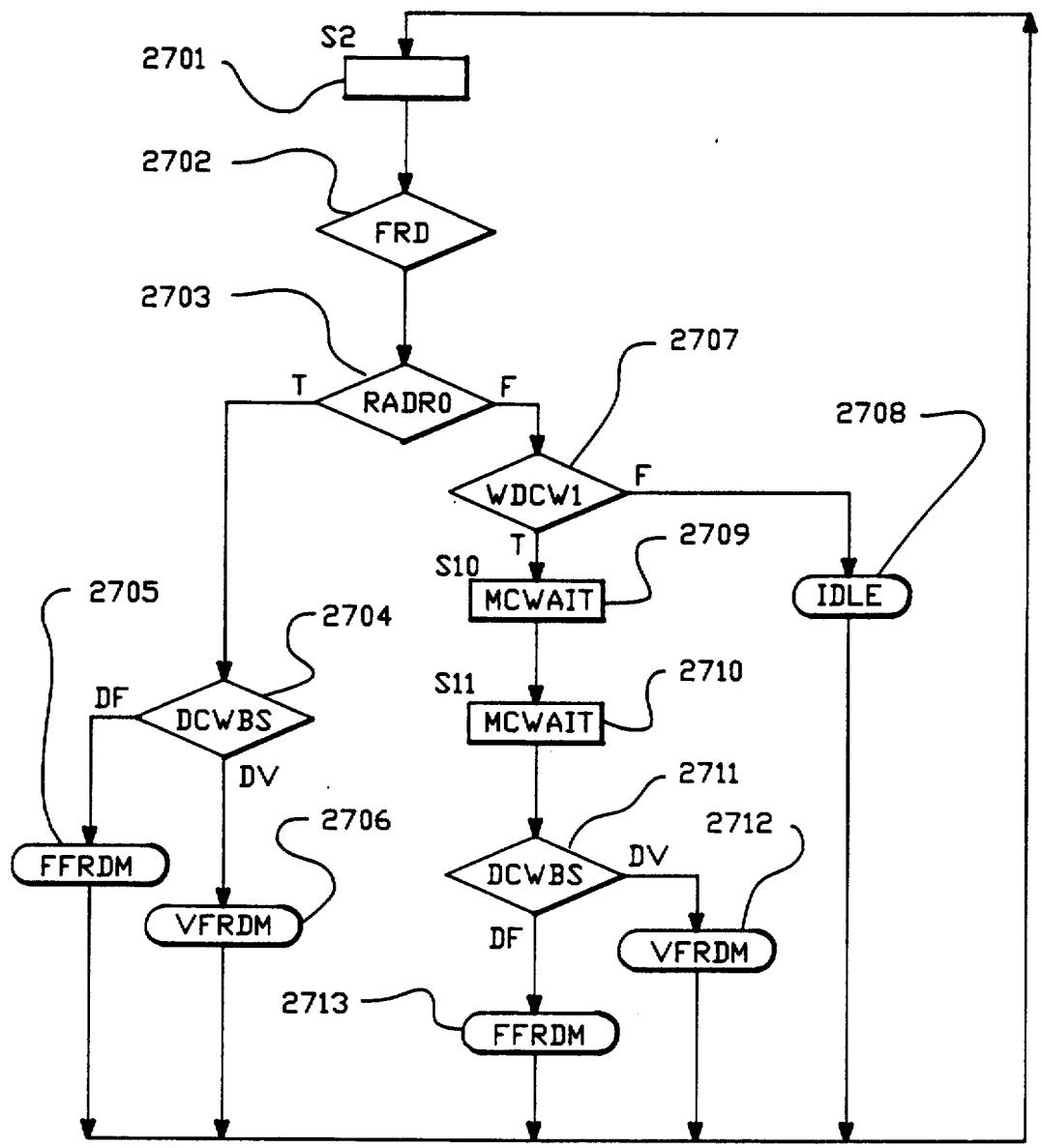
FIG. 27 is a flow diagram for the font read state flow in the mode control state machine.
Figure 28:
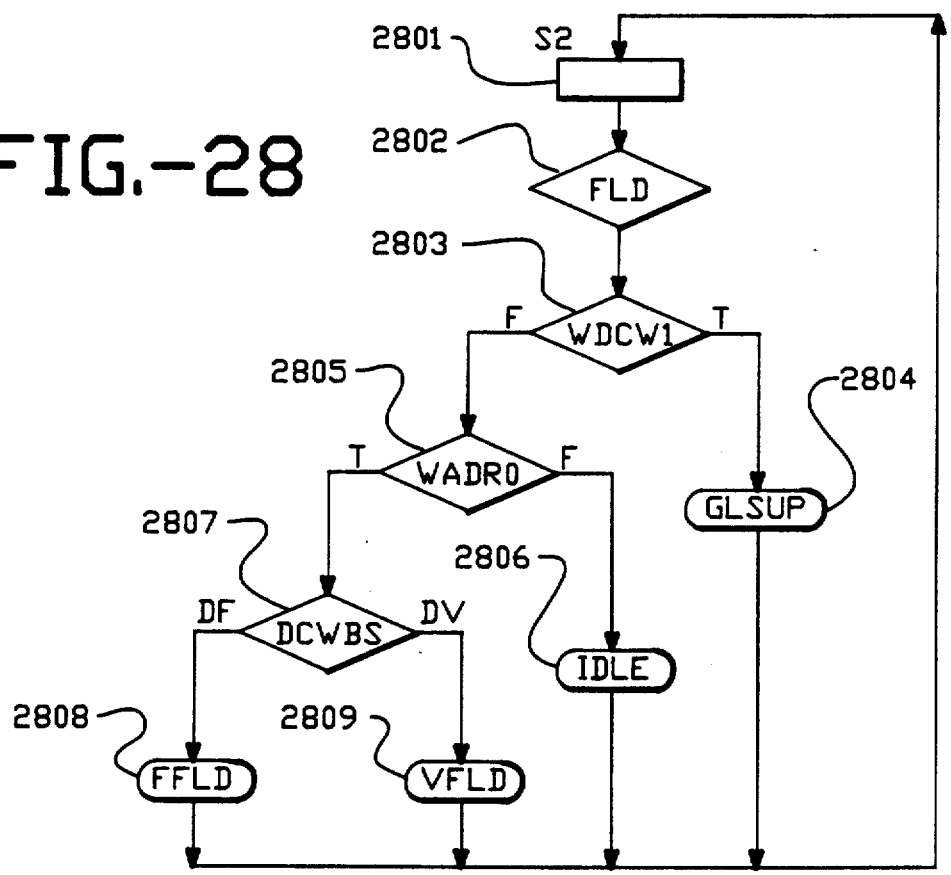
FIG. 28 is a flow diagram for the font load state flow in the mode control state machine.
Figure 29:
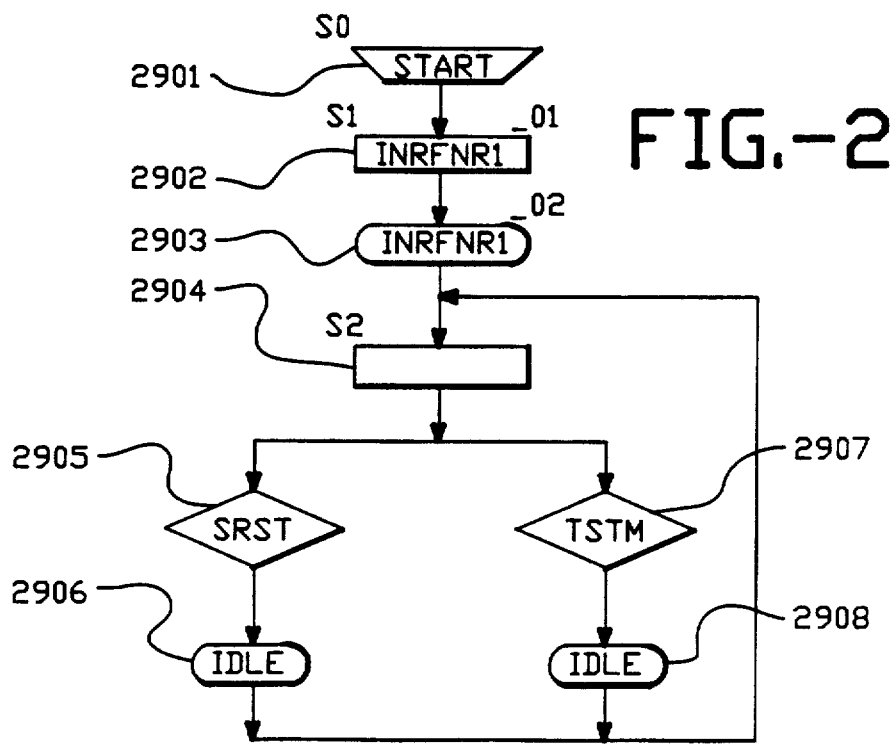
FIG. 29 is the mode control reset and test mode flow in the mode control state machine.

FIGS. 23-29 are flow diagrams illustrating the operation of the mode control state machine. FIGS. 23 and 24 combine to show the state flow for the dispatch mode. This state flow begins in FIG. 24 at block 2401 in state S2. State S2 is entered initially during the reset flow which is illustrated in FIG. 29 below.

In state S2 in block 2401, if the dispatch mode is indicated at block 2402, the WDCW1 signal is tested in block 2403. If WDCW1 is false indicating that the last word of the destination command word has not been written, the IDLE transaction type is asserted in block 2404 and the state flow returns to state S2 in block 2401. If the WDCW1 signal is true indicating that the last word of the destination command word has been written, then state S4 is entered in block 2405 and the DSUP transaction type is asserted. This transaction type is a dispatch setup operation in which the destination current address is converted from a virtual to a real address for the assembly memory and the band exceeded flag is set for the calculated real address if it falls outside the current dispatch band. Also, the variable NXSLR is initialized with the value of VXSR+1 if the least significant 4 bits of PXSR are not zero. Otherwise, NXSLR is set to the value VXSR. Further, the TSIWR1 and TSIWR0 values are loaded in the register file. Then the NXSLR value is reduced by the SIWR0 value which is the width of the image being dispatched.

After the state S4, the EOD bit is tested in block 2406. If EOD is true, the TDBF and SLBF signals are asserted in block 2407, toggling the dispatch band and setting the last band flag. After block 2407, the state SA is entered in block 2408 and the INRFNR1 transaction type signal is asserted. In this transaction, the RFNR register is initialized for the first band by setting it to zero.

After block 2408, the DBAND signal is tested in block 2409. If it is low, the MCWAIT transaction type signal is asserted in block 2410, causing the state machine to wait. If the DBAND signal in block 2409 is HIGH, the INRFNR2 transaction type is asserted in block 2411. This transaction causes the RFNR register to be initialized to the value for the second band. From blocks 2411 or 2410, the state flow goes to state SD in block 2412. After block 2412, the BMAT signal is tested in block 2413. If the BMAT signal is true, the state machine branches to block 2414 where the MCWAIT transaction type is asserted and the loop returns to state SD in block 2412.

If the BMAT signal is false in block 2413, the EOD bit is tested in block 2415. If EOD is false in block 2415, the set BD code is applied to the MCSTA field and the IDLE transaction type is asserted in block 2416. If the EOD signal is true in block 2415, the set DC code is applied to the MCSTA field and the IDLE transaction type is asserted in block 2417. From block 2417 or 2416, the state flow returns to state S2 in block 2401.

This branch of the state flow is taken when the EOD bit in DCW1 indicates that the dispatch is ended. If it is ended, the dispatch band is toggled and the RFNR register is initialized to the appropriate band. If, after initialization of RFNR and toggling of DBAND, the BMAT signal is asserted by the band control, a further dispatch must be held off until the BMAT signal is changed to false indicating that the scanout of the band is complete. If after the BMAT test, the EOD bit remains true, the state machine idles and the dispatch complete bit is set in the CCW. If the EOD bit was set by the write to DCW1 that started the dispatch, it will remain set, and block 2415 will branch through 2417 causing the DC bit to be set. IF EOD has become false, the BD interrupt is taken and the IDLE transaction type is asserted.

If the EOD bit in block 2406 is false, the BEXCF flag is tested in block 2418. If the BEXCF flag is true indicating that the dispatch band boundary has been exceeded by the converted virtual address generated in the dispatch setup, then the state flow branches to state SB in block 2419 where the DABR1 transaction type is asserted and the TDBF signal toggles the dispatch band. The DABR1 transaction is a dispatch abort routine which re-converts the converted destination current address back to a virtual address, undoing the dispatch setup.

After block 2419, the DBAND signal is tested in block 2420. If DBAND is HIGH, the MCWAIT transaction type is asserted in block 2421. If DBAND is LOW in block 2420, the state SC is entered in block 2422 where the ADJRFNR transaction type is asserted. After assertion of the MACK signal, the ADJRFNR transaction type is carried out in block 2423. The ADJRFNR transaction type adjusts the reference register by adding VBBR to its current value. The state flow goes from block 2423 or 2421 to state SD in block 2412. This branch from block 2418 is taken when the information to be dispatched lies outside the current dispatch band boundary. In this case, the dispatch must be aborted and the next dispatch band entered.

If in block 2418, the BEXCF flag is not asserted, a branch is taken to FIG. 23, block 2301 where the TXEN signal is tested. If TXEN is false, the S0BS signal is tested in block 2302. The S0BS signal is a bus select bit indicating whether the read is to occur from the font memory or the video memory. If S0BS indicates video memory, the state flow branChes to block 2303 where the VFRD transaction type is asserted. This transaction results in a read from the video memory at the source current address indicated by SCW0. The read data is supplied to the IOREG of the barrel shifter. If the address hold bit AH in the CCW is set to 0, the SCAR0 value is incremented. Otherwise, it is left at its current value.

If S0BS in block 2302 indicates a font memory read, the sub-routine branches to block 2304 where a FFRD transaction type is asserted. The FFRD transaction type is a font read through the font interface unit.

If the TXEN bit in block 2301 is true, indicating a texture read, the state flow branches to block 2305 where the S0BS bit is tested. For a font interface read, the state machine branches to block 2306. For a video interface read, the state machine branches to block 2307. From blocks 2306 or 2307, the state machine enters state S5 in block 2308. In state S5, the S1BS bit is tested in block 2309 to determine whether the texture block is to be read from the font or video memory. If the texture block is to be read from the font memory, the sub-routine branches to block 2310 where the FTXRD transaction type is asserted. In this transaction, the font interface unit texture read algorithm is carried out. A read through the font interface at address SCAR1 is accomplished with the data being loaded to the TXTREG register of the barrel shifter. If the AH bit is equal to 0, the SCAR1 is incremented; otherwise it is held the same. Also, the TSIWR1 register in the register file is decremented.

If the S1BS bit in block 2309 indicates a video texture block, the state flow branches to block 2311. In block 2311, the VRXRD transaction type is asserted indicating a texture read from the video interface.

From blocks 2303, 2304, 2310 or 2311, the state machine enters state S6 in block 2312. In state S6, the S0BS bit is again tested in block 2313. If S0BS indicates a font memory access, the FDISP transaction type is asserted in block 2314. The FDISP transaction is a dispatch with font in font memory. This is carried out by requesting a read/modify/write transaction from the video interface writing the resulting data to the destination current address from the output of the barrel shifter. A font interface read is requested with SCAR0 address data being supplied to the IOREG in the barrel shifter. Also, the DCAR value is incremented, the TSIWR0 value is decremented and if the address hold bit is equal to zero, the SCAR value is incremented. Finally, the zero detect flag is updated by the ALU output during the decrementing of the TSIWR0 register.

If the S0BS bit in block 2313 is indicating a font in the video memory, the VDISP transaction type is asserted in state S7 in block 2315. The VDISP is a dispatch with a font in video memory. This transaction is a read-/modify/write access through the video interface. A simultaneous request for a read from the location of the font in the video memory is not carried out during this transaction. After the VDISP transaction in block 2315, a VFRD transaction type is asserted in block 2316 where the next word of the font in the video memory is read. From blocks 2316 or 2314, the state machine enters state S8 at block 2317. From state S8, the ZDETF flag is tested in block 2318 to indicate whether the end of a line of a font image block has been reached. If the end of line has been reached, the state machine branches to block 2319 where the DEOLN transaction type is asserted. In this dispatch end of line transaction, a read/modify/write operation is requested from the video interface to the address DCAR. DCAR is updated to the value of DCAR plus the NXSLR variable. Also, the SIHR0 register is decremented and the band exceeded flag is set if appropriate. The zero detect flag is updated by the ALU output during the decrementing of the SIHR0 register. Finally, the TSIWR0 register is reset to the SIWR0 value.

From block 2319, the ZDETF flag is tested in block 2320. If the ZDETF flag is true in block 2320, the flow branches to block 2321 where the IDLE transaction type is asserted and the DC flag is set. From block 2321, the flow branches to state S2 in block 2322. This corresponds to state S2 at block 2401.

If the ZDET flag is false in block 2320, the BEXCF flag is tested in block 2323. If the BEXCF flag is true, the TXEN value is tested in block 2324. If the TXEN value is true, the ADJTX transaction type is asserted in state SE in block 2325. The ADJTX transaction adjusts the texture source address if the AH bit is zero, by adding the TXIWR1 value to it. The TSIWR1 value is then reset to its initial SIWR1 value. From block 2325, the state machine asserts the DABR2 transaction type in block 2326 and the DI flag is set. The DABR2 transaction type is a dispatch abort in which the SCAR0 value is decremented if AH is equal to zero and converts DCAR back to a virtual page address by adding RFNR to it. From block 2326, the state flow branches to state S2 in block 2322. If the TXEN bit is false in block 2324, the state routine branches to block 2327 where the DABR2 transaction type is asserted and the DI flag is set. From block 2327, the routine branches to state S2 in block 2322.

If the BEXCF signal is false in block 2323, the TXEN bit is tested in block 2328. If the TXEN value is true in block 2328, the ADJTX transaction type is asserted in block 2329, and the routine branches to state S5 in block 2308. In this case, the texture for the next image word is read for the next line. If the TXEN bit in 2328 is false, no texture read is necessary and the S0BS bit is tested in block 2320. If the S0BS bit indicates a video interface read, the state machine branches to state S7 in block 2315 to complete the video dispatch routine. If the S0BS bit in block 2330 indicates a font read, the FDISP transaction type is asserted in block 2331 and the routine branches to state S8 in block 2317. From blocks 2330 and 2331, the video or font dispatch is continued in the next line of the dispatched image.

If the ZDETF flag is not true in block 2318 indicating that the end of the line has not been reached, the TXEN bit is tested in block 2332. If TXEN indicates that it is not a texture read, the S0BS bit is tested in block 2333. If a font read is needed a FDISP transaction type is asserted in block 2334 and the routine branches to state S8 in block 2317. If the S0BS bit in block 2333 indicates a font in the video memory, the routine branches to state S7 in block 2315.

If the TXEN bit in block 2332 is true, the S1BS bit is tested in block 2335. If the texture block is in the video memory, the VTXRD transaction type is asserted in block 2336 and the routine branches to state S6 in block 2312. If the S1BS bit in block 2335 indicates a texture block in the font memory, the FTXRD transaction type is asserted in block 2337 and the routine branches to state S6 in block 2312.

Thus, it can be seen that the mode control state machine supports a dispatch of both font and texture from either the source memory or the assembly memory interfaces, automatically calculating addresses in two dimensions to complete the dispatch.

Figure 25:
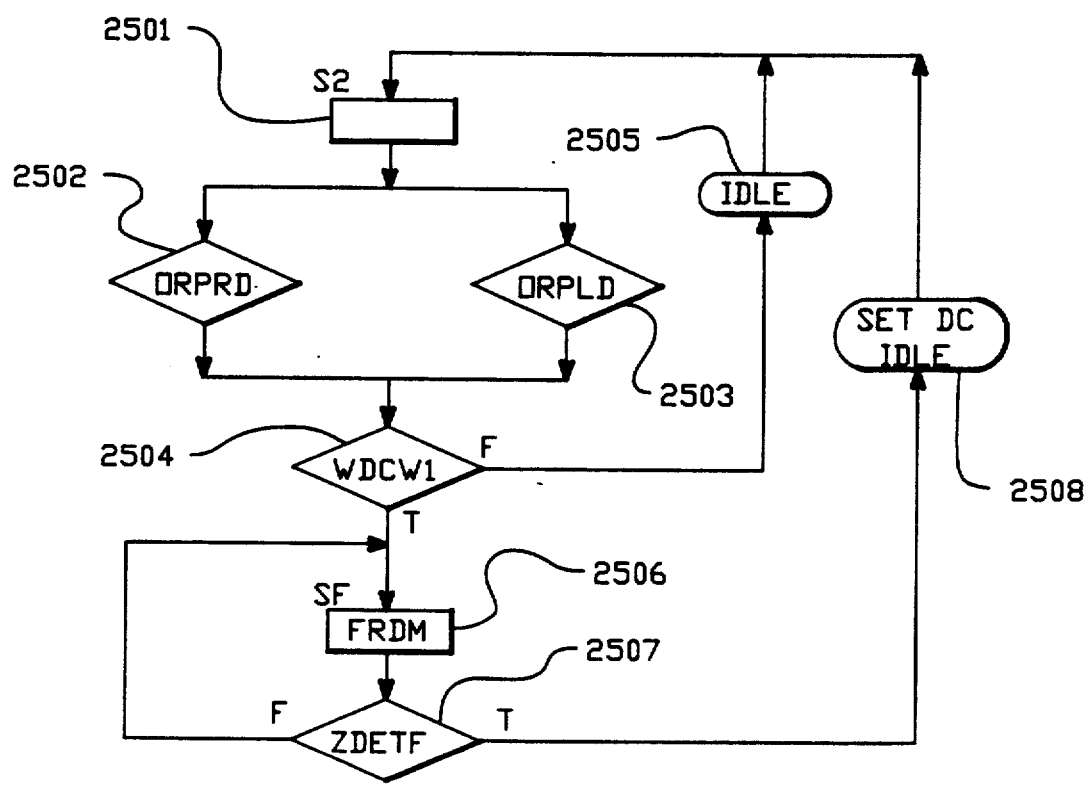
FIG. 25 is a flow diagram for the ORP load and read modes in the mode control state machine.

FIG. 25 is the state flow diagram for the ORP load and read modes. The state flow begins at state S2 in block 2501. From state S2, if the mode is indicated an ORPRD in block 2502 or ORPLD in block 2503 indicating ORP read or ORP load, respectively, the WDCW1 bit is tested in block 2504. If the WDCW1 bit is false indicating that the last word of the destination command word has not been written, the IDLE transaction type is asserted in block 2505. If WDCW1 is true, the state SF is entered in block 2506 where the FRDM transaction type is asserted. The FRDM transaction results in supplying the DCAR address to the font interface unit reaching addressed data to IOREG, incrementing DCAR, and decrementing the SCAR0 address (used for ORP count). After the FRDM transaction in block 2506, the ZDETF flag is tested in block 2507. If ZDETF is false, the state machine branches to state SF in block 2506. If ZDETF is true, the IDLE transaction type is set in block 2508 and the DC bit is set. From block 2508, the state machine returns to state S2 in block 2501.

Figure 26:
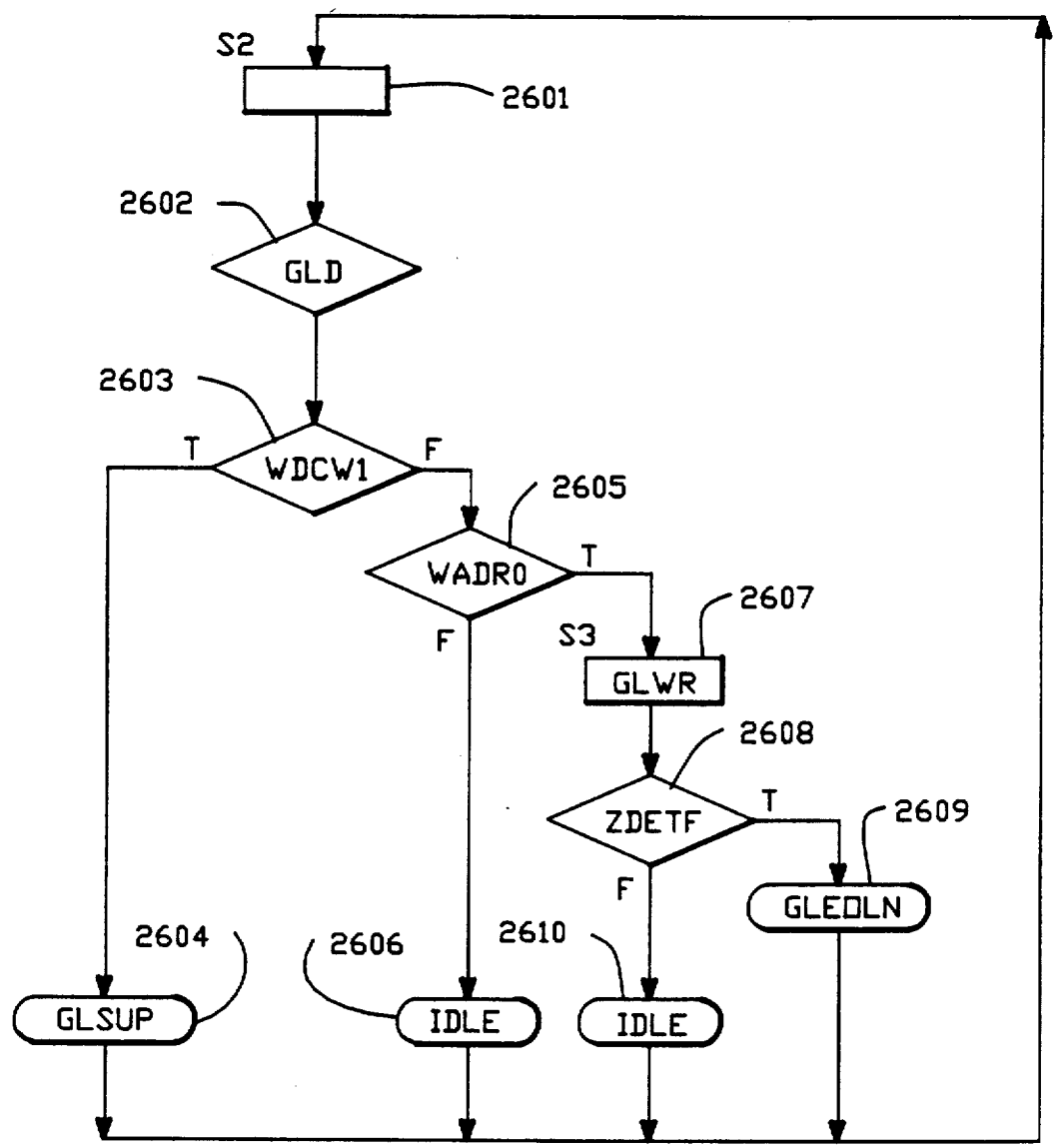
FIG. 26 is a flow diagram for the graphics load mode in the mode control state machine.

FIG. 26 illustrates the graphics load state flow in the mode control state machine. It begins in state S2 in block 2601. If the mode is decoded as a graphics load GLD in block 2602, the WDCW1 bit is tested in block 2603. If WDCW1 is true, the GLSUP transaction type is asserted in block 2604. This is a graphics load setup transaction setup in which the NXSLR register is set to VXSR or VXSR+1 depending on the value of the four least significant bits of PXSR. Also, the TSIWR0 register is set to the value of SIWR0 and the NXSLR value is decreased by the value of SIWR0. Also, the zero detect flag is updated by the ALU output. From block 2604, the routine branches back to state S2 in block 2601. If the mode continues to be the graphics load mode as indicated in block 2602, the WDCW1 bit is tested in block 2603. If the signal is now false, the WADR0 signal is tested in block 2605. If this signal is asserted, it means that the CPU interface has received a write to address zero. If it is false, the state machine branches to block 2606 where the IDLE transaction type is asserted and from block 2606 it returns to state S2 in block 2601. If the write to address zero has been detected in block 2605, the GLWR transaction type is asserted in state S3 at block 2607. The GLWR transaction type is a graphics load write which is carried out in the same manner as the VDISP transaction discussed above. After state S3 in block 2607, the ZDETF flag is tested in block 2608. If ZDETF is true, the GLEOLN transaction type is asserted in block 2609. This transaction is the graphics load end of line in which a read/modify/write request is made to the video interface unit to the address DCAR from the output of the barrel shifter. The DCAR value is updated by the NXSLR register value and the TSIWR0 value is reset to the value of SIWR0.

If the ZDETF flag in block 2608 is false, the IDLE transaction type is asserted in block 2610. The routine returns to state S2 in block 2601 from block 2610 or 2609.

FIG. 27 illustrates the font read state flow for the mode control state machine. This state flow begins in state S2 in block 2701. If the mode is a font read as indicated in block 2702, the RADR0 signal is tested in block 2703. The RADR0 signal is asserted when a read to the CPU interface address zero is made. If the RADR0 signal is true, the DCWDS bit is tested in block 2704. If this signal indicates a read to a font in font memory, the FFRDM transaction type is asserted in block 2705. Otherwise, if the font is in the video memory the VFRDM transaction is asserted in block 2706. The FFRDM transaction from block 2705 is a read through the font interface from address SCAR0 to the I/O register of the barrel shifter. The SCAR0 value is incremented. Likewise, the VFRDM transaction is a read through the video interface to SCAR0. The data is stored to the IOREG of the barrel shifter and the SCAR0 address is incremented. From either block 2705 or 2706, the state machine branches back to state S2 at block 2701.

If the RADR0 signal in block 2703 is false, the WDCW1 bit is tested in block 2707. If WDCW1 is false, the IDLE transaction type is asserted in block 2708 and the routine returns to state S2 in block 2701.

If the WDCW1 bit is true in block 2707, the state S10 is entered where the MCWAIT transaction type is asserted at block 2709. Next, the state S11 is entered where the MCWAIT transaction type is again asserted in block 2710. The MCWAIT transaction type causes the transaction control to wait one cycle. After state S11 in block 2710, the DCWBS bit is tested in block 2711. If it indicates that the font to be read is in the video memory, the VFRDM transaction type is asserted in block 2712. Otherwise, the font is in the font memory and the FFRDM transaction type is asserted in block 2713. The state flow branches to state S2 in block 2701 from either block 2713 or block 2712.

FIG. 28 illustrates the font load state flow. The state flow begins in state S2 in block 2801. If the font load mode is indicated in block 2802, the WDCW1 bit is tested in block 2803. If WDCW1 is true, the GLSUP transaction type is asserted in block 2804. GLSUP is a graphics load setup which is used here as well. From the block 2804, the state returns to state S2 in block 2801. If the mode remains the FLD mode in block 2802, the WDCW1 bit is tested again. If it is false, the WADR0 signal is tested in block 2805. If no write to address zero is being carried out by the CPU interface, the IDLE transaction type is asserted in block 2806.

If a write to the address zero by the CPU interface is being carried out, the DCWBS bit is tested in block 2807. If it indicates that a load of the font in the font memory is to be carried out, the FFLD transaction type is asserted in block 2808; otherwise, a load of the font to the video memory is to be carried out in the VFLD transaction type asserted in block 2809. From either block 2808 or block 2809, the state flow returns to state S2 in block 2801.

The FFLD transaction type is a font load through the font interface unit. In this, a font interface write is requested to the DCAR address of the data from the IOREG of the barrel shifter. The DCAR address is incremented.

The VFLD transaction type is a font load to the video interface. In this case, a request to write in the video interface is made at address DCAR of the data at the output of the barrel shifter. Also, the value of the DCAR is incremented.

FIG. 29 illustrates the mode control reset and test mode flows. This flow starts in state 0 at block 2901 after a reset of the system. After state S0, state S1 is entered where the INRFNR1 transaction type is asserted at block 2902. After a MACK signal is received from the transaction control, the INRFNR1 transaction type is asserted again in block 2903. From there, state S2 is entered at block 2904. This state S2 corresponds to the S2 value in preceding FIGS., 23-28.

From state S2 in block 2904, the mode value is tested. If it indicates a software reset in block 2905, the IDLE sub-routine transaction type is asserted in block 2906. Likewise, if the mode field indicates test mode in block 2907, the IDLE transaction type is asserted in block 2908. The state flow from block 2906 or block 2908 returns to state S2 in block 2904.

Therefore, in addition to the dispatch mode, the RPC can be used by the host processor as a resource for establishing and analyzing font libraries using the font read and font load modes in either the video or font memory space. Also, special purpose graphics images can be stored in the video or font memory, using the RPC through the graphics load mode. Also, in order to support the ORP, the special modes for ORP load and ORP read are provided.

6.4 TRANSACTION CONTROL STATE MACHINE

Figure 16:
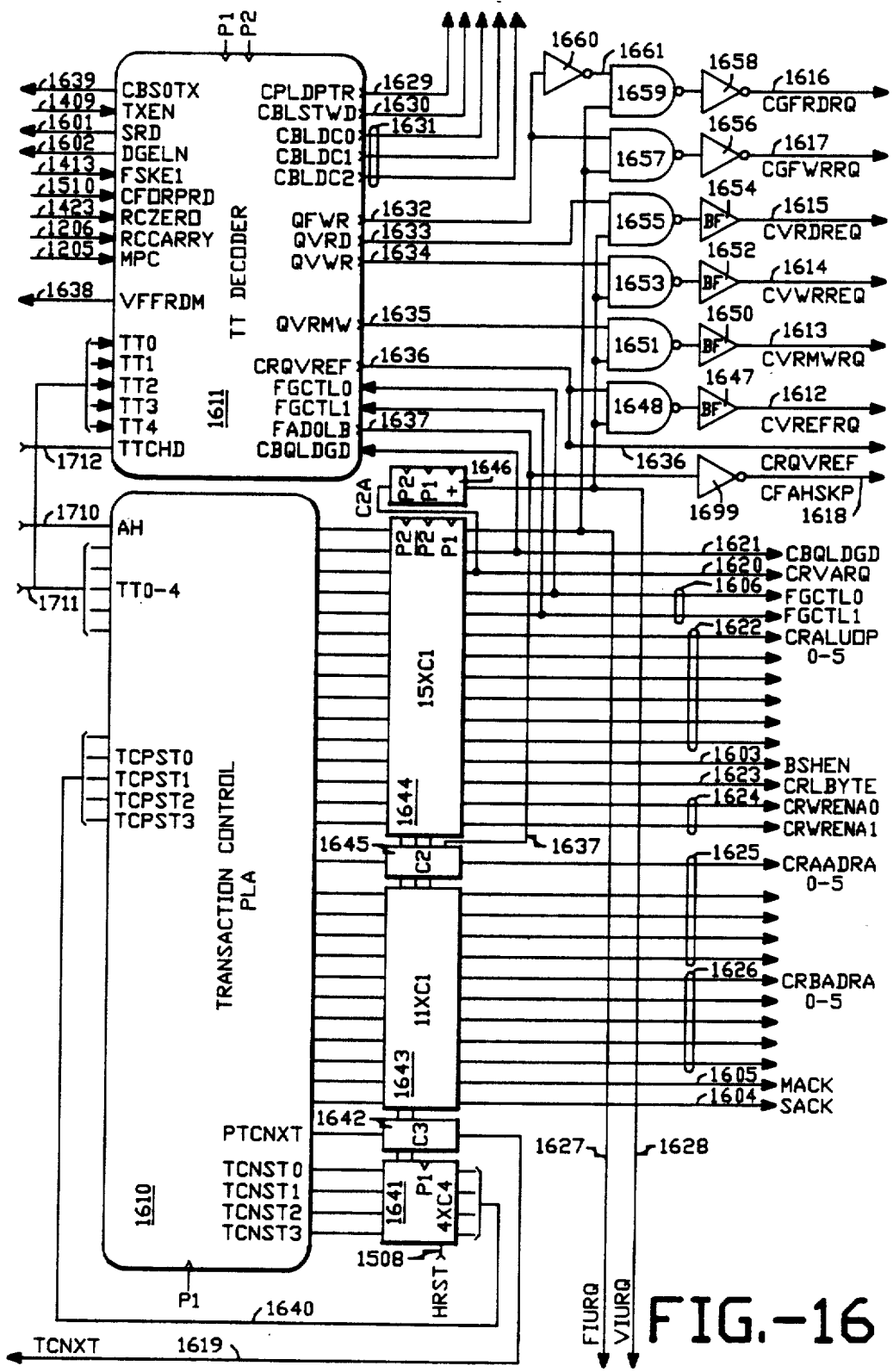
FIGS. 16, 17 and 18 are a logic diagram of the transaction control block in the RPC.
Figure 17:
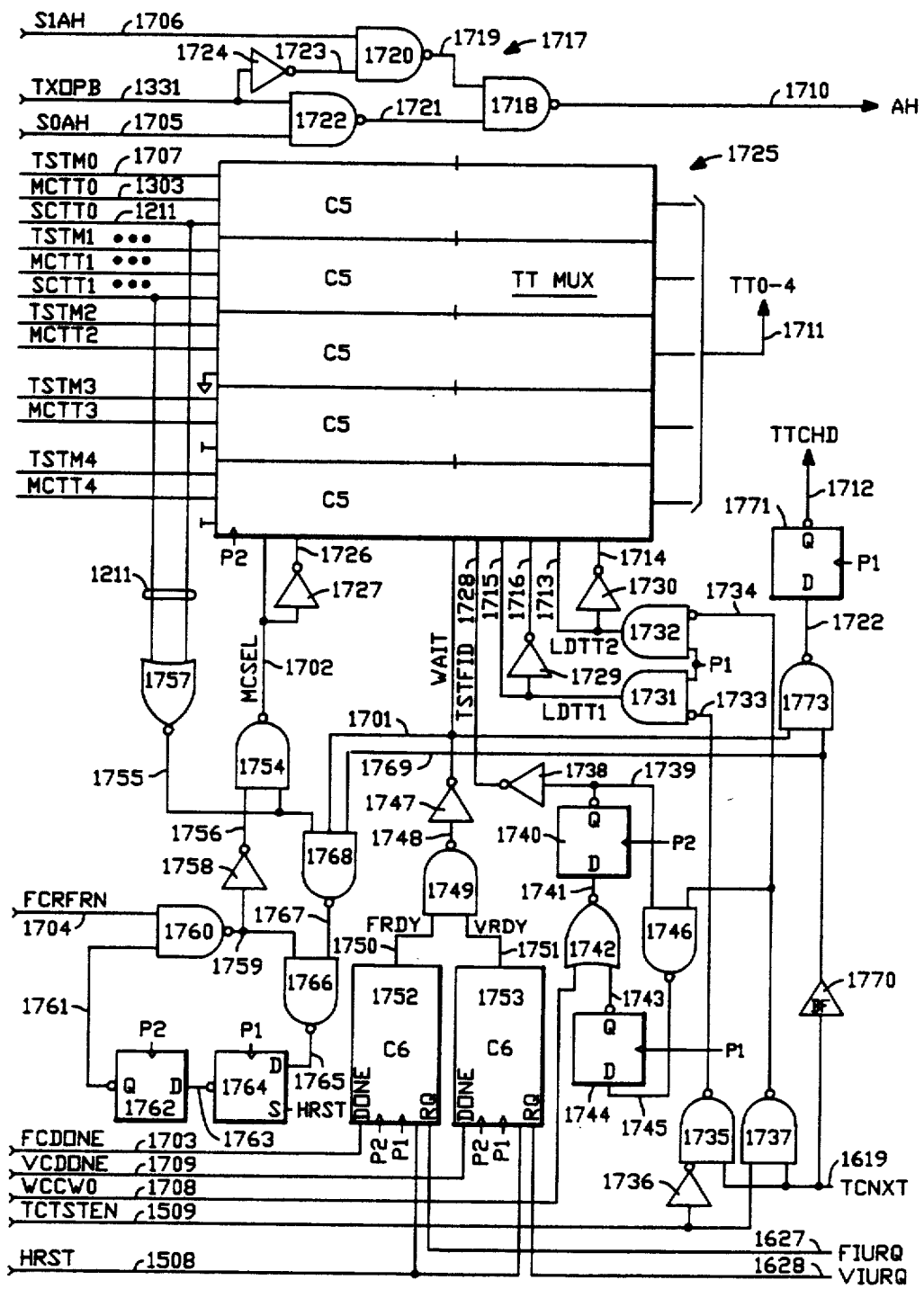
Figures 18, 21:
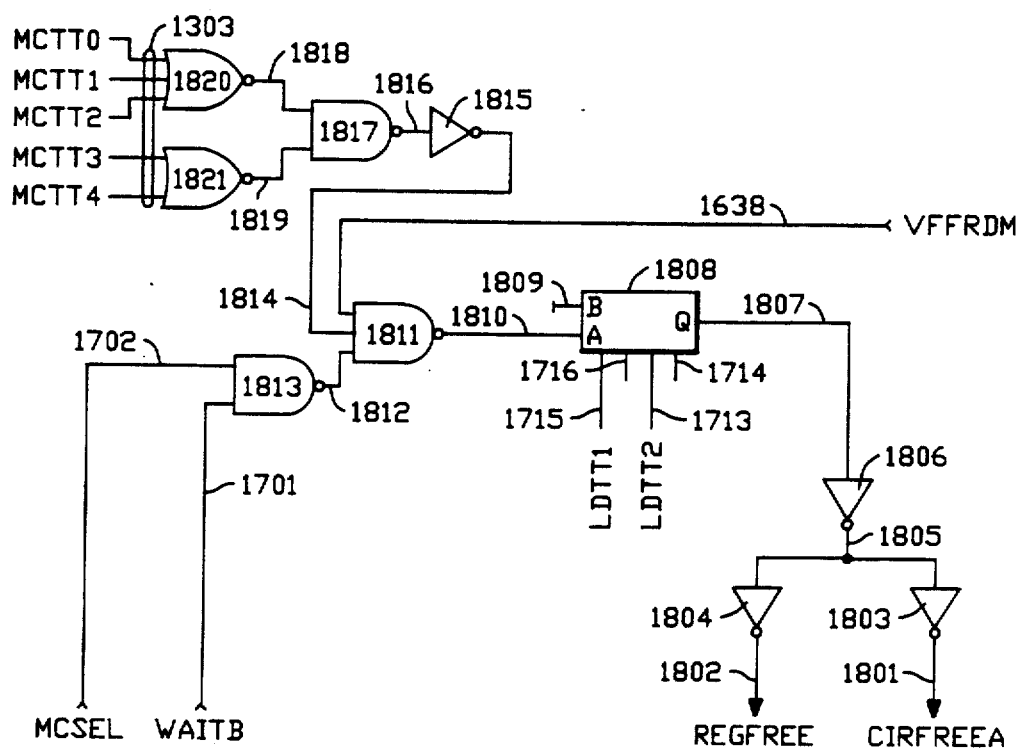
FIG. 21 is a diagram of the word assignment in the central control register file.
Figure 19:
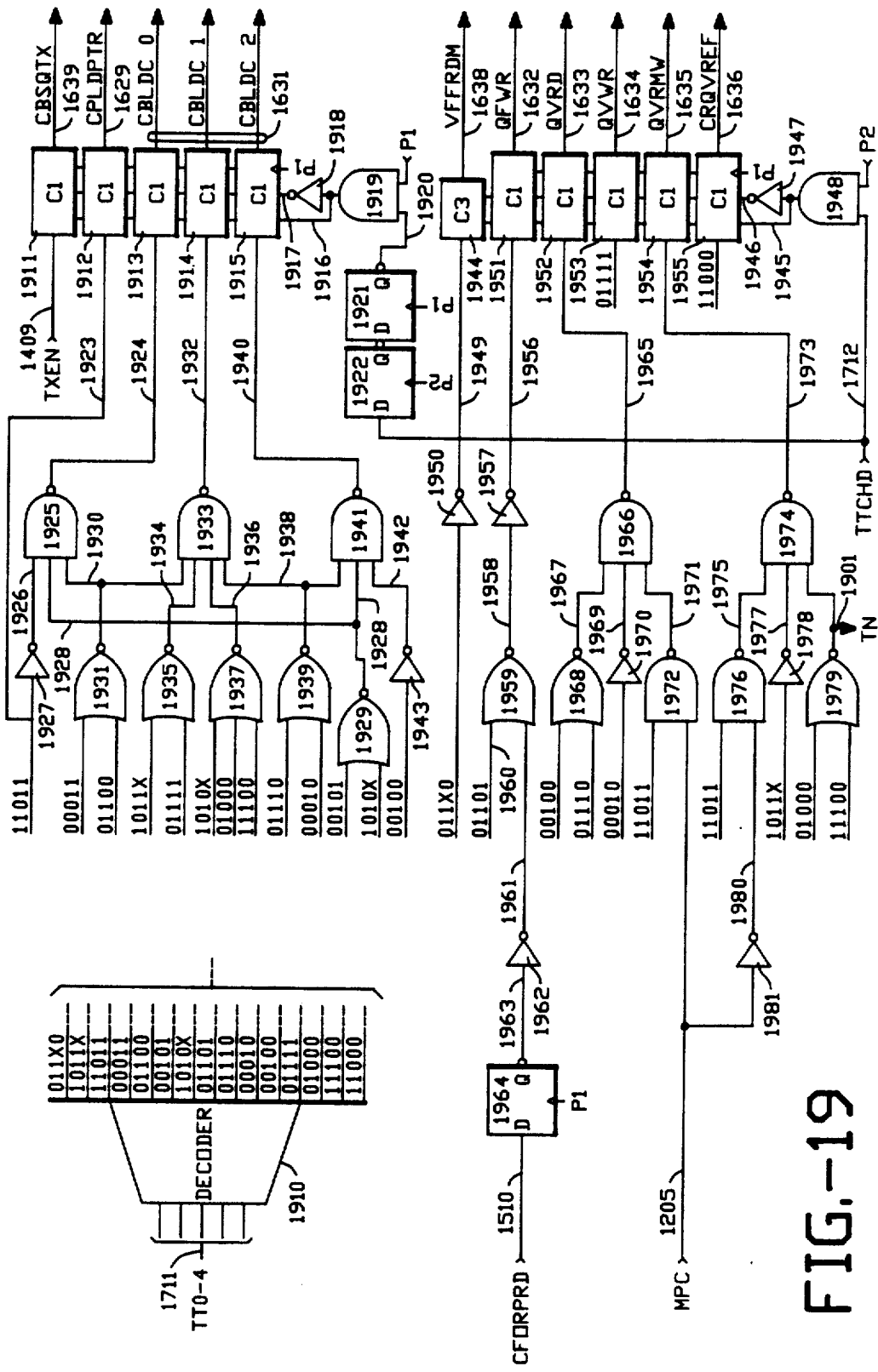
FIGS. 19 and 20 are a logic diagram of the transaction-type decoder in the transaction control block of the RPC.
Figure 20:
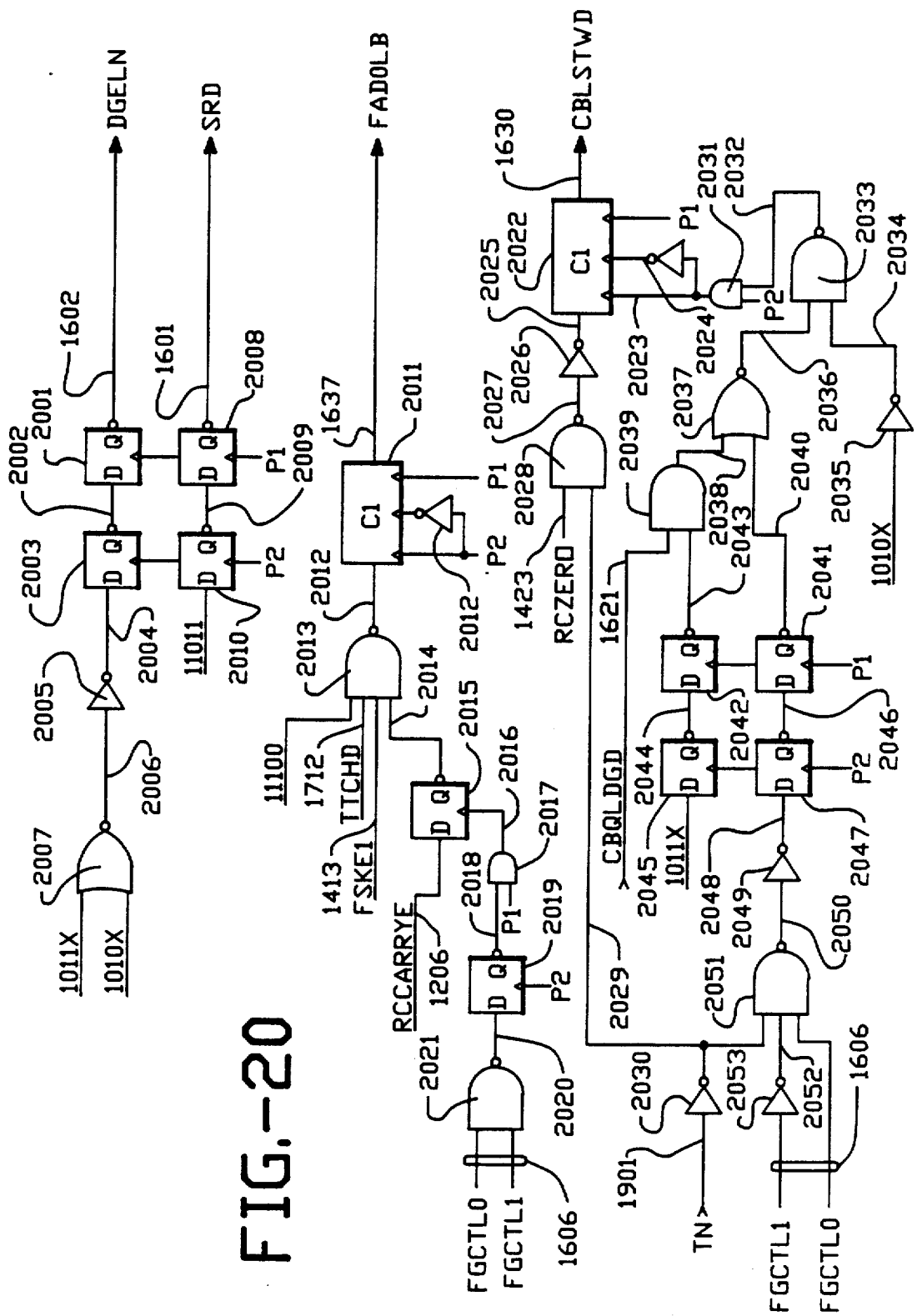

FIGS. 16, 17, 18, 19 and 20 illustrate the transaction control state machine. FIG. 16 shows the transaction control PLA 1610, the transaction type decoder 1611 and the associated output logic. FIG. 17 shows the input logic for supplying the input signals to the transaction control PLA 1610 and decoder 1611. FIG. 18 shows logic generating the register-free control signals. FIGS. 19 and 20 illustrate the implementation of the transaction-type decoder 1611. The operation of the transaction control PLA 1611 is set out in the table entitled RPC TRANSACTION CONTROL PLA SOURCE CODE.

The input signals to the transaction control state machine shown in FIGS. 16, 17 and 18 are set out as follows:

INPUTS TO TRANSACTION CONTROL STATE MACHINE

TSTM(4:0) 1707—test mode, output from the test mode register. Test mode register is loaded with the least significant 7 bits of data written to CCW0. TSTM6 1505 and TSTM5 1506 are supplied to the mode control state machine.

HRST 1508—hardware reset, a delayed version of CGRESETJ 1507.

TXOPB 1331—textured operation, active LOW, asserted if the current MCTT is an operation that will modify the texture address, SCAR1. It is used on the transaction control schematic to control the address hold AH MUX 1717.

TCTSTEN 1509—transaction control test enable, used to enable transaction control to go into test mode where TT can be forced from TSTM field.

WCCW0 1708—write to CCW0. One cycle pulse to tell transaction control when there has been an I/0 write to CCW0. It is used for test mode to tell when the forced-in transaction type field TT0-4 should be taken.

FCRFRN 1704—refresh request signal, active LOW. Asserted for one cycle to request a refresh cycle.

S0AH 1705—Output from the (AH) bit of SCW0.

S1AH 1706—Output from the (AH) bit of SCW1.

FCDONEC 1703—font interface unit done, asserted by the FIU to tell central that it is done with the last request.

VCDONEC 1709—video interface unit done, asserted by the VIU to tell central that it is done with the last request.

MCTT(4:0) 1303—mode control transaction type. This field is used to specify the type of transaction that mode control is requesting of the transaction control SM.

SCTT(1:0) 1211—Scan control transaction type. This field is used to specify the type of transaction that scan control is requesting of transaction control SM. When generating the 5 bit wide TT field logic on the TC schematic forces the most significant 3 bits of TT to 110 binary.

CFORPRDJ 1510—ORP read, active if the current mode field is ORP read supplied to TT decoder 1611.

FSKE1 1413—font skip enable 1, active if the control registers SCW0 and SCW1 are set up so that the font is the only thing in font memory, font in font memory and untextured or texture in video memory. Used by logic on TT decode that generates signals to tell the FIU to skip the high address cycle.

MPC 1205—multiple printer control to TT decoder 1611, output from CCW0 MPC bit.

RCZERO 1423—output of the zero detect from the ALU to the TT decoder. Active if the ALU output is zero.

TXEN 1409—texture enable bit TX from SCW0.

RCCARRY 1206—carry output of the ALU. During adds high if ALU carry, during subtracts low if borrow. Same signal as RCCARRYE.

The signals generated by the transaction control state machine with the transaction type decoder 1611 are set out as follows:

OUTPUTS FROM TRANSACTION CONTROL

CBQLDGD 1621—quality load guard, used to tell the barrel shifter when to load its guard. It is used on TT decoder 1611 in generating the last word, LSTWD signal for the barrel shifter.

CIRFREEA 1801—register free, used to tell the CPU interface that the register file is free (can be used for I/O read and write). Also REGFREE 1802.

VIU (video interface) active low request lines:
CVREFRQ 1612—refresh request
CVRMWRQ 1613—read-modify-write request
CVWRREQ 1614—write request
CVRDREQ 1615—read request FIU (font interface) request lines:
CGFRDRQ 1616—read request
CGFWRRQ 1617—write request
CGAHSKP 1618—skip high address cycle request TCNXT 1619—transaction control next, used to open up the TT latch when transaction control is waiting for a request.

MACK 1605—mode acknowledge

SACK 1604—scan acknowledge

CRVARQ 1620—video address request, used to strobe the video address generator logic when the low word of the video address is being read from the B port of the register file.

FGCTL(1:0) 1606—flag control, a coded field from TC that tells when to latch the carry or zero from the ALU for band exceeded flag UBEXC (FGCTL=10), zero detect flag UZDET (FGCTL=01), or for font interface carry UFICY (FGCTL=11.

CBQLDGD 1621—quality load guard, used to tell barrel shifter when the guard register should be loaded, which should be done before the font read of the next font data word overwrites IOREG.

CRALUOP(5:0) 1622—ALU operation field.

BSHEN 1603—Barrel shift enable, used by logic on band control to generate CRBX2, the multiply ALU B input by two signal.

CRLBYTE 1623—Low byte, used to tell the register file to write only the low byte.

CBWRENA(1:0) 1624—write enable, used to tell the register file one of the following: don't write anything, write to the location pointed to by AADR(4:0), or write to the location pointed to by BADR(4:0).

CRAADRA(4:0) 1625—register file A port address. Address of the location to be read and used as ALU input A.

CRBADRA(4:0)1626—register file B port address. Address of the location to be .read and used as ALU input B.

SRD 1601—active when the current transaction type TT is a scan read, SRD.

DGELN 1602—active when the current transaction type TT is a dispatch end of line, DEOLN, or a graphics end of line GLEOLN.

CPLDPTR 1629—load printer, data qualifier sent to the printer interface. It tells the printer interface to latch the VIU data when the VIU data strobe is asserted.

CBLSTWD 1630—last word, used to tell the barrel shifter that the end of the current line has been reached. The data word written to IOREG after the assertion of LSTWD should be saved for the start of the next line.

CBLDC(2:0) 1631—barrel shifter load control, used to control loading of barrel shifter registers. This field will remain valid starting when the first interface request is made and ending when the interface unit(s) are done. It is coded as follows:

| | |
|---|---|
| 000 | NOP |
| 001 | clear video latch |
| 010 | if FIU data strobe load IOREG with data from FIU, VIU is doing a dispatch, or graphic load, RMW |
| 011 | load IOREG with data from FIU |
| 100 | load TXREG with data from VIU |
| 101 | load TXREG with data from FIU |
| 110 | load IOREG with data from VIU |
| 111 | reset barrel shifter |

QFWR 1632—qualify font write, used on TC to mux the FIU request output FIURQ from the TC state machine to the font write request, CFFWRRQJ.

QVRD 1633—qualify video read, used on TC to mux the VIU request output from the TC state machine to the video read request CVRDREQN.

QVWR 1634—qualify video write, used on TC to mux the VIU request output from the TC state machine to the video write request CVWRREQN.

QVRMW 1635—qualify video RMW, used on TC to mux the VIU request output from the TC state machine to the video RMW request CVRMWRQN.

CRQVREF 1636—qualify video refresh, used on TC to mux the VIU request output from the TC state machine to the video refresh request, CVREFRQN.

FAD0LB 1637—force address 0 LOW, used on TC to force CRAADRA(0) LOW during FIU request when the high font address cycle is to be skipped.

VFFRDM 1638—active when transaction type is a font read.

CBS0TX 1639—registered copy of TXEN.

As can be seen in FIG. 16, the transaction control state machine consists primarily of a transaction control PLA 1610 and a transaction-type decoder 1611. The inputs to the transaction control PLA include the transaction-type code TT0-TT4 on line 1711, the transaction present state code TCPST0-TCPST3 on line 1640 and the address hold bit on line 1710 from the CCW0. The transaction control PLA is clocked by the P1 clock. The outputs of the transaction control PLA include the transaction next state code TCNST0-TCNST3 which is supplied through four corresponding C4 registers 1641 to lines 1640 as the TPST0-TPST3 signals on line 1640. The C4 registers are clocked by P2 and $\overline{P2}$ in the first stage and P1 in the second stage. The reset input to the C4 register 1641 is the HRST signal on line 1508. Also, the PTCNXTC signal is supplied through a C3 register as the TCNXT signal on line 1619. The C3 register 1642 is a one stage register clocked by P2 and P2. The remainder of the outputs of the transaction control PLA 1610 are supplied through C1 registers 1643 or 1644 with the exception of the CRAADRA0 bit from the CRAADRA0-CRAADRA5 address field 1625. This signal is supplied through C2 register 1645 which is clocked in its first stage by P2 and $\overline{P2}$, clocked in its second stage by P1 and receives as a reset input the FAD0LB signal on line 1637.

Both C1 register field 1643 and C1 register field 1644 are clocked by P2 and $\overline{P2}$ in the first stage of the registers and by P1 in the second stage. The VIURQ signal is supplied on line 1628. This signal is supplied at the output of C2A register 1646 which receives as its input the CRVARQ on line 1620. The C2A register 1646 is clocked by the P2 clock in the first stage, the P1 clock in the second stage and its reset input is set inactive.

The output signal CVREFRQ on line 1612 is supplied at the output of buffer 1647. The input to buffer 1647 is the output of NAND-gate 1648. The inputs to NAND-gate 1648 include the VIURQ signal on line 1628 and the CRQVREF signal on line 1636.

The output CVRMWRQ on line 1613 is supplied at the output of buffer 1650. The input to buffer 1650 is the output of NAND-gate 1651. The inputs to NAND-gate 1651 include the VIURQ signal on line 1628 and the QVRMW signal on line 1635.

The output CVWRREQ signal on line 1614 is supplied at the output of buffer 1652. The input to buffer 1652 is the output of NAND-gate 1653. The inputs to NAND-gate 1653 include the VIURQ signal on line 1628 and the QVWR signal on line 1634.

The output CVRDREQ signal on line 1615 is supplied at the output of buffer 1654. The input to buffer 1654 is the output of NAND-gate 1655. The inputs to NAND-gate 1655 include the VIURQ signal on line 1628 and the QVRD signal on line 1633.

The CGFWRRQ signal on line 1617 is supplied at the output of inverter 1656. The input to inverter 1656 is the output of NAND-gate 1657. The inputs to NAND-gate 1657 include the FIURQ signal on line 1627 and the QFWR signal on line 1632.

The output CGFRDRQ signal on line 1616 is supplied at the output of inverter 1658. The input to inverter 1658 is the output of NAND-gate 1659. The inputs to NAND-gate 1659 include the FIURQ signal on line 1627 and the output of inverter 1660 across line 1661. The input to inverter 1660 is the QFWR signal on line 1632.

The CPLDPTR signal on line 1629, the CBLSTWD signal on line 1630 and the CBLDC0–CBLDC2 signal on line 1631 are supplied directly at the output of the transaction-type decoder 1611. Likewise, the transaction-type decoder 1611 supplies the CBS0TX signal on line 1639, the SRD signal on line 1601 and the DGELN signal on line 1602.

In addition, the transaction-type decoder 1611 supplies the FAD0LB signal on line 1637 to inverter 1699. The output of inverter 1699 is the CFAHSKP signal on line 1618. Also, the decoder 1611 supplies the CRQVREF signal on line 1636.

A detailed description of the transaction-type decoder 1611 is provided with reference to FIGS. 19 and 20.

FIG. 17 illustrates the logic used in generating the address hold signal AH on line 1710, selecting the transaction type field TT0–TT4 on lines 1711, and generating the TTCHD signal on line 1712.

The address hold signal on line 1710 is supplied at the output of a multiplexer 1717. The output of the multiplexer 1717 is supplied at the output of NAND-gate 1718. The inputs to NAND-gate 1718 include the output on line 1719 of NAND-gate 1720 and the output on line 1721 of NAND-gate 1722. The inputs to NAND-gate 1720 include the S1AH signal on line 1706 from the SCW1 AH bit and the output on line 1723 of inverter 1724. The input to inverter 1724 is the TXOPB signal on line 1331. The inputs to NAND-gate 1722 include the S0AH signal on line 1705 from the AH bit of SCW0 and the TXOPB signal on line 1331.

The TT0–TT4 transaction-type field is supplied on line 1711 at the output of the transaction-type multiplexer TTMUX 1725. The transaction-type multiplexer consists of five three-input C5 multiplexers. The three inputs include corresponding bits from the TSTM0–TSTM4 code on lines 1707, the MCTT0–MCTT4 code on lines 1303 and the SCTT0–SCTT1 code on line 1211 for the first two C5 blocks and a wired LOW signal for the third C5 block, a wired HIGH signal for the fourth and fifth C5 blocks at the SCTT inputs. The C5 blocks each include a register clocked by the P2 clock connected to receive the TSTM(X) input. The MCSEL signal on line 1702 and its complement on line 1726 at the output of inverter 1727 which receives the MCSEL signal on line 1702 at its input are also supplied as inputs to each stage of the TTMUX 1725. These signals operate to select either the MCTT(X) signal or the SCTT(X) signal. A WAIT signal on line 1701 is supplied to the TTMUX 1725 in order to override the selected MCTT or SCTT code when asserted active LOW. Also, a TSTFID signal on line 1728 is supplied to each stage to override the TSTM(X) code when asserted active HIGH. The final stage of the C5 MUX is a two-input register which receives either the selected MCTT(X) or SCTT(X) signal at one input and the registered TSTM(X) signal at the other input. The selected MCTT(X) or SCTT(X) is clocked by the LDTT1 signal on line 1715 and its complement on line 1716 at the output of inverter 1729. The registered TSTM(X) input is clocked by the LDTT2 signal on line 1713 and its complement on lines 1714 which is supplied at the output of inverter 1730. The input tO inverter 1729 is the LDTT1 signal On line 1715. The input to inverter 1730 is the LDTT2 signal on line 1713.

The LDTT1 and LDTT2 signals are gated clocks supplied at the output of AND-gates 1731 and 1732, respectively. The inputs to AND-gates 1731 and 1732 include the P1 clock and the signals on lines 1733 and 1734, respectively. The signal on line 1733 is supplied at the output of NAND-gate 1735. The inputs to NAND-gate 1735 include the TCNXT signal on line 1619 and the complement of the TCTSTEN signal at the output of inverter 1736. The input to inverter 1736 is the TCTSTEN signal on line 1509. Thus, the LDTT1 signal is passed to clock the output register of the TTMUX 1725 during P1 if the TCTSTEN signal is low and TCNXT is high.

The signal on line 1734 is supplied at the output of NAND-gate 1737. The inputs to NAND-gate 1737 include the TCTSTEN signal on line 1509 and the TCNXT signal on line 1619. Thus, the LDTT2 signal clocks the output stage of the TTMUX 1725 during P1 if TCTSTEN is high and TCNST is high.

The TSTFID signal on line 1728 is supplied at the output of inverter 1738. The input to inverter 1738 is the signal on line 1739 which is supplied at the output of register 1740. Register 1740 is clocked by the P2 clock and its input is the signal on line 1741 from the output of NOR-gate 1742. The inputs to NOR-gate 1742 include the signal on line 1743 from the output of register 1744 and the WCCW0 signal on line 1708. The input to register 1744 is the signal on line 1745 at the output of NAND-gate 1746. The inputs to NAND-gate 1746 include the signal on line 1739 and the signal on line 1734.

The WAIT signal on line 1701 is supplied at the output of inverter 1747 which receives as its input the signal on line 1748 supplied at the output of NAND-gate 1749. The inputs to NAND-gate 1749 include the FRDY signal on line 1750 and the VRDY signal on line 1751. The FRDY signal on line 1750 is supplied at the output of the C6 DONE/REQ register 1752. The DONE input to the C6 register 1752 is the FCDONE signal on line 1703; this input sets the register output high. The REQ input to the C6 register 1752 is the FIURQ signal on line 1627; this input clears the register output low. The register 1752 output is set high by HRST signal on line 1508.

The VRDY signal on line 1751 is supplied at the output of the C6 register 1753. The DONE input to the C6 register 1753 is the VCDONE signal on line 1709; this input sets the register output high. The request input is the VIURQ signal on line 1628; this input clears the register output low. The C6 register 1753 output is set high by the HRST signal on line 1508.

The MCSEL signal on line 1702 is supplied at the output of NAND-gate 1754. The inputs to NAND-gate 1754 include the signal on line 1755 and the signal on line 1756. The signal on line 1755 is supplied at the output of NOR-gate 1757 which receives as its inputs the SCTT0–SCTT1 signals on lines 1211. The signal on line 1756 is supplied at the output of inverter 1758. The input to inverter 1758 is supplied on line 1759 at the output of NAND-gate 1760. The inputs to NAND-gate 1760 include the FCRFRN signal on line 1704, and the signal on line 1761. The signal on line 1761 is supplied at the output of the register 1762 which is clocked by the P2 clock. The input to the register 1762 is the signal on line 1763 supplied at the output of the resettable register 1764. The reset register 1764 is reset by the HRST signal and clocked by the P1 clock. The input to the register 1764 is the signal on line 1765 supplied at the output of NAND-gate 1766. The inputs to NAND-gate 1766 include the signal on line 1759 and the signal on line 1767 supplied at the output of NAND-gate 1768. The inputs to NAND-gate 1768 include the signal on line 1755, the signal on line 1701, and the signal on line 1769. The signal on line 1769 is supplied at the output of buffer 1770 which receives as its input the TCNXT signal on line 1619.

The TTCHD signal on line 1712 is supplied at the output of register 1771. The register 1771 is clocked by the P1 clock and receives as its input the signal on line 1772 from the output of NAND-gate 1773. The inputs to NAND-gate 1773 include the signal on line 1701 and the signal on line 1769.

FIG. 18 illustrates the logic used to generate the CIRFREEA signal on line 1801 and its corresponding REGFREE signal on line 1802. The inputs include the MCTT0-MCTT4 signals on lines 1303, the MCSEL signal on line 1702, the WAITB signal on line 1701, the VFFRDM signal on line 1638 and the LDTT1 and LDTT2 clocks on lines 1713 through 1716.

The CIRFREEA signal on line 1801 is supplied at the output of inverter 1803 and the REGFREE signal on line 1802 is supplied at the output of inverter 1804. The inputs to inverters 1803 and 1804 include the signal on line 1805 at the output of inverter 1806. The input to inverter 1806 is the signal on line 1807 supplied at the output of dual input register 1808. The B input to the register 1808 is tied to the high level voltage on line 1809. The A input is supplied on line 1810 at the output of NAND-gate 1811. The inputs to NAND-gate 1811 include the signal on line 1812 supplied at the output of NAND-gate 1813 which receives as its inputs the MCSEL signal on line 1702 and the WAIT signal on line 1701. The second input to NAND-gate 1811 is the signal on line 1814 supplied at the output of inverter 1815. The input to inverter 1815 is the signal on line 1816 supplied at the output of NAND-gate 1817. The inputs to NAND-gate 1817 are the signals on lines 1818 and 1819. The signal on line 1818 is the output of NOR-gate 1820 which receives as its inputs MCTT0-MCTT2. The signal on line 1819 is supplied at the output of NOR-gate 1821 which receives as its inputs MCTT3 and MCTT4. The third input to NAND-gate 1811 is the VFFRDM signal on line 1638.

The dual input register 1808 serves to select the HIGH signal on line 1809 as its output during the test mode. Otherwise the output of NAND-gate 1811 is registered and supplied as the output signal.

FIGS. 19 and 20 illustrate the coding of the TT decoder 1611. In FIG. 19, a decoder 1910 is shown which receives as inputs the TT0-TT4 signals on line 1711. The decoder generates the signals shown at the output in response to the values of TT0-TT4 indicated on the output line of the decoder 1910. X indicates a "don't care" condition. These signals are distributed throughout the logic and generation of the output signals as can be seen in FIGS. 19 and 20. The following table lists transaction type symbols and corresponding cores.

| TT Code | Symbolic name for transaction type |
|---|---|
| 011X0 | FFRDM or VFRDM |
| 1011X | GLEOLN or DEOLN |
| 11011 | SRD |
| 00011 | FFRD |
| 01100 | FFRDM |
| 00101 | FTXRD |
| 1010X | GLSUP or DSUP |
| 01101 | FFLD |
| 01110 | VFRDM |
| 00010 | VFRD |
| 00100 | VTXRD |
| 01111 | VFLD |
| 01000 | VDISP |
| 11100 | FDISP |
| 11000 | DRFH |

The CBSOTX signal on line 1639, the CPLDPTR signal on line 1629 and the CBLDC0-CBLDC2 signals on lines 1631 are also supplied at the output of C1 registers 1911-1915. These registers are clocked in the first stage by the gated P2 clock and its complement on lines 1916 and 1917. The signal on line 1917 is supplied at output of inverter 1918, the input of which is the signal on line 1916. The signal on line 1916 is supplied at the output of AND-gate 1919 which receives as inputs the P2 clock and the signal on line 1920. The signal on line 1920 is supplied at the output of register 1921 which is clocked by the P1 clock. The input to register 1921 is the output of register 1922 which is clocked by the P2 clock. The input to register 1922 is the TTCHD signal on line 1712. The second stage of C1 registers 1911-1915 is clocked by P1.

The input to C1 register 1911 is the TXEN signal on line 1409. The input to register 1912 is the 11011 decode signal on line 1923.

The input to C1 register 1913 is the signal on line 1924 at the output of NAND-gate 1925. The inputs to NAND-gate 1925 include the signal on line 1926 which is supplied at the output of inverter 1927 which receives as its input the 11011 decode. The second input to NAND-gate 1925 is the signal on line 1928 which is supplied at the output of NOR-gate 1929. The inputs to NOR-gate 1929 include the decode signal 00101 and the decode signal 1010X. The third input to NAND-gate 1925 is the signal on line 1930 supplied at the output of NOR-gate 1931 which receives as its inputs the 00011 decode and the 01100 decode.

The signal at the input of the C1 register 1914 is supplied on line 1932 at the output of NAND-gate 1933. The inputs to NAND-gate 1933 include the signal on line 1930, the signal on line 1934 supplied at the output of NOR-gate 1935, the signal on line 1936 supplied at the output of NOR-gate 1937 and the signal on line 1938 supplied at the output of NOR-gate 1939. The inputs to NOR-gate 1935 include the 1011X decode and the 01111 decode. The inputs to NOR-gate 1937 include the 1010X decode, the 01000 decode and the 11100 decode. The inputs to NOR-gate 1939 include the 01110 decode and the 00010 decode.

The input to the C1 register 1915 is the signal on line 1940 supplied at the output of NAND-gate 1941. The inputs to NAND-gate 1941 include the signal on line 1938, the signal on line 1928, and the signal on line 1942. The signal on line 1942 is supplied at the output of inverter 1943 which receives as its input the 00100 decode.

The VFFRDM signal on line 1638 is supplied at the output of C3 register 1944. The C3 register is clocked by the gated P2 clock supplied on line 1945 and its complement, supplied on line 1646. The signal on line 1946 is supplied at the Output Of inverter 1947 which receives as its input the signal on line 1945. The signal on line 1945 is supplied at the output of AND-gate 1948 which receives as its inputs the P2 clock and the TTCHD signal on line 1712. The input to the C3 register is the signal on line 1949 supplied at the output of inverter 1950. The input to the inverter 1950 is the 011X0 decode.

The QFWR signal on line 1632, the QVRD signal on line 1633, the QVWR signal on line 1634, the QVRMW signal on line 1635, and the CRQVREF signal on line 1636 are all supplied at the output of C1 registers 1951-1955 which are clocked in the first stage by the gated P2 clock on lines 1945 and 1946 and in the second stage by the P1 clock. The input to register 1951 is the signal on line 1956 supplied at the output of inverter 1957. The input to inverter 1957 is the signal on line 1958 supplied at the output of NOR-gate 1959. The inputs to NOR-gate 1959 include the 01101 decode on line 1960 and the signal on line 1961 supplied at the output of inverter 1962. The input to inverter 1962 is the signal on line 1963 supplied at the output of register 1964. Register 1964 is clocked by the P1 clock and receives as its input the CFORPRD signal on line 1510.

The input to the C1 register 1952 is the signal on line 1965 supplied at the output of NAND-gate 1966. The inputs to NAND-gate 1966 include the signal on line 1967 from the output of NOR-gate 1968, the signal on line 1969 supplied at the output of inverter 1970, and the signal on line 1971 supplied at the output of NAND-gate 1972. The inputs to NOR-gate 1968 include the 00100 decode, and the 01110 decode. The input to inverter 1970 is the 00010 decode. The inputs to NAND-gate 1972 include the 11011 decode and the MPC signal on line 1205.

The input to C1 register 1953 is the 01111 decode.

The input to C1 register 1954 is the signal on line 1973 supplied at the output of NAND-gate 1974. The inputs to NAND-gate 1974 include the signal on line 1975 at the output of NAND-gate 1976, the signal on line 1977 the output of inverter 1978, and the signal on line 1901 supplied at the output of NOR-gate 1979. The inputs to NAND-gate 1976 include the 11011 decode, and the signal on line 1980 supplied at the output of inverter 1981. The input to inverter 1981 is the MPC signal on line 1205. The input to inverter 1978 is the 1011X decode. The inputs to NOR-gate 1979 are the 01000 decode and the 11100 decode.

The signal on line 1901 is called the TN signal and is supplied as an input on FIG. 20.

The input to the C1 register 1955 is the 11000 decode.

FIG. 20 illustrates additional output signals for the transaction-type decoder 1611.

The DGELN signal on line 1602 is supplied at the output of register 2001 which receives as its input the signal on line 2002 at the output of register 2003. The input to register 2003 is the signal on line 2004 at the output of inverter 2005. The input to inverter 2005 is the signal on line 2006 at the output of NOR-gate 2007. The inputs to NOR-gate 2007 are the 1011X decode and the 1010X decode. Register 2003 is clocked by the P2 clock and register 2001 is clocked by the P1 clock.

The SRD signal on line 1601 is supplied at the output of register 2008 which receives as its input the signal on line 2009 supplied at the output of register 2010. The input to register 2010 is the 11011 decode. Register 2010 is clocked by the P2 clock and register 2008 is clocked by the P1 clock.

The FAD0LB signal on line 1637 is supplied at the output of C1 register 2011. The first stage of the C1 register 2011 is clocked by the P2 clock and its complement through inverter 2012. The second stage of C1 register 2011 is clocked by the P1 clock. The input to the C1 register 2011 is the signal on line 2012 at the output of NAND-gate 2013. The inputs to NAND-gate 2013 include the 11100 decode, the TTCHD signal on line 1712, the FSKE1 signal on line 1413 and the signal on line 2014 supplied at the output of register 2015. Register 2015 is clocked by the gated P1 clock on line 2016 at the output of AND-gate 2017. The inputs to AND-gate 2017 include the P1 clock and the signal on line 2018 at the output of register 2019. Register 2019 is clocked by the P2 clock and receives as its input the signal on line 2020 at the output of NAND-gate 2021. NAND-gate 2021 receives as its input the FGCTL0-FGCTL1 signals on lines 1606.

The input to register 2015 is the RCCARRYE signal on line 1206.

The CBLSTWD signal on line 1630 is supplied at the output of C1 register 2022. The C1 register 2022 is clocked by the P1 clock in its second stage and by gated P2 clock and its complement across lines 2023 and 2024, respectively.

The input to the C1 register 2022 is supplied on line 2025 at the output of inverter 2026. The input to inverter 2026 is the signal on line 2027 supplied at the output of NAND-gate 2028. The inputs to NAND-gate 2028 include the RCZERO signal on line 1423 and the signal on line 2029 which is supplied at the output of inverter 2030. The input to inverter 2030 is the TN signal from line 1901 generated as shown in FIG. 19.

The gated P2 clock on line 2023 is supplied at the output of AND-gate 2031. The inputs to AND-gate 2031 include the P2 clock and the signal on line 2032 supplied at the output of NAND-gate 2033. The first input to NAND-gate 2033 is the signal on line 2034 supplied at the output of inverter 2035. The input to inverter 2035 is the 1010X decode. The second input to NAND-gate 2033 is the signal on line 2036 supplied at the output of NOR-gate 2037. The inputs to NOR-gate 2037 include the signal on line 2038 at the output of AND-gate 2039 and the signal on line 2040 supplied at the output of register 2041. The inputs to AND-gate 2039 include the CBQLDGD signal on line 1621, and the output of register 2042 on line 2043. The input to register 2042 is the signal on line 2044 supplied at the output of register 2045. Input to register 2045 is the 1011X decode. Register 2045 is clocked by the P2 clock and register 2042 is clocked by the P1 clock.

The input to register 2041 is supplied on line 2046 at the output of register 2047. The input to register 2047 is the signal on line 2048 supplied at the output of inverter 2049. Register 2047 is clocked by the P2 clock and register 2041 is clocked by the P1 clock.

The input to inverter 2049 is the signal on line 2050 supplied at the output of NAND-gate 2051. The inputs to NAND-gate 2051 include the signal on line 2029, the signal on line 2052 supplied at the output of inverter 2053 and the FGCTL0 signal from line 1606. The input to inverter 2053 is the FGCTL1 signal.

The transaction control state machine includes the PLA and the transaction type decoder. The transaction type decoder basically determines the type of access to the font or video interface to be carried out, while the PLA cooperates with the output registers to operate as a state machine as discussed above with respect to the scan control and mode control flow diagrams. The "source code" set out in the table entitled RPC TRANSACTION CONTROL PLA SOURCE CODE is a shorthand description of the inputs and outputs generated by the transaction control PLA state machine for the operations identified in the table. For the purposes of this table, the inputs include TCPST 1640, TT 1711 and AH 1710. The outputs are abbreviated as follows: TCNST 1640, TCNXT 1619, SACK 1604, MACK 1605, BADR 1626, AADR 1625, WREN 1624, LBYTE 1623, BSHEN 1603, ALUOP 1622, FGCTL 1606, VARQ 1620, QLDGD 1621 and FIURQ 1627. Each of these signals is shown in FIG. 16 with corresponding reference numbers. The function of these control signals is best understood in the context in which the transaction type signal is asserted as described in the scan control and mode control state flows. This table sets forth the detailed operations for those interested in precise implementation.

RPC TRANSACTION CONTROL PLA SOURCE CODE

| Inputs | | | | | Outputs | | | | | | | | | | | | | | |
|---|---|---|---|---|---|---|---|---|---|---|---|---|---|---|---|---|---|---|---|
| T C P S T | T | A S H | T C N S T | T C N X T | S A C K | M A C K | B A D R | A A D R | W R E N | L B Y T E | B S H E N | A L U O P | F G C T L | V A R Q | Q L D G D | F I U R Q |
| Random logic forces transaction control SM into state S0 after hardware reset: |

| Inputs | | Outputs | | | | | | | | | | | | | | |
|---|---|---|---|---|---|---|---|---|---|---|---|---|---|---|---|---|
| TCPST | TT | AH | TCNST | TCNXT | SACK | MACK | BADR | AADR | WREN | LBYTE | BSHEN | ALUOP | FGCTL | VARQ | QLDGD | FIURQ |
| S0 XXXXX | X | SE | 1 | 0 | 0 | 00000 | 00000 | NOP | 0 | 0 | DONTCARE | NOP | 0 | 0 | 0 |
| SE XXXXX | X | S1 | 1 | 0 | 0 | RRAR | 00000 | B | 0 | 0 | ZERO | NOP | 0 | 0 | 0 |

Wait States SF:

| SF XXXXX | X | S1 | 1 | 0 | 0 | 00000 | 00000 | NOP | 0 | 0 | DONTCARE | NOP | 0 | 0 | 0 |

Waiting for a TT other than IDLE, MCWAIT, or WAIT; 0000X = IDLE or MCWAIT:

| S1 0000X | X | S1 | 1 | 0 | 0 | 00000 | 00000 | NOP | 0 | 0 | DONTCARE | NOP | 0 | 0 | 0 |
|---|---|---|---|---|---|---|---|---|---|---|---|---|---|---|---|
| S1 WAIT | X | S1 | 1 | 0 | 0 | 00000 | 00000 | NOP | 0 | 0 | DONTCARE | NOP | 0 | 0 | 0 |

Initialize RFNR to Zero:

| S1 INRFNR1 | X | S2 | 0 | 0 | 1 | RFNR(L) | 00000 | B | 0 | 0 | ZERO | NOP | 0 | 0 | 0 |
|---|---|---|---|---|---|---|---|---|---|---|---|---|---|---|---|
| S2 INRFNR1 | X | S1 | 1 | 0 | 0 | RFNR(H) | 00000 | B | 0 | 0 | ZERO | NOP | 0 | 0 | 0 |

Initialize RFNR to RFNR - VBBR, RFNR = -VBBR if INRFNR1 was called first:

| S1 INRFNR2 | X | S2 | 0 | 0 | 1 | VBBR(L) | RFNR(L) | A | 0 | 0 | A−B | NOP | 0 | 0 | 0 |
|---|---|---|---|---|---|---|---|---|---|---|---|---|---|---|---|
| S2 INRFNR2 | X | S1 | 1 | 0 | 0 | VBBR(H) | RFNR(H) | A | 0 | 0 | A−B−1+Cin | NOP | 0 | 0 | 0 |

Adjust RFNR (Add VBBR to it):

| S1 ADJRFNR | X | S2 | 0 | 0 | 1 | VBBR(L) | RFNR(L) | A | 0 | 0 | A+B | NOP | 0 | 0 | 0 |
|---|---|---|---|---|---|---|---|---|---|---|---|---|---|---|---|
| S2 ADJRFNR | X | S1 | 1 | 0 | 0 | VBBR(H) | RFNR(H) | A | 0 | 0 | A+B+Cin | NOP | 0 | 0 | 0 |

RPC TRANSACTION CONTROL PLA SOURCE CODE

| Inputs | | Outputs | | | | | | | | | | | | | | |
|---|---|---|---|---|---|---|---|---|---|---|---|---|---|---|---|---|
| TCPST | TT | AH | TCNST | TCNXT | SACK | MACK | BADR | AADR | WREN | LBYTE | BSHEN | ALUOP | FGCTL | VARQ | QLDGD | FIURQ |

Dispatch Setup

| S1 DSUP | X | S2 | 0 | 0 | 0 | RFNR(L) | DCAR(L) | A | 0 | 0 | A−B | NOP | 0 | 0 | 0 |
|---|---|---|---|---|---|---|---|---|---|---|---|---|---|---|---|
| S2 DSUP | X | S3 | 0 | 0 | 0 | RFNR(H) | DCAR(H) | A | 0 | 0 | A−B−1+Cin | NOP | 0 | 0 | 0 |
| S3 DSUP | X | S4 | 0 | 0 | 0 | TSIWR0 | SIWR0 | B | 0 | 0 | PASS A | UZDET | 0 | 0 | 0 |
| S4 DSUP | X | S5 | 0 | 0 | 0 | VBBR(L) | DCAR(L) | NOP | 0 | 1 | A−B | NOP | 0 | 0 | 0 |
| S5 DSUP | X | S6 | 0 | 0 | 0 | VBBR(H) | DCAR(H) | NOP | 0 | 1 | A−B−1+Cin | UBEXC | 0 | 0 | 0 |
| S6 DSUP | X | S7 | 0 | 0 | 0 | VXSR | NXSLR | A | 0 | 0 | B+Cin | NOP | 0 | 0 | 0 |
| S7 DSUP | X | S8 | 0 | 0 | 1 | TSIWR1 | SIWR1 | B | 0 | 0 | PASS A | NOP | 0 | 0 | 0 |

Graphics Load Setup

| S1 GLSUP | X | S2 | 0 | 0 | 0 | VXSR | NXSLR | A | 0 | 0 | B+Cin | NOP | 0 | 0 | 0 |
|---|---|---|---|---|---|---|---|---|---|---|---|---|---|---|---|
| S2 GLSUP | X | S8 | 0 | 0 | 1 | TSIWR0 | SIWR0 | B | 0 | 0 | PASS A | NOP | 0 | 0 | 0 |

Terms used by Dispatch and Graphics Load Setup
DGSUP = DSUP or GLSUP, one TT bit is not decoded

| S8 DGSUP | X | S1 | 1 | 0 | 0 | NXSLR | SIWR0 | B | 0 | 0 | B−A | NOP | 0 | 0 | 0 |

Texture Read, from Font or Video Memory

| S1 VTXRD | X | S2 | 0 | 0 | 0 | SCAR1(L) | TSIWR1 | A | 0 | 0 | DEC A | NOP | 1 | 0 | 0 |
|---|---|---|---|---|---|---|---|---|---|---|---|---|---|---|---|
| S1 FTXRD | X | S2 | 0 | 0 | 0 | TSIWR1 | SCAR1(H) | B | 0 | 0 | DEC B | NOP | 0 | 0 | 1 |
| S2 FVTXRD | 0 | S3 | 0 | 0 | 1 | SCAR1(H) | SCAR1(L) | A | 0 | 0 | INC A | NOP | 0 | 0 | 0 |
| S2 FVTXRD | 1 | SF | 0 | 0 | 1 | SCAR1(H) | SCAR1(L) | NOP | 0 | 0 | DONTCARE | NOP | 0 | 0 | 0 |
| S3 FVTXRD | X | S1 | 1 | 0 | 0 | SCAR1(H) | 00000 | B | 1 | 0 | B+Cin | NOP | 0 | 0 | 0 |

Font Read, VFRD Font in Video Memory, FFRD Font in Font Memory
FRD = VFRD or FFRD, one TT bit not decoded

| S1 VFRD | X | S2 | 0 | 0 | 0 | SCAR0(L) | 00000 | NOP | 0 | 0 | DONTCARE | NOP | 1 | 0 | 0 |
|---|---|---|---|---|---|---|---|---|---|---|---|---|---|---|---|
| S1 FFRD | X | S2 | 0 | 0 | 0 | 00000 | SCAR0(H) | NOP | 0 | 0 | DONTCARE | NOP | 0 | 0 | 1 |
| S2 FRD | 0 | S3 | 0 | 0 | 1 | SCAR0(H) | SCAR0(L) | A | 0 | 0 | INC A | UFICY | 0 | 0 | 0 |
| S2 FRD | 1 | SF | 0 | 0 | 1 | SCAR0(H) | SCAR0(L) | NOP | 0 | 0 | ZERO | UFICY | 0 | 0 | 0 |

RPC TRANSACTION CONTROL PLA SOURCE CODE

| Inputs | | | | | | Outputs | | | | | | | | | | | | | | |
|---|---|---|---|---|---|---|---|---|---|---|---|---|---|---|---|---|---|---|---|---|
| T C P S T | T | A S H | T C N S T | T C N X T | S C C K | M C K | B D R | A D R | W R E N | L B Y T E | B S H E N | A L U O P | F G C T L | V A R Q | Q L D G D | F I U R Q |
| S3 FRD | X | S1 | 1 | 0 | 0 | SCAR0(H) | 00000 | B | 1 | 0 | B+Cin | NOP | 0 | 0 | 0 |

RPC TRANSACTION CONTROL PLA SOURCE CODE

RPC TRANSACTION CONTROL PLA SOURCE CODE

| Inputs | | | | | | Outputs | | | | | | | | | | | | | | |
|---|---|---|---|---|---|---|---|---|---|---|---|---|---|---|---|---|---|---|---|---|
| T C P S T | T | A S H | T C N S T | T C N X T | S C C K | M C K | B D R | A D R | W R E N | L B Y T E | B S H E N | A L U O P | F G C T L | V A R | Q L D G D | F I U R Q |

Font dispatch, font in font memory
During S1 of FDISP, random logic may force AADR to be SCAR0(L),
if FIU upper address cycle can be removed

| S1 FDISP | X | S2 | 0 | 0 | 0 | DCAR(L) | SCAR0(H) | B | 0 | 0 | INC B | NOP | 1 | 0 | 1 |
| S2 FDISP | X | S3 | 0 | 0 | 0 | DCAR(H) | SCAR0(L) | B | 0 | 0 | B+Cin | NOP | 0 | 0 | 0 |
| S3 FDISP | X | S4 | 0 | 0 | 0 | 00000 | TSIWR0 | A | 0 | 0 | DEC A | UZDET | 0 | 0 | 0 |
| S4 FDISP | 0 | S5 | 0 | 0 | 0 | SCAR0(L) | 00000 | B | 0 | 0 | INC B | UFICY | 0 | 1 | 0 |
| S4 FDISP | 1 | S5 | 0 | 0 | 0 | 00000 | 00000 | NOP | 0 | 0 | ZERO | UFICY | 0 | 1 | 0 |
| S5 FDISP | 0 | SF | 0 | 0 | 1 | SCAR0(H) | 00000 | B | 1 | 0 | B+Cin | NOP | 0 | 0 | 0 |
| S5 FDISP | 1 | SF | 0 | 0 | 1 | 00000 | 00000 | NOP | 0 | 0 | DONTCARE | NOP | 0 | 0 | 0 |

Font dispatch, font in video memory, or graphics load mode
GLWR uses the same TT code as VDISP

| S1 VDISP | X | S2 | 0 | 0 | 0 | DCAR(L) | 00000 | B | 0 | 0 | INC B | NOP | 1 | 0 | 0 |
| S2 VDISP | X | S3 | 0 | 0 | 0 | DCAR(H) | 00000 | B | 0 | 0 | B+Cin | NOP | 0 | 0 | 0 |
| S3 VDISP | X | S4 | 0 | 0 | 0 | 00000 | TSIWR0 | A | 0 | 0 | DEC A | UZDET | 0 | 0 | 0 |
| S4 VDISP | X | S5 | 0 | 0 | 0 | 00000 | 00000 | NOP | 0 | 0 | DONTCARE | NOP | 0 | 1 | 0 |
| S5 VDISP | X | SF | 0 | 0 | 1 | 00000 | 00000 | NOP | 0 | 0 | DONTCARE | NOP | 0 | 0 | 0 |

Dispatch abort 2

| S1 DABR2 | 0 | S2 | 0 | 0 | 0 | SCAR0(L) | 00000 | B | 0 | 0 | DEC B | NOP | 0 | 0 | 0 |
| S1 DABR2 | 1 | S4 | 0 | 0 | 0 | DCAR(L) | RFNR(L) | B | 0 | 0 | A+B | NOP | 0 | 0 | 0 |
| S2 DABR2 | X | S3 | 0 | 0 | 0 | SCAR0(H) | 00000 | B | 1 | 0 | B−1+Cin | NOP | 0 | 0 | 0 |
| S3 DABR2 | X | S4 | 0 | 0 | 0 | DCAR(L) | RFNR(L) | B | 0 | 0 | A+B | NOP | 0 | 0 | 0 |

Dispatch abort 1

| S1 DABR1 | X | S4 | 0 | 0 | 0 | DCAR(L) | RFNR(L) | B | 0 | 0 | A+B | NOP | 0 | 0 | 0 |

Term used by dispatch abort 1 and 2; DABR - DABR1 or DABR2;
one TT bit is not decoded; Return through SF to guarantee that register file
is free for CPU read if TT goes to IDLE

| S4 DABR | X | SF | 0 | 0 | 1 | DCAR(H) | RFNR(H) | B | 0 | 0 | A+B+Cin | NOP | 0 | 0 | 0 |

RPC TRANSACTION CONTROL PLA SOURCE CODE

| Inputs | | | | | | Outputs | | | | | | | | | | | | | | |
|---|---|---|---|---|---|---|---|---|---|---|---|---|---|---|---|---|---|---|---|---|
| T C P S T | T | A S H | T C N S T | T C N X T | S C C K | M C K | B D R | A D R | W R E N | L B Y T E | B S H E N | A L U O P | F G C T L | V A R | Q L D G D | F I U R Q |

First two terms of DEOLN and GLEOLN; DGEOLN = DEOLN or GLEOLN;
one TT bit not decoded

| S1 DGEOLN | X | S2 | 0 | 0 | 0 | DCAR(L) | NXSLR | B | 0 | 0 | A+B | NOP | 1 | 0 | 0 |
| S2 DGEOLN | X | S3 | 0 | 0 | 0 | DCAR(H) | 00000 | B | 0 | 0 | B+Cin | NOP | 0 | 0 | 0 |

Dispatch end of line

| S3 DEOLN | X | S4 | 0 | 0 | 0 | SIHR0 | 00000 | B | 0 | 0 | DEC B | UZDET | 0 | 0 | 0 |
| S4 DEOLN | X | S5 | 0 | 0 | 0 | VBBR(L) | DCAR(L) | NOP | 0 | 1 | A−B | NOP | 0 | 1 | 0 |
| S5 DEOLN | X | S6 | 0 | 0 | 0 | VBBR(H) | DCAR(H) | NOP | 0 | 1 | A−B−1+Cin | UBEXC | 0 | 0 | 0 |
| S6 DEOLN | X | SF | 0 | 0 | 1 | TSIWR0 | SIWR0 | B | 0 | 0 | PASS A | NOP | 0 | 0 | 0 |

Graphic load end of line

| S3 GLEOLN | X | S4 | 0 | 0 | 1 | TSIWR0 | SIWR0 | B | 0 | 0 | PASS A | NOP | 0 | 0 | 0 |
| S4 GLEOLN | X | S1 | 1 | 0 | 0 | 00000 | 00000 | NOP | 0 | 0 | DONTCARE | NOP | 0 | 1 | 0 |

Adjust texture address

| S1 ADJTX | 1 | S3 | 0 | 0 | 1 | 00000 | 00000 | NOP | 0 | 0 | DONTCARE | NOP | 0 | 0 | 0 |
| S1 ADJTX | 0 | S2 | 0 | 0 | 0 | SCAR1(L) | TSIWR1 | B | 0 | 0 | A+B | NOP | 0 | 0 | 0 |

-continued

RPC TRANSACTION CONTROL PLA SOURCE CODE

| Inputs | | | Outputs | | | | | | | | | | | | | | | |
|---|---|---|---|---|---|---|---|---|---|---|---|---|---|---|---|---|---|---|
| T<br>C<br>P<br>S<br>T | T | A<br>H | T<br>C<br>N<br>S<br>T | T<br>C<br>N<br>X<br>T | S<br>A<br>C<br>K | M<br>A<br>C<br>K | B<br>A<br>D<br>R | A<br>A<br>D<br>R | W<br>R<br>E<br>N | L<br>B<br>Y<br>T<br>E | B<br>S<br>H<br>E<br>N | A<br>L<br>U<br>O<br>P | F<br>G<br>C<br>T<br>L | | V<br>A<br>R<br>Q | Q<br>L<br>D<br>G<br>D | F<br>I<br>U<br>R<br>Q |
| S2 ADJTX | X | | S3 | 0 | 0 | 1 | SCAR1(H) | 00000 | B | 1 | 0 | B+Cin | NOP | | 0 | 0 | 0 |
| S3 ADJTX | X | | S1 | 1 | 0 | 0 | TSIWR1 | SIWR1 | B | 0 | 0 | PASS A | NOP | | 0 | 0 | 0 |

RPC TRANSACTION CONTROL PLA SOURCE CODE

| Inputs | | | Outputs | | | | | | | | | | | | | | |
|---|---|---|---|---|---|---|---|---|---|---|---|---|---|---|---|---|---|
| T<br>C<br>P<br>S<br>T | T | A<br>H | T<br>C<br>N<br>S<br>T | T<br>C<br>N<br>X<br>T | S<br>A<br>C<br>K | M<br>A<br>C<br>K | B<br>A<br>D<br>R | A<br>A<br>D<br>R | W<br>R<br>E<br>N | L<br>B<br>Y<br>T<br>E | B<br>S<br>H<br>E<br>N | A<br>L<br>U<br>O<br>P | F<br>G<br>C<br>T<br>L | V<br>A<br>R<br>Q | Q<br>L<br>D<br>G<br>D | F<br>I<br>U<br>R<br>Q |
| Font read and font load mode with font in video memory; RDMLD = FRDM or FLD; one TT bit is not decoded. | | | | | | | | | | | | | | | | | |
| S1 VRDMLD | X | | S3 | 0 | 0 | 0 | DCAR(L) | 00000 | B | 0 | 0 | INC B | NOP | 1 | 0 | 0 |
| Font read and font load mode with font in font memory; FRDMLD - FFRDM or FFLD; one TT bit is not decoded. | | | | | | | | | | | | | | | | | |
| S1 FRDMLD | X | | S2 | 0 | 0 | 0 | SCAR0(L) | DCAR(H) | B | 0 | 0 | DEC B | UZDET | 0 | 0 | 1 |
| S2 FRDMLD | X | | S3 | 0 | 0 | 0 | 00000 | DCAR(L) | A | 0 | 0 | INC A | NOP | 0 | 0 | 0 |
| Term used by font read and font load; font in video or font memory; RDMLD = VFRDM or FFRDM or VFLD or FFLD; two TT bits not decoded; Return through SF to guarantee reg. file is free for CPU read if TT goes to idle. | | | | | | | | | | | | | | | | | |
| S3 RDMLD | X | | SF | 0 | 0 | 1 | DCAR(H) | 00000 | B | 0 | 0 | B+Cin | NOP | 0 | 1 | 0 |
| Dynamic RAM refresh . | | | | | | | | | | | | | | | | | |
| S1 DRFH | X | | S2 | 0 | 0 | 0 | RRAR | 00000 | B | 0 | 0 | INC B | NOP | 1 | 0 | 0 |
| S2 DRFH | X | | SF | 0 | 0 | 0 | 00000 | 00000 | NOP | 0 | 0 | DONTCARE | NOP | 0 | 0 | 0 |
| Initialize VOAR to zero; INVOAR1 | | | | | | | | | | | | | | | | | |
| S1 INVOAR1 | X | | S2 | 0 | 1 | 0 | VOAR(L) | 00000 | B | 0 | 0 | ZERO | NOP | 0 | 0 | 0 |
| S2 INVOAR1 | X | | S1 | 1 | 0 | 0 | VOAR(H) | 00000 | B | 0 | 0 | ZERO | NOP | 0 | 0 | 0 |
| Initialize VOAR to VBBR, INVOAR2 | | | | | | | | | | | | | | | | | |
| S1 INVOAR2 | X | | S2 | 0 | 1 | 0 | VOAR(L) | VBBR(L) | B | 0 | 0 | PASS A | NOP | 0 | 0 | 0 |
| S2 INVOAR2 | X | | S1 | 1 | 0 | 0 | VOAR(H) | VBBR(H) | B | 0 | 0 | PASS A | NOP | 0 | 0 | 0 |
| Scan read | | | | | | | | | | | | | | | | | |
| S1 SRD | X | | S2 | 0 | 0 | 0 | VOAR(L) | 00000 | B | 0 | 0 | INC B | NOP | 1 | 0 | 0 |
| S2 SRD | X | | S3 | 0 | 0 | 0 | VOAR(H) | 00000 | B | 0 | 0 | B+Cin | NOP | 0 | 0 | 0 |
| S3 SRD | X | | S4 | 0 | 0 | 0 | VBBR(L) | VOAR(L) | NOP | 0 | 1 | A−B | NOP | 0 | 0 | 0 |
| S4 SRD | X | | S5 | 0 | 0 | 0 | VBBR(H) | VOAR(H) | NOP | 0 | 1 | A−B−1+Cin | UBEXC | 0 | 0 | 0 |
| S5 SRD | X | | SF | 0 | 1 | 0 | 00000 | 00000 | NOP | 0 | 0 | DONTCARE | NOP | 0 | 0 | 0 |

6.5 CONTROL REGISTER FILE

FIG. 21 is a chart illustrating layout of the control register file. This register file stores a number of the control and address parameters as well as provides some working register space for the central control operations. The variables are set out in the table.

THE CONTROL REGISTER FILE WORD ASSIGNMENT

VOAR(L) 2101—LOW 16 bits of the video out address used to access the video band buffer in the assembly memory for reads to the scanner interface for supply of output data to the scanner.

VOAR(H) 2102—The HIGH 8 bits of the video output address. The leftmost 8 bits of this register are read only cells fill-de with zeros.

RFNR(L) 2103—The LOW 16 bits of a reference register used in the translation from virtual to real addresses in the assembly of data.

VXSR 2104—12-bit variable indicating the number of words per line in the page being printed. The PXSR value in the CCW identifies the number of pixels.

RFNR(H) 2105—The HIGH 8 bits of the reference register. The 8 leftmost cells in this register are read only zeros.

VBBR(L) 2106—Copy of the 16 LOW order bits of VBBR from the CCW.

VBBR(H) 2107—HIGH order 8 bits of VBBR.

RRAR 2108—Refresh address register storing a variable identifying refresh addresses. This is a 10-bit value.

SCAR0(L) 2109—Working register for the source current address from SCW0, LOW order 16 bits.

SIWR0 2110—Working register copy of the source image width register from SCW0.

SCAR0(H) 2111—The 8 HIGH order bits of the SCAR value from SCW0.

SIHR0 2112—A 12-bit source image height value from SCW0.

SCAR1 (L) 2113—A copy of SCAR value from SCW1, LOW order 16 bits.

SIWR1 2114-An 8-bit source image width value from SCW1.

SCAR1(H) 2115-The 8 HIGH order bits of the SCAR value from SCW1.

TSIWR0 2116—Register for storing the temporary source image width value from SCW0.

NXSLR 2117—A 16-bit variable for calculating the beginning of a next scan line for a write to the assembly memory.

TSIWR1 2118—A temporary register storing a copy of the source image width value from SCW1.

In the table, the fields filled with x's are read only cells having the characteristic that when read to the A port of the ALU, the value 1 is presented, and when read to the B port of the ALU, the value 0 is presented. All registers in the register file 76 can be written in response to the transaction control state machine. In addition, VXSR 2104, VBBR(L) 2106, VBBR(H) 2107, SCAR0(L) 2109, SIWR0 2110, SCAR0(H) 2111, SIHR0 2112, SCAR1(L) 2113, SIWR1 2114 and SCAR1(H) 2115 can be accessed through the CPU interface.

6.6 COLOR COMBINATION/BARREL SHIFTER BLOCK—FIGS. 30 AND 31

Figure 30:
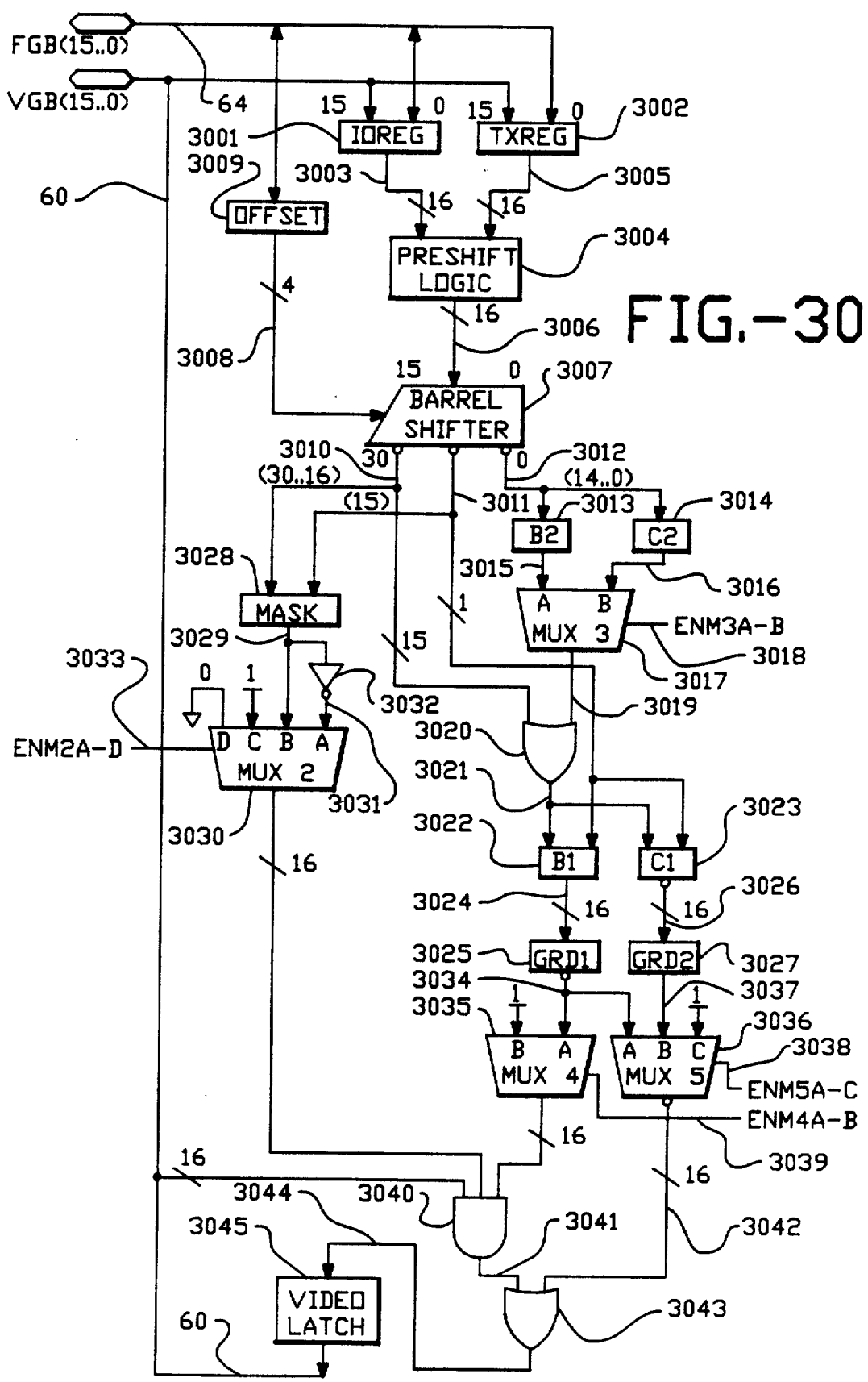
FIGS. 30 and 31 are block diagrams of the data paths in the barrel shifter and color combination block of the RPC.
Figure 31:
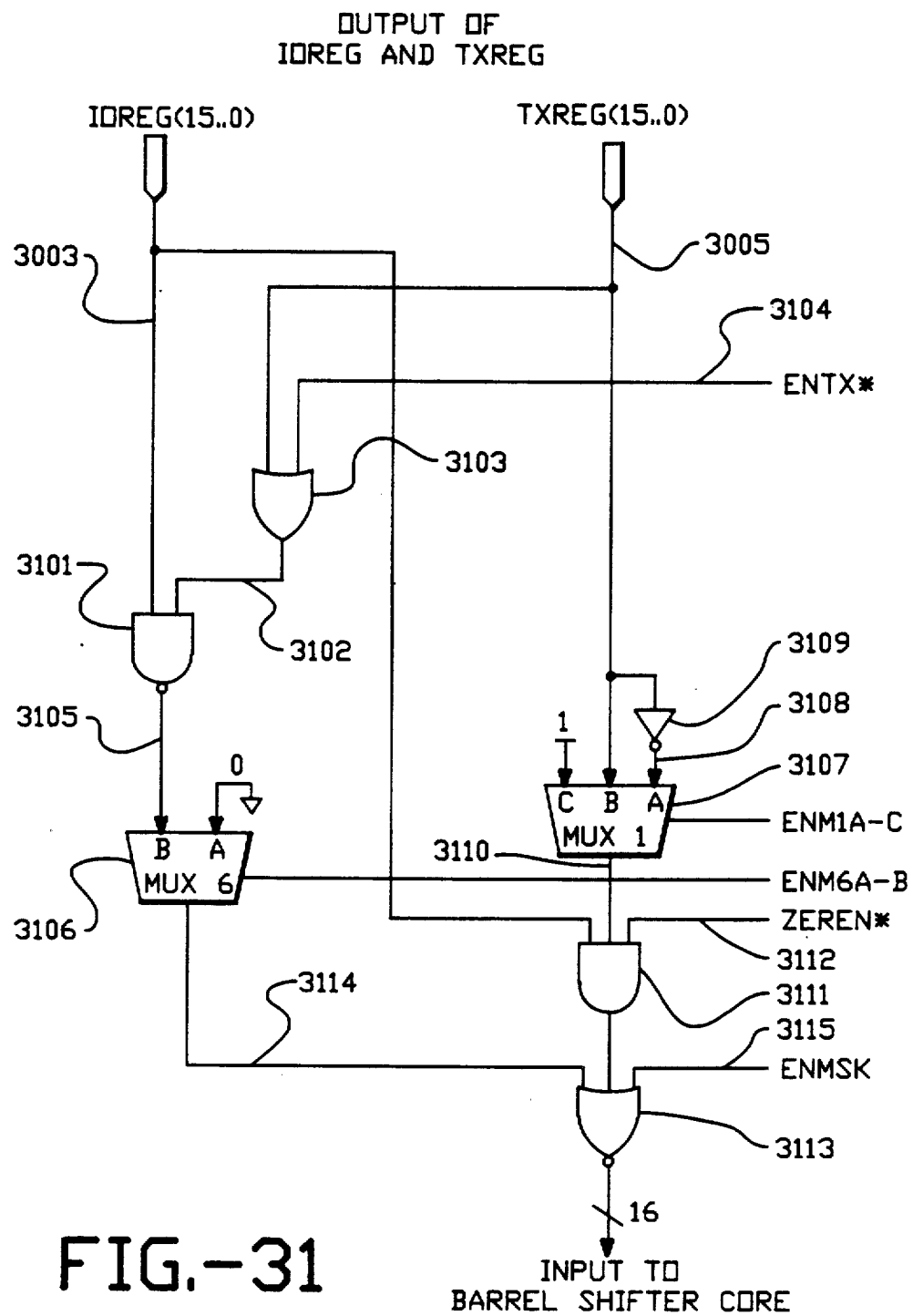

FIGS. 30 and 31 are a diagram of the color combination and barrel shifter block 71 of the RPC 10. FIG. 30 is an overview diagram of the data paths from the FGB bus 64 and the VGB bus 60 and back out to the VGB bus 60.

Data on the VGB bus is supplied as input to the IOREG register 3001 or the TXREG 3002. IOREG 3001 and TXREG 3002 can also be loaded from FGB. The IOREG 3001 is the temporary holding register at CPU address 000 as well as input to the barrel shifter 71. During dispatch, font data is loaded to the IOREG. During graphics or font load modes, the IOREG 3001 holds data being transferred to the video memory. In the font read mode, the IOREG is used as a temporary holding register for data read from the video or font memory. The TXREG 3002 is used to hold texture data during a textured dispatch.

The output of the IOREG 3001 on line 3003 is supplied as one input to preshift logic 3004. The output of the TXREG 3002 is supplied across line 3005 as a second input to the preshift logic 3004. The operation of the preshift logic is illustrated with respect to FIG. 31 below. The output of the preshift logic is a 16-bit word on line 3006 supplied as input to the barrel shifter 3007. The barrel shifter is controlled by a 4-bit offset value supplied on line 3008 at the output of an offset register 3009. The input to the offset register is supplied across the FGB bus 64. During I/O writes to DCW(0), the offset register receives the 4 least significant bits of the destination current address DCAR.

The barrel shifter 3007 operates with zero offset by supplying bits 15-0 on its input at output lines 30-15. With a 15-bit offset, bits 15-0 are supplied directly through the barrel shifter to output bits 15-0. The barrel shifter has left output lines 3010 supplying outputs 30-16, a middle output line 3011 supplying output bit 15, and right output lines 3012 supplying output bits 14-0. The outputs of the barrel shifter on lines 3010, 3011 and 3012 are all inverted at the output of the barrel shifter as indicated by the small circle on the lines.

Right output lines 3012 are supplied as inputs to the B2 register 3013 and the C2 register 3014. The outputs of B2 3013 and C2 3014 are supplied across lines 3015 and 3016, respectively as the A and B inputs to MUX3 3017 multiplexer 3017. MUX3 3017 is controlled in response to the ENM3A-B signal on line 3018. The B2 register is loaded with the barrel shifter right output on line 3012 after the IOREG 3001 has been loaded with data and B1 has been loaded. The C2 register is loaded with the right output on lines 3012 after TXREG 3002 has been loaded with data and C1 has been loaded.

The output of MUX3 3017 is supplied on line 3019 as one input to the OR array 3020. The second input to the OR array 3020 is the left output, bits 30-16, on line 3010 from the barrel shifter. These 15 bits on line 3010 are ORed with the 15 bits on line 3019 which is supplied as a 15-bit output on lines 3021, which connect as inputs to the B1 register 3022 and the C1 register 3023. In addition, the middle output, bit 15, on line 3012 is supplied as the rightmost bit in registers B1 3022 and C1 3023. The B1 register 3022 is loaded with barrel shifter output after IOREG is loaded with data. The C1 register 3023 is loaded with barrel shifter output after the TXREG is loaded with data.

The output of the B1 register is a 16-bit value supplied across line 3024 as an input to the GRD1 register 3025. The output of the C1 register is a 16-bit signal on line 3026 which has been inverted and supplied as input to the GRD2 register 3027.

The GRD1 register is a guard register for shifted data in the B1 register 3022, and the GRD2 register 3027 is a guard register for shifter data stored in the C1 register 3023.

The outputs of the barrel shifter on lines 3010 and 3011 are also supplied as inputs to the MASK register 3028. The MASK register 3028 supplies a 16-bit output on line 3029 as the B input to MUX2 multiplexer 3030. The A input to MUX2 3030 is supplied on line 3031 at the output of inverter array 3032. The input to inverter array 3032 is the output of the MASK register 3028 on line 3029. The C input to MUX2 3030 is all ones and the D input to MUX2 3030 is all zeros. The MUX2 multiplexer 3030 is controlled by the ENM2A-D signal on line 3033.

The output of GRD1 is inverted and supplied on line 3034 as the A inputs to MUX4 multiplexer 3035 and the MUX5 multiplexer 3036. The B input to MUX4 3035 is all ones. The output of GRD2 3027 is supplied on line 3037 as the B input to MUX5 3036 and the C input to MUX5 3036 is all ones. MUX5 3036 is controlled in response to the ENM5A-C signals on line 3038. The MUX4 multiplexer 3035 is controlled in response to the ENM4A-B signals on line 3039.

The outputs of the MUX4 3035 and MUX2 3030 are supplied as two inputs to the AND array 3040. A third input to the AND array is the VGB bus on line 60. The AND array combines the 16-bit signals supplied as input to supply a 16-bit output on line 3041.

The output of MUX5 is inverted and supplied on line 3042 as one input to the OR array 3043. The second input to the OR array 3043 is the 16-bit signal on line 3041. The output of the OR array 3043 is supplied on line 3044 to the video latch 3045. The output of the video latch is supplied to the VGB bus 60.

The MASK register holds the alignment mask indicating which bits are to be modified at the beginning and end of the line in the graphics load and dispatch modes. It is only used during opaque read/modify/write operations.

As can be seen, when there is no offset, the data is shifted directly from the output of the barrel shifter 3007 across lines 3010 and 3011 to the B1 register 3022 or the C1 register 3023. From there it is clocked to the GRD1 and GRD2 registers 3025, 3027 to the video latch 3045. When an offset is involved, residue is latched to the B2 register 3013 and the C2 register 3014. That residue is combined with a following data from the barrel shifter outputs on lines 3010 and 3011 in OR array 3020. From there it is latched to B1 and C1 registers.

The preshift logic is illustrated in FIG. 31. The output of the IOREG is supplied on line 3003 and the output of the TXREG is supplied on line 3005. The 16-bit value on line 3003 is supplied as one input to the NAND array 3101. A second input to the NAND array 3101 is the signal on line 3102 supplied at the output of the OR array 3103. The inputs to the OR array 3103 include the 16-bit value on line 3005 and the ENTX* signal on line 3104. The EXTX* signal on line 3104 is an inverted version of the TX bit from SCW0. Thus, the output of the OR array 3103 passes the signal on lines 3005 only when TX in SCW0 is 1.

The output of the NAND array 3101 is supplied on line 3105 as the B input to MUX6 multiplexer 3106. The A input to MUX6 3106 is all zeros.

The signal on line 3005 is also supplied as the B input to MUX1 multiplexer 3107. The A input to MUX1 3107 is supplied on line 3108 at the output of inverter array 3109. The input to the inverter array 3109 is the signal on line 3005. The C input to MUX1 3107 is all ones.

The output of MUX1 3107 is supplied on line 3110 as one input to the AND array 3111. A second input to the AND array 3111 is the signal on line 3003 from the output of the IOREG. A third input to the AND array 3011 is the ZEREN* signal on line 3112.

The output of the AND array 3111 is supplied as one input to the NOR array 3113. A second input to the NOR array 3113 is the output of MUX6 multiplexer 3106 on line 3114. The third input to the NOR array 3113 is the ENMSK signal on line 3115. The ENMSK signal is used to force zeros into the barrel shifter to generate the alignment mask during a barrel shifter reset.

The table entitled BARREL SHIFTER MUX CONTROL describes the control sequences used for color combination as indicated by the opaque bit OQ from DCW, the color flag bit CL from DCW and the texture bit TX from SCW0. Also, the multiplexer channel selected is modified for the starting word and ending word in the line as indicated by the column entitled "Part of Line." Finally, the type of read being carried out to the registers, affects the multiplexer channel selected as indicated by the "Type of Read."

The columns labeled "MUX channels selected" indicate the channel for MUX1, MUX2, MUX4, MUX5 and MUX6. Multiplexer MUX3 is operated so that the B input is selected when the C1 or C2 registers are being loaded. At all other times, the A input is selected in response to the ENM3A-B signal on line 3018. The BARREL SHIFTER MUX CONTROL TABLE also indicates the assertion of the ZEREN* signal in a column by the same name. The final column, "Results of the Operation," are logic equations illustrated as a result of the operation. In the logic equations, the term "B" indicates background data which is supplied across the VGB bus 60. "F" is font data; "$\bar{F}$" is the inverse of font data. "T" is texture data; "$\bar{T}$" is the inverse of texture data. "M" is the output of the mask register 3028; "$\bar{M}$" is the inverse of mask data.

BARREL SHIFTER MUX CONTROL

| Reg. CTL Bits | | | Part | Type | MUX Channels Selected | | | | | | Result of |
|---|---|---|---|---|---|---|---|---|---|---|---|
| O Q | C L | T X | of Line | of Read | 1 | 2 | 4 | 5 | 6 | ZEREN* | Operation |
| 0 | 0 | 0 | start | font | C | C | B | A | A | 1 | B + F |
|   |   |   | middle | font | C | C | B | A | A | 1 | |
|   |   |   | end | n/a | C | C | B | A | A | 0 | |
| 0 | 0 | 1 | start | font | C | C | A | B | A | 1 | B•$\bar{F}$+F•T |
|   |   |   | start | text | B | C | A | B | A | 1 | |
|   |   |   | middle | font | C | C | A | B | A | 1 | |
|   |   |   | middle | text | B | C | A | B | A | 1 | |
|   |   |   | end | n/a | C | C | A | B | A | 0 | |
| 0 | 1 | 0 | start | font | C | C | A | C | A | 1 | B•$\bar{F}$ |
|   |   |   | middle | font | C | C | A | C | A | 1 | |
|   |   |   | end | n/a | C | C | A | C | A | 0 | |
| 0 | 1 | 1 | start | font | C | C | A | B | A | 1 | B•$\bar{F}$+F•$\bar{T}$ |
|   |   |   | start | text | A | C | A | B | A | 1 | |
|   |   |   | middle | font | C | C | A | B | A | 1 | |
|   |   |   | middle | text | A | C | A | B | A | 1 | |
|   |   |   | end | n/a | C | C | A | B | A | 0 | |
| 1 | 0 | 0 | start | font | C | A | B | A | A | 1 | $\bar{M}$•B+F |
|   |   |   | middle | font | C | D | B | A | A | 1 | F |
|   |   |   | end | n/a | C | B | B | A | A | 0 | $\underline{M}$•B+F |
| 1 | 0 | 1 | start | font | C | A | B | B | A | 1 | $\bar{M}$•B+F•T |
|   |   |   | start | text | B | A | B | B | A | 1 | |
|   |   |   | middle | font | C | D | B | B | A | 1 | F•T |
|   |   |   | middle | text | B | D | B | B | A | 1 | |
|   |   |   | end | n/a | C | B | B | B | A | 0 | $\underline{M}$•B+F•T |
| 1 | 1 | 0 | start | font | C | A | B | A | B | 0 | $\bar{M}$•B+$\bar{F}$ |
|   |   |   | middle | font | C | D | B | A | B | 0 | F |
|   |   |   | end | n/a | C | B | B | A | A | 0 | $\underline{M}$•B+$\bar{F}$ |
| 1 | 1 | 1 | start | font | C | A | B | B | B | 0 | $\bar{M}$•B+$\overline{F•T}$ |
|   |   |   | start | text | A | A | B | B | B | 0 | |
|   |   |   | middle | font | C | D | B | B | B | 0 | $\overline{F•T}$ |
|   |   |   | middle | text | A | D | B | B | B | 0 | |
|   |   |   | end | n/a | C | B | B | B | A | 0 | M•B+$\overline{F•T}$ |

The interface signals from the central control 55 which are supplied to the barrel shifter and color combination logic include the CBQLDGDA signal called the qualify load guard signal which when asserted, causes the loading of the guard registers, GRD1 and GRD2. Also, the CBLDC(2:0) code entitled the load control signal, provides a 3-bit control field for specifying operations of the barrel shifter. The particular operations are as follows:

000 No operation.

001 Code specifying a clearing of the video latch. This is used when the MPC bit is not asserted in order to write zeros to the video memory to clear it after it has been scanned to the printer interface.

010 This code is asserted when the video interface unit is doing a read/modify/write for a dispatch or graphics load. The IOREG is loaded from FGB and the barrel shifter output is loaded into B1 and then B2. The read data from the video buffer is supplied on VGB and modified. The modified data is then loaded from the video latch 3045 back onto VGB.

011 This code is asserted during a font read. The IOREG is loaded from FGB when the write qualifier from the font interface unit is active. After the write qualifier, the barrel shifter is shifted to B1 and B2.

100 This code is asserted when the video interface is doing a texture read. The TXREG is loaded from VGB when the write qualifier is active from the video interface. After the write, control logic sequences the barrel shifter output into C1 and C2.

101 This code is asserted when a texture read is being done through the font interface. In this case, the TXREG register is loaded from FGB when the write qualifier from the font interface is asserted. The data is then sequenced into C1 and C2.

110 This code is asserted when the video interface is doing a font read. In this case the IOREG is loaded from VGB when the write qualifier from the video interface is asserted. The data is sequenced into B1 and B2.

111 This is the reset barrel shifter code. It causes the barrel shifter logic to clear B2 and C2 and generate a new alignment mask based on the new offset value in the offset register.

Finally, the control signal CBLSTWD, the last word signal, is generated by the control 55 indicating to the barrel shifter that the end of the current line has been reached. Font data written into IOREG after the assertion of this signal is saved for the next line.

CONCLUSION

The raster printer controller (RPC) is a high performance CMOS device designed to handle the real time part of raster printing and to reduce the burden on the host CPU. It is capable of handling multiple fonts on one page, graphics and text mixed on one page (multiple windows possible), and overlaying text and graphics.

In cases where the image block has to be textured, the CPU not only sends source information for the image block but also information identifying the location of the texture block. The RPC then accesses both the image and texture blocks, combines them and writes the resulting textured image block to the video band buffer with appropriate background.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to any particular use contemplated. It is intended that the scope of the invention be defined by the following claims and their equivalents.

We claim:

1. An apparatus for assembling image data words for supply to a two-dimensional scanning device under control of a processor that generates control words, image data words being stored in a source memory accessible in response to source addresses and image data words being assembled in an assembly memory accessible in response to assembly addresses, comprising:
    a control interface means, adapted for communication with the processor, for receiving the control words;
    storage means, in communication with the control interface means, for storing and outputting the control words;
    control means, in communication with the control interface means and the storage means, for generating transaction control signals in response to the control words;
    address generating means, in communication with the storage means and the control means, for generating the source addresses and the assembly addresses in response to the transaction control signals and the control words;
    image data interface means, adapted for communication with the source memory and the assembly memory and coupled to the control means and address generating means, for reading and writing image data words in the source memory and the assembly memory in response to transaction control signals, source addresses and assembly addresses; and
    scanner interface means, adapted for communication with the scanning device and coupled to the image data interface means, for supplying image data words from the assembly memory to the scanning device;
wherein the control words include a control command word indicating one of a plurality of modes of operation, one of the plurality of modes of operation being a dispatch mode and the control words include a source command word including a source address of a source image block and a destination command word including a destination virtual address of a memory storage location, a source image block including one or more image data words and a memory storage location including data locations addressable by one or more real assembly addresses, and wherein:
    the control means is responsive to the control words to generate transaction control signals in the dispatch mode so that the address generating means translates the destination virtual address to a real assembly address, the source interface means reads the image data word in the real source address and transfers the image data word to the image data interface means, and the image data interface means stores the image data word in the real assembly address.

2. The apparatus of claim 1, wherein the image data interface means includes:

source interface means, adapted for communication with the source memory and coupled to the control means and the address generating means, for reading and writing image data words in the source memory in response to transaction control signals and source addresses;

assembly interface means, adapted for communication with the assembly memory and coupled to the control means, the address generating means and the source interface means, for assembling image data words in the assembly memory and for reading assembled data in the assembly memory in response to transaction control signals and assembly addresses.

3. The apparatus of claim 2, wherein the control means includes:

mode control means, connected to the storage means and responsive to a control word stored in the storage means that indicates a selected mode of operation for the apparatus, for generating transaction type signals to implement the selected mode;

scan control means, connected to the storage means and the scanner interface means and responsive to communication with the scanner interface means and control words stored in the storage means, for generating transaction type signals to maintain the supply of assembled data words to the scanning device;

transaction type selecting means, connected to the mode control means and the scan control means, for selecting a transaction type signal from the scan control means or the mode control means; and transaction control means, connected to the transaction type selecting means, the address generating means, the assembly interface means, the source interface means and the storage means and responsive to the selected transaction type signal, for generating the transaction control signals.

4. The apparatus of claim 3, wherein the assembly memory includes a buffer address space including a first band and a second band, and the control means further includes:

band control means, connected to the scan control means, the mode control means and the transaction control means, for coordinating access to the first band and the second band so that one band may be accessed by the assembly interface means for supply of data to the scanner interface means and the other band may be accessed in a multiplexed manner by the assembly interface means for writing data from the source interface means.

5. The apparatus of claim 4, wherein the memory storage location identified by the destination address in the destination command word is addressable by a number of assembly addresses that correspond to the size of the source image block, and wherein the first one of said plurality of assembly addresses resides in one of the first and second bands and the remaining ones of the plurality of assembly addresses reside in the other of the first and second bands, and wherein the control means further includes:

means, in communication with the control interface means and the address generating means, for generating an interrupt when an assembly address is generated by the address generating means that resides outside the one band in which the first assembly address of the plurality resided.

6. The apparatus of claim 5, wherein the control means further includes:

means for writing parameters indicating the nature of the interrupt to the storage means, whereby the processor may access the parameters through the control interface means.

7. The apparatus of claim 1, wherein the control words further include a control command word, a source command word and a destination command word and wherein:

the control means is responsive to the control command word in generating transaction control signals.

8. The apparatus of claim 1, wherein the source command word further includes data indicating the size of the source image block, and the address generating means generates a plurality of source addresses in response to the source address of the image block and its size.

9. The apparatus of claim 1, wherein the source command word further includes data indicating the size of the source image block, and the address generating means generates a plurality of assembly addresses in response to the destination virtual address of the image block and its size.

10. The apparatus of claim 1, wherein one of the plurality of modes of operation is a font load mode, and the control words include a destination command word including a destination address of a font memory storage location, a font memory storage location including data locations addressable by one or more source addresses and wherein:

the control means is responsive to the control command word to generate transaction control signals in the font load mode so that the control interface means accepts an image data word from the processor and transfers the image data word to the image data interface means, and the image data interface means writes the image data word to the source address indicated by the destination 11. The apparatus of claim 10, wherein the address generating means generates a plurality of source addresses in the font load mode, one in response to each image data word of the image block written to the control interface means by the processor.

12. The apparatus of claim 1, wherein one of the plurality of modes of operation is a source load mode; and the control words include a destination command word including a destination address of a source memory storage location in the source load mode, a source memory storage location including data locations addressable by one or more source addresses and wherein:

the control means is responsive to the control command word to generate transaction control signals in the source load mode so that the control interface means accepts an image data word from the processor and transfers the image data word to the image data interface means, and the image data interface means writes the image data word to the source address.

13. The apparatus of claim 12, wherein the address generating means generates a plurality of source addresses in the source load mode, one in response to each image data word of the image block written to the control interface means by the processor.

14. The apparatus of claim 1, wherein one of he plurality of modes of operation is graphics load mode; and the control words include a destination command word including a destination address of a graphics memory storage location for a graphics load mode, a graphics memory storage location including data locations addressable by assembly addresses and wherein:

the control means is responsive to the control command word to generate transaction control signals in the graphics load mode so that the control interface means accepts an image data word from the processor and transfers the image data word to the image data interface means, and the image data interface means writes the image data word to the assembly address.

15. The apparatus of claim 14, wherein the source command word in the graphics load mode includes data indicating the number of image data words per line in the graphics image block, and the address generating means generates a plurality of assembly addresses in the graphics load mode in response to the destination address and the number of image data words per line in the graphics image block.

16. The apparatus of claim 1, wherein one of the plurality of modes of operation is a source read mode; and the control words include a destination command word including a source address of a source memory storage location including data locations addressable by one or more source addresses and wherein:

the control means is responsive to the control command word to generate transaction control signals in the source read mode so that the image data interface means reads a data word from the source memory storage location and transfers the data word to the control interface means.

17. The apparatus of claim 16, wherein the address generating means generates a plurality of source addresses in the source read mode, one in response to each read by the processor to the control interface means.

18. The apparatus of claim 1, wherein the source command word further includes a texture command word including a source address of a texture image block, a texture image block including one or more texture data words, the apparatus further including:

combining means, in communication with the control means, and the image data interface means, for combining image data words and texture data words to generate textured data words; and wherein the control means is responsive to the control command word to generate transaction control signals in the dispatch mode so that the image data interface means reads the image data word and the texture data word in the respective source addresses and transfers the image data word and texture data word to the combining means, the combining means combines the image data word and the texture data word to generate a textured data word, and the image data interface means stores the textured data word in the assembly address.

19. The apparatus of claim 1, wherein the destination command word, further includes an offset defining a bit alignment within the memory storage location, the apparatus further including:

aligning means, in communication with the storage means, the control means, and the image data interface means, for aligning image data words on bit boundaries in response to the offset; and wherein the control means is responsive to the control command word to generate transaction control signals in the dispatch mode so that the image data interface means reads the image data word in the source address and transfers the image data word to the aligning means, the aligning means aligns the image data word to generate an aligned image data word, and the image data interface means stores the aligned image data word in the assembly address.

20. An integrated circuit for assembling image data words for supply to a raster printer under control of a processor that generates control words, image data words being stored in a source memory accessible in response to source addresses and image data words being assembled in an assembly memory accessible in response to assembly addresses, the control words including a code indicating one of a plurality of modes of operation, a code identifying a source address of an image block including one or more image data words and a code indicating a destination address of a memory storage location in the assembly memory at which the source image block is to be stored, the control words further including a code indicating a source address of a texture image block including one or more data words, said integrated circuit comprising:

a control interface means, adapted for communication with the processor, for receiving the control words;

storage means, in communication with the control interface means, for storing and outputting the control words;

control means, in communication with the control interface means and the storage means, for generating transaction control signals in response to the control words;

address generating means, in communication with the storage means and the control means, for generating the source addresses and the assembly addresses in response to the transaction control signals and the codes indicating the source address of the image data block and the destination address of the memory storage location in the assembly memory in which the image block is to be stored;

image data interface means, adapted for communication with the source memory and assembly memory and coupled to the control means and the address generating means, for reading and writing image data words in the source memory and the assembly memory in response to the transaction control signals and the source addresses and assembly addresses;

printer interface means, adapted for communication with the printer and coupled to the image data interface means, for supplying data words from the assembly memory through the image data interface means to the printer; and combining means, in communication with the control means and the image data interface means, for combining image data words and texture data words to generate textured data words, and wherein the control means is responsive to the control words in at least one of the plurality of modes to generate transaction control signals so that the image data interface means reads the image data word and the texture data word in the respective source addresses and transfers the image data word and texture data word to the combining means, the combining means combines the image data word and the texture data word to generate a textured data word, and the image data interface means stores the textured data word in the assembly address supplied by the address generating means.

21. The integrated circuit of claim 20, wherein the image data interface means includes:

a source interface means, adapted for communication with the source memory and coupled to the control means and the address generating means, for reading and writing image data words in the source image block in response to the transaction control signals and source addresses supplied by the address generating means; and assembly interface means, adapted for communication with the assembly memory and coupled to the control means, the address generating means and the source interface means, for assembling image data words in the assembly memory in response to the assembly addresses supplied by the address generating means, and for reading assembled data in the assembly memory in response to transaction control signals for supply to the printer.

22. The integrated circuit of claim 20, wherein one of the plurality of modes is the dispatch mode, and wherein:

the control means is responsive to the control words to generate transaction control signals in the dispatch mode so that the image data interface means reads the image data block from the source memory in response to addresses supplied by the address generating means, and transfers the image data block to the assembly memory in response to the assembly addresses supplied by the address generating means.

23. The integrated circuit of claim 22, wherein the assembly memory includes a buffer address space including a first band and a second band, and the control means further includes:

band control means, in communication with the image data interface means, for coordinating access to the first band and the second band so that one band may be accessed by the image data interface means for supply of data to the printer and the other band is accessed by the image data interface means for writing data from the source memory.

24. The integrated circuit of claim 23, wherein the memory storage location identified by the destination address is addressable by a number of assembly addresses that correspond to the size of the source image block, and wherein the first one of said plurality of assembly addresses may reside in one of the first and second bands while another one of the plurality of assembly addresses reside in the other of the first and second bands, and wherein the control means further includes:

means, in communication with the control interface means and the address generating means, for generating an interrupt when an assembly address is generated by the address generating means that resides outside the one band in which the first assembly address of the plurality resides.

25. The integrated circuit of claim 24, wherein the control means further includes:

means for writing parameters indicating the nature of the interrupt to the storage means, whereby the processor may access the parameters through the control interface means.

26. The integrated circuit of claim 22, wherein the source command word further includes data indicating the size of the source image block, and the address generating means generates a plurality of source addresses in response to the source address of the image block and its size.

27. The integrated circuit of claim 22, wherein the source command word further includes data indicating the size of the source image block, and the address generating means generates a plurality of assembly addresses in response to the destination address and the size of the source image block.

28. The integrated circuit of claim 20, wherein the code indicating the destination address of a memory storage location in the assembly memory includes an offset value defining bit alignment within the storage location, the integrated circuit further including:

aligning means, in communication with the storage means, the control means and the image data interface means, for aligning image data words on bit boundaries in response to the offset, and wherein the control means is responsive to the control words in the dispatch mode to generate transaction control signals so that the image data interface reads the image data word and the source address supplied by the address generating means and transfers the image data word to the aligning means, the aligning means aligns the image data word to generate an aligned image data word, and the image data interface means stores the aligned image data words in the assembly address supplied by the address generating means.

29. The integrated circuit of claim 20, wherein one of the plurality of modes of operation is a font load mode, and the control words include a code identifying a destination address of a memory storage location, a memory storage location including data locations addressable by one or more source addresses and wherein:

the control means is responsive to the control command word to generate transaction control signals in the font load mode so that the control interface means accepts an image data word from the processor and transfers the image data word to the image data interface means, and the image data interface means writes the image data word to the destination address.

30. The integrated circuit of claim 29, wherein the address generating means generates a plurality of source addresses, one in response to each image data word of an image block written to the control interface means by the processor.

31. The integrated circuit of claim 20, wherein one o the plurality of modes of operation is a source load mode; and the control words include a code indicating destination address of a memory storage location in the source load mode, a memory storage location including data locations addressable by one or more source addresses, and wherein:

the control means is responsive to the control command word to generate transaction control signals in the source load mode so that the control interface means accepts an image data word from the processor and transfers the image data word to the image data interface means, and the image data interface means writes the image data word to the destination address.

32. The integrated circuit of claim 31, wherein the address generating means generates a plurality of destination addresses, one in response to each image data word of an image block written by the processor to the control interface means.

33. The integrated circuit of claim 20, wherein one of the plurality of modes of operation is a graphics load mode; and the control words include a code indicating a destination address of a memory storage location for a graphics image block in the graphics load mode, a memory storage location including data locations addressable by assembly or source addresses and wherein:

the control means is responsive to the control command word to generate transaction control signals in the graphics load mode so that the control interface means accepts an image data word from the processor and transfers the image data word to the image data interface means, and the image data interface means writes the image data word to the destination address.

34. The integrated circuit of claim 33, wherein the control words in the graphics load mode include data indicating the number of image data words per line in the graphics image block, and the address generating means generates a plurality of assembly addresses in response to the destination address and the number of image data words per line in the graphics image block.

35. The integrated circuit of claim 20, wherein one of the plurality of modes of operation is a source read mode; and the control words include a code indicating a source address of a memory storage location including data locations addressable by one or more source addresses and wherein:

the control means is responsive to the control command word to generate transaction control signals in the source read mode so that the image data interface means reads a data word from the memory storage location and transfers the data word to the control interface means.

36. The integrated circuit of claim 35, wherein the address generating means generates a plurality of source addresses, one in response to each read by the processor to the control interface means.

37. An apparatus for assembling image data words for supply to a two-dimensional scanning device under control of a processor that generates control words, comprising:

a source memory storing image data words in locations accessible in response to source addresses;

an assembly memory having locations accessible in response to assembly addresses, and including a buffer address space including a first band and a second band;

a control interface means, adapted for communication with the processor, for receiving the control words;

storage means, in communication with the control interface means, for storing and outputting the control words;

control means, in communication with the control interface means and the storage means, for generating transaction control signals in response to the control words;

address generating means, in communication with the storage means and the control means, for generating the source addresses and the assembly addresses in response to the transaction control signals and the control words;

image data interface means, adapted for communication with the source memory and the assembly memory and coupled to the control means and address generating means, for reading and writing image data words in the source memory and the assembly memory in response to transaction control signals, source addresses and assembly addresses; and scanner interface means, adapted for communication with the scanning device and coupled to the image data interface means, for supplying image data words from the assembly memory to the scanning device; wherein the control means further includes band control means, in communication with the image data interface means, for coordinating access to the first band and the second band so that one band may be accessed by the image data interface means for supply of data to the scanner interface means while the other band is accessed by the image data interface means for writing data from the image data interface means; and wherein a location in the assembly memory identified by the control words is addressable by a number of assembly addresses that correspond to the size of a source image block, and wherein the first one of said plurality of assembly addresses resides in one of the first and second bands and the remaining ones of the plurality of assembly addresses reside in the other of the first and second bands, and wherein the control means further includes:

means, in communication with the control interface means and the address generating means, for generating an interrupt when an assembly address is generated by the address generating means that resides outside the one band in which the first assembly address of the plurality resided.

38. The apparatus of claim 37, wherein the control means further includes:

means for writing parameters indicating the nature of the interrupt to the storage means, whereby the processor may access the parameters through the control interface means.

39. An apparatus for assembling image data words for supply to a two-dimensional scanning device under control of a processor that generates control words, image data words being stored in a source memory accessible in response to source addresses and image data words being assembled in an assembly memory accessible in response to assembly addresses, comprising:

a control interface means, adapted for communication with the processor, for receiving the control words;

storage means, in communication with the control interface means, for storing and outputting the control words;

control means, in communication with the control interface means and the storage means, for generating transaction control signals in response to the control words;

address generating means, in communication with the storage means and the control means, for generating the source addresses and the assembly addresses in response to the transaction control signals and the control words;

image data interface means, adapted for communication with the source memory and the assembly memory and coupled to the control means and address generating means, for reading and writing image data words in the source memory and the assembly memory in response to transaction control signals, source addresses and assembly addresses; and scanner interface means, adapted for communication with the scanning device and coupled to the image data interface means, for supplying image data words from the assembly memory to the scanning device;

wherein the control words in the graphics load mode include a control command word indicating one of a plurality of modes of operation, one of the plurality of modes of operation graphics load mode, a destination command word including a destination address of a graphics memory storage location for a graphics image block, a graphics memory storage location including data locations addressable by assembly addresses, and a source command word that includes data indicating the number of image data words per line in the graphics image block; and wherein:

the address generating means generates a plurality of assembly addresses in the graphics load mode in response to the destination address and the number of image data words per line in the graphics image block; and the control means is responsive to the control command word to generate transaction control signals in the graphics load mode so that the control interface means accepts an image data word from the processor and transfers the image data word to the image data interface means, and the image data interface means writes the image data word to the assembly address.

40. An apparatus for assembling image data words for supply to a two-dimensional scanning device under control of a processor that generates control words, image data words being stored in a source memory accessible in response to source addresses and image data words being assembled in an assembly memory accessible in response to assembly addresses, comprising:

a control interface means, adapted for communication with the processor, for receiving the control words;

storage means, in communication with the control interface means, for storing and outputting the control words;

control means, in communication with the control interface means and the storage means, for generating transaction control signals in response to the control words;

address generating means, in communication with the storage means and the control means, for generating the source addresses and the assembly addresses in response to the transaction control signals and the control words;

image data interface means, adapted for communication with the source memory and the assembly memory and coupled to the control means and address generating means, for reading and writing image data words in the source memory and the assembly memory in response to transaction control signals, source addresses and assembly addresses; and scanner interface means, adapted for communication with the scanning device and coupled to the image data interface means, for supplying image data words from the assembly memory to the scanning device;

wherein the control words include a control command word indicating one of a plurality of modes of operation, one of the plurality of modes of operation being a dispatch mode, and the control words include a source command word including a source address of a source image block, a texture command word including a source address of a texture image block, and a destination command word including a destination address of a memory storage location, a source image block including one or more image data words, a texture image block including one or more texture data words, and a memory storage location including data locations addressable by one or more assembly addresses, the apparatus further including:

combining means, in communication with the control means, and the image data interface means, for combining image data words and texture data words to generate textured data words; and wherein the control means is responsive to the control command word to generate transaction control signals in the dispatch mode so that the image data interface means reads the image data word and the texture data word in the respective source addresses and transfers the image data word and texture data word to the combining means, the combining means combines the image data word and the texture data word to generate a textured data word, and the image data interface means stores the textured data word in the assembly address.

* * * * *